United States Patent
Brener et al.

(10) Patent No.: US 12,008,050 B2
(45) Date of Patent: *Jun. 11, 2024

(54) COMPUTERIZED TOOLS CONFIGURED TO DETERMINE SUBSETS OF GRAPH DATA ARRANGEMENTS FOR LINKING RELEVANT DATA TO ENRICH DATASETS ASSOCIATED WITH A DATA-DRIVEN COLLABORATIVE DATASET PLATFORM

(71) Applicant: data.world, Inc., Austin, TX (US)

(72) Inventors: Sharon Brener, Austin, TX (US); Shad William Reynolds, Austin, TX (US); David Lee Griffith, Austin, TX (US)

(73) Assignee: data.world, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/539,162

(22) Filed: Nov. 30, 2021

(65) Prior Publication Data

US 2023/0169124 A1 Jun. 1, 2023

Related U.S. Application Data

(63) Continuation of application No. 16/395,036, filed on Apr. 25, 2019, now Pat. No. 11,238,109, which is a
(Continued)

(51) Int. Cl.
*G06F 16/906* (2019.01)
*G06F 3/04817* (2022.01)
(Continued)

(52) U.S. Cl.
CPC ........ *G06F 16/906* (2019.01); *G06F 3/04817* (2013.01); *G06F 3/04842* (2013.01); *G06F 9/451* (2018.02); *G06F 16/9024* (2019.01)

(58) Field of Classification Search
CPC ............... G06F 16/906; G06F 3/04817; G06F 3/04842; G06F 9/451; G06F 16/9024; G06F 3/0482
(Continued)

(56) References Cited

U.S. PATENT DOCUMENTS 6,144,962 A 11/2000 Weinberg et al.
6,317,752 B1 11/2001 Lee et al.
(Continued)

FOREIGN PATENT DOCUMENTS

AU 2012289936 A1 2/2014
CA 2820994 A1 1/2014
(Continued)

OTHER PUBLICATIONS

"Data.World Comes Out Of Stealth To Make Open Data Easier." Americaninno.com, AustinInno, Jul. 11, 2016, www.americaninno.com/austin/open-data-tech-brett-hurts-startup-data-world-launches/.
(Continued)

*Primary Examiner* — Phong H Nguyen
(74) *Attorney, Agent, or Firm* — KOKKA & BACKUS, PC

(57) ABSTRACT

Various embodiments relate generally to data science and data analysis, computer software and systems, and wired and wireless network communications to interface among repositories of disparate datasets and computing machine-based entities configured to access datasets, and, more specifically, to a computing and data storage platform to implement computerized tools to identify data classifications and similar subsets of graph-based data arrangements with which to join, according to at least some examples. For example, a method may include determining a classification type for a subset of data based on a graph data arrangement,
(Continued)

generating presentation data as a first user input to detect selection of the first user input. The method may include predicting a classification type for data. The method may also include generating other presentation data configured to join datasets, such as a column of tabular-formatted data with one or more portions of a graph data arrangement.

20 Claims, 13 Drawing Sheets

Related U.S. Application Data continuation-in-part of application No. 16/137,292, filed on Sep. 20, 2018, now Pat. No. 10,824,637, and a continuation-in-part of application No. 16/137,297, filed on Sep. 20, 2018, now Pat. No. 11,068,453, and a continuation-in-part of application No. 15/985,702, filed on May 22, 2018, now Pat. No. 11,068,475, and a continuation-in-part of application No. 15/985,704, filed on May 22, 2018, now Pat. No. 11,068,847, and a continuation-in-part of application No. 15/927,004, filed on Mar. 20, 2018, now Pat. No. 11,036,716, and a continuation-in-part of application No. 15/926,999, filed on Mar. 20, 2018, now Pat. No. 11,016,931, and a continuation-in-part of application No. 15/454,923, filed on Mar. 9, 2017, now Pat. No. 10,353,911.

(51) Int. Cl.
  *G06F 3/04842* (2022.01)
  *G06F 9/451* (2018.01)
  *G06F 16/901* (2019.01)

(58) Field of Classification Search
  USPC ........................................ 707/737, 738, 740
  See application file for complete search history.

(56) References Cited

U.S. PATENT DOCUMENTS

| | | | |
|---|---|---|---|
| 6,529,909 B1 | 3/2003 | Bowman-Amuah | |
| 6,768,986 B2 | 7/2004 | Cras et al. | |
| 6,961,728 B2 | 11/2005 | Wynblatt et al. | |
| 7,080,090 B2 | 7/2006 | Shah et al. | |
| 7,146,375 B2 | 12/2006 | Egilsson et al. | |
| 7,680,862 B2 | 3/2010 | Chong et al. | |
| 7,702,639 B2 | 4/2010 | Stanley et al. | |
| 7,761,407 B1 | 7/2010 | Stern | |
| 7,836,063 B2 | 11/2010 | Salazar et al. | |
| 7,853,081 B2 | 12/2010 | Thint | |
| 7,856,416 B2 | 12/2010 | Hoffman et al. | |
| 7,877,350 B2 | 1/2011 | Stanfill et al. | |
| 7,953,695 B2 | 5/2011 | Roller et al. | |
| 7,987,179 B2 | 7/2011 | Ma et al. | |
| 8,037,108 B1 | 10/2011 | Chang | |
| 8,060,472 B2 | 11/2011 | Itai et al. | |
| 8,099,382 B2 | 1/2012 | Liu et al. | |
| 8,170,981 B1 | 5/2012 | Tewksbary | |
| 8,275,784 B2 | 9/2012 | Cao et al. | |
| 8,296,200 B2 | 10/2012 | Mangipudi et al. | |
| 8,312,389 B2 | 11/2012 | Crawford et al. | |
| 8,429,179 B1 | 4/2013 | Mirhaji | |
| 8,521,565 B2 | 8/2013 | Faulkner et al. | |
| 8,538,985 B2 | 9/2013 | Betawadkar-Norwood et al. | |
| 8,583,631 B1 | 11/2013 | Ganapathi et al. | |
| 8,616,443 B2 | 12/2013 | Butt et al. | |
| 8,640,056 B2 | 1/2014 | Helfman et al. | |
| 8,719,252 B2 | 5/2014 | Miranker et al. | |
| 8,762,160 B2 | 6/2014 | Lulla | |
| 8,799,240 B2 | 8/2014 | Stowe et al. | |
| 8,831,070 B2 | 9/2014 | Huang et al. | |
| 8,843,502 B2 | 9/2014 | Elson et al. | |
| 8,856,643 B2 | 10/2014 | Drieschner | |
| 8,892,513 B2 | 11/2014 | Forsythe | |
| 8,935,272 B2 | 1/2015 | Ganti et al. | |
| 8,943,313 B2 | 1/2015 | Glew et al. | |
| 8,965,915 B2 | 2/2015 | Ganti et al. | |
| 8,990,236 B2 | 3/2015 | Mizrahy et al. | |
| 8,996,559 B2 | 3/2015 | Ganti et al. | |
| 8,996,978 B2 | 3/2015 | Richstein et al. | |
| 9,002,860 B1 | 4/2015 | Ghemawat | |
| 9,171,077 B2 | 10/2015 | Balmin et al. | |
| 9,218,365 B2 | 12/2015 | Irani et al. | |
| 9,244,952 B2 | 1/2016 | Ganti et al. | |
| 9,268,820 B2 | 2/2016 | Henry | |
| 9,268,950 B2 | 2/2016 | Gkoulalas-Divanis et al. | |
| 9,396,283 B2 | 7/2016 | Miranker et al. | |
| 9,454,611 B2 | 9/2016 | Henry | |
| 9,495,429 B2 | 11/2016 | Miranker | |
| 9,560,026 B1 | 1/2017 | Worsley | |
| 9,607,042 B2 | 3/2017 | Long | |
| 9,613,152 B2 | 4/2017 | Kucera | |
| 9,659,081 B1 | 5/2017 | Ghodsi et al. | |
| 9,690,792 B2 | 6/2017 | Bartlett et al. | |
| 9,696,981 B2 | 7/2017 | Martin et al. | |
| 9,710,526 B2 | 7/2017 | Couris et al. | |
| 9,710,568 B2 | 7/2017 | Srinivasan et al. | |
| 9,720,958 B2 | 8/2017 | Bagehorn et al. | |
| 9,760,602 B1 | 9/2017 | Ghodsi et al. | |
| 9,769,032 B1 | 9/2017 | Ghodsi et al. | |
| 9,798,737 B2 | 10/2017 | Palmer | |
| 9,836,302 B1 | 12/2017 | Hunter et al. | |
| 9,959,337 B2 | 5/2018 | Ghodsi et al. | |
| 9,990,230 B1 | 6/2018 | Stoica et al. | |
| 10,095,735 B2 | 10/2018 | Ghodsi et al. | |
| 10,102,258 B2 | 10/2018 | Jacob et al. | |
| 10,176,234 B2 * | 1/2019 | Gould | G06F 16/2452 |
| 10,216,860 B2 | 2/2019 | Miranker et al. | |
| 10,248,297 B2 | 4/2019 | Beechuk et al. | |
| 10,296,329 B2 | 5/2019 | Hunter et al. | |
| 10,318,567 B2 | 6/2019 | Henry | |
| 10,324,925 B2 | 6/2019 | Jacob et al. | |
| 10,346,429 B2 | 7/2019 | Jacob et al. | |
| 10,353,911 B2 | 7/2019 | Reynolds et al. | |
| 10,361,928 B2 | 7/2019 | Ghodsi et al. | |
| 10,438,013 B2 | 10/2019 | Jacob et al. | |
| 10,452,677 B2 | 10/2019 | Jacob et al. | |
| 10,452,975 B2 | 10/2019 | Jacob et al. | |
| 10,474,501 B2 | 11/2019 | Ghodsi et al. | |
| 10,474,736 B1 | 11/2019 | Stoica et al. | |
| 10,545,986 B2 | 1/2020 | Tappan et al. | |
| 10,546,001 B1 | 1/2020 | Nguyen et al. | |
| D876,454 S | 2/2020 | Knowles et al. | |
| 10,558,664 B2 | 2/2020 | Armbrust et al. | |
| D877,167 S | 3/2020 | Knowles et al. | |
| D879,112 S | 3/2020 | Hejazi et al. | |
| 10,606,675 B1 | 3/2020 | Luszczak et al. | |
| 10,645,548 B2 | 5/2020 | Reynolds et al. | |
| 10,664,509 B1 | 5/2020 | Reeves et al. | |
| 10,673,887 B2 | 6/2020 | Crabtree et al. | |
| 10,678,536 B2 | 6/2020 | Hunter et al. | |
| 10,691,299 B2 | 6/2020 | Broek et al. | |
| 10,691,433 B2 | 6/2020 | Shankar et al. | |
| 10,769,130 B1 | 9/2020 | Armbrust et al. | |
| 10,769,535 B2 | 9/2020 | Lindsley | |
| 10,810,051 B1 | 10/2020 | Shankar et al. | |
| 10,984,008 B2 | 4/2021 | Jacob et al. | |
| 11,068,453 B2 | 7/2021 | Griffith | |
| 11,068,475 B2 | 7/2021 | Boutros et al. | |
| 11,068,847 B2 | 7/2021 | Boutros et al. | |
| 11,093,539 B2 | 8/2021 | Henry | |
| 2002/0133476 A1 | 9/2002 | Reinhardt | |
| 2002/0143755 A1 | 10/2002 | Wynblatt et al. | |
| 2003/0093597 A1 | 5/2003 | Marshak et al. | |
| 2003/0120681 A1 | 6/2003 | Baclawski | |
| 2003/0208506 A1 | 11/2003 | Greenfield et al. | |
| 2004/0064456 A1 | 4/2004 | Fong et al. | |
| 2005/0004888 A1 | 1/2005 | McCrady et al. | |
| 2005/0010550 A1 | 1/2005 | Potter et al. | |
| 2005/0010566 A1 | 1/2005 | Cushing et al. | |
| 2005/0234957 A1 | 10/2005 | Olson et al. | |

(56) References Cited

U.S. PATENT DOCUMENTS

| | | |
|---|---|---|
| 2005/0246357 A1 | 11/2005 | Geary et al. |
| 2005/0278139 A1 | 12/2005 | Glaenzer et al. |
| 2006/0100995 A1 | 5/2006 | Albornoz et al. |
| 2006/0117057 A1 | 6/2006 | Legault et al. |
| 2006/0129605 A1 | 6/2006 | Doshi |
| 2006/0161545 A1 | 7/2006 | Pura |
| 2006/0168002 A1 | 7/2006 | Chesley |
| 2006/0218024 A1 | 9/2006 | Lulla |
| 2006/0235837 A1 | 10/2006 | Chong et al. |
| 2007/0027904 A1 | 2/2007 | Chow et al. |
| 2007/0055662 A1 | 3/2007 | Edelman et al. |
| 2007/0139227 A1 | 6/2007 | Speirs et al. |
| 2007/0179760 A1 | 8/2007 | Smith |
| 2007/0203933 A1 | 8/2007 | Iversen et al. |
| 2007/0271604 A1 | 11/2007 | Webster et al. |
| 2007/0276875 A1 | 11/2007 | Brunswig et al. |
| 2008/0046427 A1 | 2/2008 | Lee et al. |
| 2008/0091634 A1 | 4/2008 | Seeman |
| 2008/0140609 A1 | 6/2008 | Werner et al. |
| 2008/0162550 A1 | 7/2008 | Fey |
| 2008/0162999 A1 | 7/2008 | Schlueter et al. |
| 2008/0216060 A1 | 9/2008 | Vargas |
| 2008/0240566 A1 | 10/2008 | Thint |
| 2008/0256026 A1 | 10/2008 | Hays |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0013281 A1 | 1/2009 | Helfman et al. |
| 2009/0018996 A1 | 1/2009 | Hunt et al. |
| 2009/0064053 A1 | 3/2009 | Crawford et al. |
| 2009/0094416 A1 | 4/2009 | Baeza-Yates et al. |
| 2009/0106734 A1 | 4/2009 | Riesen et al. |
| 2009/0119254 A1 | 5/2009 | Cross et al. |
| 2009/0132474 A1 | 5/2009 | Ma et al. |
| 2009/0132503 A1 | 5/2009 | Sun et al. |
| 2009/0138437 A1 | 5/2009 | Krishnamoorthy et al. |
| 2009/0150313 A1 | 6/2009 | Heilper et al. |
| 2009/0157630 A1 | 6/2009 | Yuan |
| 2009/0182710 A1 | 7/2009 | Short et al. |
| 2009/0198693 A1 | 8/2009 | Pura |
| 2009/0234799 A1 | 9/2009 | Betawadkar-Norwood et al. |
| 2009/0300054 A1 | 12/2009 | Fisher et al. |
| 2010/0114885 A1 | 5/2010 | Bowers et al. |
| 2010/0138388 A1* | 6/2010 | Wakeling ............... G06F 16/25 715/764 |
| 2010/0223266 A1 | 9/2010 | Balmin et al. |
| 2010/0235384 A1 | 9/2010 | Itai et al. |
| 2010/0241644 A1 | 9/2010 | Jackson et al. |
| 2010/0250576 A1 | 9/2010 | Bowers et al. |
| 2010/0250577 A1 | 9/2010 | Cao et al. |
| 2010/0268722 A1 | 10/2010 | Yalamanchi et al. |
| 2010/0332453 A1 | 12/2010 | Prahlad et al. |
| 2011/0153047 A1 | 6/2011 | Cameron et al. |
| 2011/0202560 A1 | 8/2011 | Bowers et al. |
| 2011/0283231 A1 | 11/2011 | Richstein et al. |
| 2011/0298804 A1 | 12/2011 | Hao et al. |
| 2012/0016895 A1 | 1/2012 | Butt et al. |
| 2012/0036162 A1 | 2/2012 | Gimbel |
| 2012/0102022 A1 | 4/2012 | Miranker et al. |
| 2012/0154633 A1 | 6/2012 | Rodriguez |
| 2012/0179644 A1 | 7/2012 | Miranker |
| 2012/0190386 A1 | 7/2012 | Anderson |
| 2012/0254192 A1 | 10/2012 | Gelbard |
| 2012/0278902 A1 | 11/2012 | Martin et al. |
| 2012/0284301 A1 | 11/2012 | Mizrahy et al. |
| 2012/0310674 A1 | 12/2012 | Faulkner et al. |
| 2012/0330908 A1 | 12/2012 | Stowe et al. |
| 2012/0330979 A1 | 12/2012 | Elson et al. |
| 2013/0031208 A1 | 1/2013 | Linton et al. |
| 2013/0031364 A1 | 1/2013 | Glew et al. |
| 2013/0041893 A1 | 2/2013 | Strike |
| 2013/0054517 A1 | 2/2013 | Beechuk et al. |
| 2013/0110775 A1 | 5/2013 | Forsythe |
| 2013/0110825 A1 | 5/2013 | Henry |
| 2013/0114645 A1 | 5/2013 | Huang et al. |
| 2013/0138681 A1 | 5/2013 | Abrams et al. |
| 2013/0156348 A1 | 6/2013 | Irani et al. |
| 2013/0238667 A1 | 9/2013 | Carvalho et al. |
| 2013/0262443 A1 | 10/2013 | Leida et al. |
| 2013/0263019 A1 | 10/2013 | Castellanos et al. |
| 2013/0321458 A1 | 12/2013 | Miserendino et al. |
| 2014/0006448 A1 | 1/2014 | McCall |
| 2014/0019426 A1 | 1/2014 | Palmer |
| 2014/0067762 A1 | 3/2014 | Carvalho |
| 2014/0115013 A1 | 4/2014 | Anderson |
| 2014/0119611 A1 | 5/2014 | Prevrhal et al. |
| 2014/0164431 A1 | 6/2014 | Tolbert |
| 2014/0198097 A1 | 7/2014 | Evans |
| 2014/0214857 A1 | 7/2014 | Srinivasan et al. |
| 2014/0229869 A1 | 8/2014 | Chiantera et al. |
| 2014/0236933 A1 | 8/2014 | Schoenbach et al. |
| 2014/0244623 A1 | 8/2014 | King |
| 2014/0279640 A1 | 9/2014 | Moreno et al. |
| 2014/0279845 A1 | 9/2014 | Ganti et al. |
| 2014/0280067 A1 | 9/2014 | Ganti et al. |
| 2014/0280286 A1 | 9/2014 | Ganti et al. |
| 2014/0280287 A1 | 9/2014 | Ganti et al. |
| 2014/0337331 A1 | 11/2014 | Hassanzadeh et al. |
| 2014/0337436 A1 | 11/2014 | Hoagland et al. |
| 2014/0372434 A1 | 12/2014 | Smith et al. |
| 2015/0046547 A1 | 2/2015 | Vohra et al. |
| 2015/0052125 A1 | 2/2015 | Ellis et al. |
| 2015/0052134 A1 | 2/2015 | Bornea et al. |
| 2015/0081666 A1 | 3/2015 | Long |
| 2015/0095391 A1 | 4/2015 | Gajjar et al. |
| 2015/0120643 A1 | 4/2015 | Dantressangle et al. |
| 2015/0142829 A1 | 5/2015 | Lee et al. |
| 2015/0143248 A1 | 5/2015 | Beechuk et al. |
| 2015/0149879 A1 | 5/2015 | Miller et al. |
| 2015/0186653 A1 | 7/2015 | Gkoulalas-Divanis et al. |
| 2015/0213109 A1 | 7/2015 | Kassko et al. |
| 2015/0234884 A1 | 8/2015 | Henriksen |
| 2015/0242867 A1 | 8/2015 | Prendergast et al. |
| 2015/0269223 A1 | 9/2015 | Miranker et al. |
| 2015/0277725 A1 | 10/2015 | Masterson et al. |
| 2015/0278273 A1 | 10/2015 | Wigington et al. |
| 2015/0278335 A1 | 10/2015 | Opitz et al. |
| 2015/0339572 A1 | 11/2015 | Achin et al. |
| 2015/0356144 A1 | 12/2015 | Chawla et al. |
| 2015/0372915 A1 | 12/2015 | Shen et al. |
| 2015/0379079 A1 | 12/2015 | Kota |
| 2016/0004820 A1 | 1/2016 | Moore |
| 2016/0012059 A1 | 1/2016 | Balmin et al. |
| 2016/0019091 A1 | 1/2016 | Leber et al. |
| 2016/0055184 A1 | 2/2016 | Fokoue-Nkoutche et al. |
| 2016/0055261 A1 | 2/2016 | Reinhardt et al. |
| 2016/0063017 A1 | 3/2016 | Bartlett et al. |
| 2016/0063271 A1 | 3/2016 | Bartlett et al. |
| 2016/0092090 A1 | 3/2016 | Stojanovic et al. |
| 2016/0092474 A1 | 3/2016 | Stojanovic et al. |
| 2016/0092475 A1 | 3/2016 | Stojanovic et al. |
| 2016/0092476 A1 | 3/2016 | Stojanovic et al. |
| 2016/0098418 A1 | 4/2016 | Dakshinamurthy et al. |
| 2016/0100009 A1 | 4/2016 | Zoldi et al. |
| 2016/0117358 A1 | 4/2016 | Schmid et al. |
| 2016/0117362 A1 | 4/2016 | Bagehorn et al. |
| 2016/0132572 A1 | 5/2016 | Chang et al. |
| 2016/0132608 A1 | 5/2016 | Rathod |
| 2016/0132787 A1 | 5/2016 | Drevo et al. |
| 2016/0147837 A1 | 5/2016 | Nguyen et al. |
| 2016/0162785 A1 | 6/2016 | Grobman |
| 2016/0171380 A1 | 6/2016 | Kennel et al. |
| 2016/0173338 A1 | 6/2016 | Wolting |
| 2016/0188789 A1 | 6/2016 | Kisiel et al. |
| 2016/0203196 A1 | 7/2016 | Schnall-Levin et al. |
| 2016/0210364 A1 | 7/2016 | Henry |
| 2016/0232457 A1 | 8/2016 | Gray et al. |
| 2016/0275204 A1 | 9/2016 | Miranker et al. |
| 2016/0283551 A1 | 9/2016 | Fokoue-Nkoutche et al. |
| 2016/0292206 A1 | 10/2016 | Velazquez et al. |
| 2016/0314143 A1 | 10/2016 | Hiroshige |
| 2016/0321316 A1 | 11/2016 | Pennefather et al. |
| 2016/0322082 A1 | 11/2016 | Davis et al. |
| 2016/0350414 A1 | 12/2016 | Henry |

(56) References Cited

U.S. PATENT DOCUMENTS

| | | |
|---|---|---|
| 2016/0358102 A1 | 12/2016 | Bowers et al. |
| 2016/0358103 A1 | 12/2016 | Bowers et al. |
| 2016/0371288 A1 | 12/2016 | Biannic et al. |
| 2016/0371355 A1 | 12/2016 | Massari et al. |
| 2017/0017537 A1 | 1/2017 | Razin et al. |
| 2017/0032259 A1 | 2/2017 | Goranson et al. |
| 2017/0053130 A1 | 2/2017 | Hughes et al. |
| 2017/0075973 A1 | 3/2017 | Miranker |
| 2017/0132401 A1 | 5/2017 | Gopi et al. |
| 2017/0161323 A1 | 6/2017 | Simitsis et al. |
| 2017/0161341 A1 | 6/2017 | Hrabovsky et al. |
| 2017/0177729 A1 | 6/2017 | Duke et al. |
| 2017/0213004 A1 | 7/2017 | Fox et al. |
| 2017/0220615 A1 | 8/2017 | Bendig et al. |
| 2017/0220667 A1 | 8/2017 | Ghodsi et al. |
| 2017/0228405 A1 | 8/2017 | Ward et al. |
| 2017/0236060 A1 | 8/2017 | Ignatyev |
| 2017/0316070 A1 | 11/2017 | Krishnan et al. |
| 2017/0318020 A1 | 11/2017 | Kamath et al. |
| 2017/0357653 A1 | 12/2017 | Bicer et al. |
| 2017/0364538 A1 | 12/2017 | Jacob et al. |
| 2017/0364539 A1 | 12/2017 | Jacob et al. |
| 2017/0364553 A1* | 12/2017 | Jacob ............... G06F 16/2455 |
| 2017/0364564 A1 | 12/2017 | Jacob et al. |
| 2017/0364568 A1 | 12/2017 | Reynolds et al. |
| 2017/0364569 A1 | 12/2017 | Jacob et al. |
| 2017/0364570 A1 | 12/2017 | Jacob et al. |
| 2017/0364694 A1 | 12/2017 | Jacob et al. |
| 2017/0364703 A1 | 12/2017 | Jacob et al. |
| 2017/0371881 A1 | 12/2017 | Reynolds et al. |
| 2017/0371926 A1 | 12/2017 | Shiran et al. |
| 2018/0025027 A1 | 1/2018 | Palmer |
| 2018/0025307 A1 | 1/2018 | Hui et al. |
| 2018/0032327 A1 | 2/2018 | Adami et al. |
| 2018/0040077 A1 | 2/2018 | Smith et al. |
| 2018/0046668 A1 | 2/2018 | Ghodsi et al. |
| 2018/0048536 A1 | 2/2018 | Ghodsi et al. |
| 2018/0121194 A1 | 5/2018 | Hunter et al. |
| 2018/0210936 A1 | 7/2018 | Reynolds et al. |
| 2018/0262864 A1 | 9/2018 | Reynolds et al. |
| 2018/0300354 A1 | 10/2018 | Liang et al. |
| 2018/0300494 A1 | 10/2018 | Avidan et al. |
| 2018/0314556 A1 | 11/2018 | Ghodsi et al. |
| 2018/0314705 A1 | 11/2018 | Griffith et al. |
| 2018/0314732 A1 | 11/2018 | Armbrust et al. |
| 2018/0330111 A1 | 11/2018 | Käbisch et al. |
| 2019/0005104 A1 | 1/2019 | Prabhu et al. |
| 2019/0034491 A1 | 1/2019 | Griffith et al. |
| 2019/0042606 A1 | 2/2019 | Griffith et al. |
| 2019/0050445 A1 | 2/2019 | Griffith et al. |
| 2019/0050459 A1 | 2/2019 | Griffith et al. |
| 2019/0057107 A1 | 2/2019 | Bartlett et al. |
| 2019/0065567 A1 | 2/2019 | Griffith et al. |
| 2019/0065569 A1 | 2/2019 | Boutros et al. |
| 2019/0066052 A1 | 2/2019 | Boutros et al. |
| 2019/0079968 A1 | 3/2019 | Griffith et al. |
| 2019/0095472 A1 | 3/2019 | Griffith |
| 2019/0121807 A1 | 4/2019 | Boutros et al. |
| 2019/0155852 A1 | 5/2019 | Miranker et al. |
| 2019/0258479 A1 | 8/2019 | Hunter et al. |
| 2019/0266155 A1 | 8/2019 | Jacob et al. |
| 2019/0272279 A1 | 9/2019 | Jacob et al. |
| 2019/0278793 A1 | 9/2019 | Henry |
| 2019/0295296 A1 | 9/2019 | Gove, Jr. |
| 2019/0317961 A1* | 10/2019 | Brener ............... G06F 16/9035 |
| 2019/0332606 A1 | 10/2019 | Kee et al. |
| 2019/0347244 A1 | 11/2019 | Jacob et al. |
| 2019/0347258 A1 | 11/2019 | Jacob et al. |
| 2019/0347259 A1 | 11/2019 | Jacob et al. |
| 2019/0347268 A1 | 11/2019 | Griffith |
| 2019/0347347 A1* | 11/2019 | Griffith ............... G06F 16/26 |
| 2019/0370230 A1 | 12/2019 | Jacob et al. |
| 2019/0370262 A1 | 12/2019 | Reynolds et al. |
| 2019/0370266 A1 | 12/2019 | Jacob et al. |
| 2019/0370481 A1 | 12/2019 | Jacob et al. |
| 2020/0073644 A1 | 3/2020 | Shankar et al. |
| 2020/0073865 A1 | 3/2020 | Jacob et al. |
| 2020/0074298 A1 | 3/2020 | Jacob et al. |
| 2020/0097504 A1 | 3/2020 | Sequeda et al. |
| 2020/0117665 A1 | 4/2020 | Jacob et al. |
| 2020/0117688 A1 | 4/2020 | Sequeda et al. |
| 2020/0175012 A1 | 6/2020 | Jacob et al. |
| 2020/0175013 A1 | 6/2020 | Jacob et al. |
| 2020/0201854 A1 | 6/2020 | Miller |
| 2020/0218723 A1 | 7/2020 | Jacob et al. |
| 2020/0241950 A1 | 7/2020 | Luszczak et al. |
| 2020/0252766 A1 | 8/2020 | Reynolds et al. |
| 2020/0252767 A1 | 8/2020 | Reynolds et al. |
| 2020/0257689 A1 | 8/2020 | Armbrust et al. |
| 2020/0287775 A1* | 9/2020 | Khasis ............... H04W 4/185 |
| 2020/0301684 A1 | 9/2020 | Shankar et al. |
| 2020/0409768 A1 | 12/2020 | Shankar et al. |
| 2021/0011901 A1 | 1/2021 | Armbrust et al. |
| 2021/0019327 A1 | 1/2021 | Reynolds et al. |
| 2021/0042299 A1 | 2/2021 | Migliori |
| 2021/0081414 A1 | 3/2021 | Jacob et al. |
| 2021/0109629 A1 | 4/2021 | Reynolds et al. |
| 2021/0173848 A1 | 6/2021 | Jacob et al. |
| 2021/0224250 A1 | 7/2021 | Griffith |
| 2021/0224330 A1 | 7/2021 | Miranker et al. |
| 2021/0294465 A1 | 9/2021 | Reynolds et al. |
| 2021/0374171 A1 | 12/2021 | Henry |
| 2021/0390098 A1 | 12/2021 | Reynolds et al. |
| 2021/0390141 A1 | 12/2021 | Jacob et al. |
| 2021/0390507 A1 | 12/2021 | Reynolds et al. |
| 2021/0397589 A1 | 12/2021 | Griffith et al. |
| 2021/0397611 A1 | 12/2021 | Boutres et al. |
| 2021/0397626 A1 | 12/2021 | Griffith et al. |

FOREIGN PATENT DOCUMENTS

| | | |
|---|---|---|
| CN | 103425734 B | 6/2017 |
| EP | 2631817 A1 | 8/2013 |
| EP | 2631819 A1 | 8/2013 |
| EP | 2685394 A3 | 6/2017 |
| EP | 2740053 B1 | 6/2019 |
| GB | 2519779 A | 5/2015 |
| JP | 2013175181 A | 9/2013 |
| JP | 2013246828 A | 12/2013 |
| JP | 2014304124 A | 9/2014 |
| WO | 2012054860 A1 | 4/2012 |
| WO | 2013020084 A1 | 2/2013 |
| WO | 2017190153 A1 | 11/2017 |
| WO | 2017222927 A1 | 12/2017 |
| WO | 2018156551 A1 | 8/2018 |
| WO | 2018164971 A1 | 9/2018 |
| WO | 2021252805 A1 | 12/2021 |

OTHER PUBLICATIONS

Alaoui et al., "SQL to SPARQL Mapping for RDF querying based on a new Efficient Schema Conversion Technique," International Journal of Engineering Research & Technology (IJERT); ISSN: 2278-0181; vol. 4 Issue 10, Oct. 1, 2015, Retrieved from internet: https://www.ijert.org/research/sql-to-sparql-mapping-for-rdf-querying-based-on-a-new-efficient-schema-conversion-technique-IJERTV4IS1--1-5.pdf. Retrieved on Oct. 6, 2020.

Angles, R., Gutierrez. C., "The Expressive Power of SPARQL," Proceedings of the 7th International Semantic Web Conference (ISWC2008). 2008.

Arenas, M., et al., "A Direct Mapping of Relational Data to RDF," W3C Recommendation, Sep. 27, 2012, Retrieved from the Internet [retrieved Mar. 7, 2019].

Beckett, D., Berners-Lee, T., "Turtle—Terse RDF Triple Language," W3C Team Submission, Jan. 14, 2008, Retrieved from the Internet [retrieved Mar. 7, 2019].

Beckett, D., Broekstra, J., "SPARQL Query Results XML Format," W3C Recommendation, Jan. 15, 2008, Retrieved from the Internet [retrieved Mar. 7, 2019].

Beckett, Dave, "RDF/XML Syntax Specification (Revised)," W3C Recommendation, Feb. 10, 2004, Retrieved from the Internet [retrieved Mar. 7, 2019].

(56) References Cited

OTHER PUBLICATIONS

Berners-Lee, Tim, "Notation 3," 2006, Retrieved from the Internet [retrieved on Mar. 7, 2019].
Berners-Lee, Tim, "Linked Data," 2009, Retrieved from the Internet [retrieved on Mar. 7, 2019].
Boutros et al., "Computerized Tools to Develop and Manage Data-Driven Projects Collaboratively via a Networked Computing Platform and Collaborative Datasets," U.S. Appl. No. 15/985,702, filed May 22, 2018.
Boutros et al., "Computerized Tools to Facilitate Data Project Development via Data Access Layering Logic in a Networked Computing Platform Including Collaborative Datasets," U.S. Appl. No. 15/985,704, filed May 22, 2018.
Boutros et al., "Dynamic Composite Data Dictionary to Facilitate Data Operations via Computerized Tools Configured to Access Collaborative Datasets in a Networked Computing Platform," U.S. Appl. No. 15/985,705, filed May 22, 2018.
Boutros et al., "Graphical User Interface for a Display Screen or Portion Thereof," U.S. Appl. No. 29/648,465, filed May 22, 2018.
Boutros et al., "Graphical User Interface for a Display Screen or Portion Thereof," U.S. Appl. No. 29/648,466, filed May 22, 2018.
Boutros et al., "Graphical User Interface for a Display Screen or Portion Thereof," U.S. Appl. No. 29/648,467, filed May 22, 2018.
Brener et al., "Computerized Tools Configured to Determine Subsets of Graph Data Arrangements for Linking Relevant Data to Enrich Datasets Associated With a Data-Driven Collaborative Dataset Platform," U.S. Appl. No. 16/395,036, filed Apr. 25, 2019.
Brickley, D., Guha, R.V., "RDF Vocabulary Description Language 1.0: RDF Schema," W3C Recommendation, Feb. 10, 2004, Retrieved from the Internet [retrieved Mar. 7, 2019].
Buche et al., "Flexible SPARQL Querying of Web Data Tables Driven by an Ontology," FQAS 2009, LNAI 5822, Springer, 2009, pp. 345-357.
Bullock, Joshua, Final Office Action dated Jan. 22, 2019 for U.S. Appl. No. 15/439,908.
Bullock, Joshua, Final Office Action dated Jan. 22, 2019 for U.S. Appl. No. 15/439,911.
Bullock, Joshua, Final Office Action dated Oct. 30, 2018 for U.S. Appl. No. 15/186,517.
Bullock, Joshua, Non-Final Office Action dated Dec. 20, 2021 for U.S. Appl. No. 16/457,759.
Bullock, Joshua, Non-Final Office Action dated Dec. 7, 2021 for U.S. Appl. No. 16/457,750.
Bullock, Joshua, Non-Final Office Action dated Jul. 12, 2018 for U.S. Appl. No. 15/186,517.
Bullock, Joshua, Non-Final Office Action dated Jun. 28, 2018 for U.S. Appl. No. 15/439,908.
Bullock, Joshua, Non-Final Office Action dated Jun. 28, 2018 for U.S. Appl. No. 15/439,911.
Bullock, Joshua, Notice of Allowance and Fee(s) Due dated Dec. 22, 2021 for U.S. Appl. No. 16/395,049.
Bullock, Joshua, Notice of Allowance and Fee(s) Due dated Feb. 23, 2022 for U.S. Appl. No. 16/457,750.
Clark, K., Feigenbaum, L., Torres, E., "SPARQL Protocol for RDF," W3C Recommendation, Jan. 15, 2008, Retrieved from the Internet [retrieved Mar. 7, 2019].
Copenheaver, Blaine R., Notification of Transmittal of the International Search Report and the Written Opinion of the International Searching Authority, or the Declaration dated Jul. 5, 2017 for International Patent Application No. PCT/US2017/030474.
Czajkowski, K., et al., "Grid Information Services for Distributed Resource Sharing," 10th IEEE International Symposium on High Performance Distributed Computing, pp. 181-184. IEEE Press, New York (2001).
Dean, M., Schreiber, G., "OWL Web Ontology Language Reference," W3C Recommendation, Feb. 10, 2004, Retrieved from the Internet [retrieved Mar. 7, 2019].
Doung, Hien, Non-Final Office Action dated Dec. 9, 2020 for U.S. Appl. No. 16/899,544.
Dwivedi, Mahesh H., Non-Final Office Action dated Jan. 30, 2020 for U.S. Appl. No. 15/454,955.
Ellis, Matthew J., Non-Final Office Action dated Sep. 25, 2020 for U.S. Appl. No. 16/139,374.
European Patent Office, Extended European Search Report for European Patent Application No. 18757122.9 dated Oct. 15, 2020.
European Patent Office, Extended European Search Report for European Patent Application No. 18763855.6 dated Sep. 28, 2020.
Feigenbaum, L., et al., "Semantic Web in Action," Scientific American, pp. 90-97, Dec. 2007.
Fernandez, J., et al., "Lightweighting the Web of Data through Compact RDF/HDT," Lozano J.A., Moreno J.A. (eds) Advances in Artificial Intelligence. CAEPIA 2011. Lecture Notes in Computer Science, vol. 7023. Springer, Berlin, Hidelberg.
Foster, I., Kesselman, C., "The Grid: Blueprint for a New Computing Infrastructure," Morgan Kaufmann, San Francisco (1999).
Foster, I., Kesselman, C., Nick, J., Tuecke, S., "The Physiology of the Grid: An Open Grid Services Architecture for Distributed Systems Integration," Technical Report, Global Grid Forum (2002).
Ganti et al., U.S. Appl. No. 14/058,184, filed Oct. 18, 2013 and entitled, "Assisted Query Formation, Validation, and Result Previewing in a Database Having a Complex Schema."
Ganti et al., U.S. Appl. No. 14/058,189, filed Oct. 18, 2013 and entitled, "Assisted Query Formation, Validation, and Result Previewing in a Database Having a Complex Schema."
Ganti et al., U.S. Appl. No. 14/058,206, filed Oct. 18, 2013 and entitled, "Curated Answers Community Automatically Populated Through User Query Monitoring."
Ganti et al., U.S. Appl. No. 14/058,208, filed Oct. 18, 2013 and entitled, "Editable and Searchable Markup Pages Automatically Populated Through User Query Monitoring."
Ganti et al., U.S. Appl. No. 61/802,716, filed Mar. 17, 2013 and entitled, "Data Profile Driven Query Builder."
Ganti et al., U.S. Appl. No. 61/802,742, filed Mar. 18, 2013 and entitled, "Developing a Social Data Catalog by Crowd-Sourcing."
Kim, Harry C., Notification of Transmittal of the International Search Report and the Written Opinion of the International Searching Authority, or the Declaration, dated Sep. 28, 2021 for International Application No. PCT/US2021/036880.
Klyne, G., Carroll, J., "Resource Description Framework (RDF): Concepts and Abstract Syntax," W3C Recommendation, Feb. 10, 2004, Retrieved from the Internet [retrieved Mar. 7, 2019].
Krishnan et al., U.S. Appl. No. 15/583,966, filed May 1, 2017 and titled "Automatic Generation of Structured Data from Semi-Structured Data."
Langedgger, Andreas, "XL Wrap—Spreadsheet-to-RDF Wrapper," 2009, Retrieved from the Internet [retrieved Mar. 7, 2019].
Lee, Mark B., Non-Final Office Action for U.S. Appl. No. 13/180,444 dated Jul. 2, 2012.
Lenz, H.J., Shoshani, A., "Summarizability in OLAP and Statistical Data Bases," Proceedings of the Ninth International Conference on Scientific and Statistical Database Management, 1997.
Manola, F., Miller, E., "RDF Primer," W3C Recommendation, Feb. 10, 2004, Retrieved from the Internet [retrieved Mar. 7, 2019].
Martin et al., U.S. Appl. No. 13/457,925, filed Apr. 27, 2012 and titled "Incremental Deployment of Computer Software Program Logic."
Martin et al., U.S. Appl. No. 61/479,621, filed Apr. 27, 2011 and titled "Incremental Deployment of Computer Software Program Logic."
May, P., Ehrlich, H.C., Steinke, T., "ZIB Structure Prediction Pipeline: Composing a Complex Biological Workflow through Web Services," In: Nagel, W.E., Walter, W.V., Lehner, W. (eds.) Euro-Par 2006. LNCS, vol. 4128, pp. 1148-1158. Springer, Heidelberg (2006).
McGuiness, D., Van Harmelen, F., "OWL Web Ontology Language Overview," W3C Recommendation, Feb. 10, 2004, Retrieved from the Internet [retrieved Mar. 7, 2019].
Miranker, Daniel Paul, "Accessing Relational Databases as Resource Description Framework Databases," U.S. Appl. No. 61/406,021, filed Oct. 22, 2010.
Miranker, Daniel Paul, "Automatic Synthesis and Presentation of OLAP Cubes from Semantically Enriched Data Sources," U.S. Appl. No. 61/362,781, filed Jul. 9, 2010.

(56) References Cited

OTHER PUBLICATIONS

National Center for Biotechnology Information, Website, Retrieved from the Internet [retrieved Mar. 7, 2019].
Nguyen, Bao-Yen Thi, Restriction Requirement dated Jun. 29, 2021 for Design U.S. Appl. No. 29/648,466.
Nguyen, Kim T., Non-Final Office Action dated Aug. 31, 2021 for U.S. Appl. No. 16/899,549.
Nguyen, Kim T., Non-Final Office Action dated Dec. 10, 2020 for U.S. Appl. No. 16/137,297.
Nguyen, Kim T., Non-Final Office Action dated Dec. 8, 2020 for U.S. Appl. No. 15/985,704.
Nguyen, Kim T., Non-Final Office Action dated Jun. 14, 2018 for U.S. Appl. No. 15/186,514.
Nguyen, Kim T., Non-Final Office Action dated Jun. 7, 2021 for U.S. Appl. No. 16/457,766.
Nguyen, Kim T., Non-Final Office Action dated Mar. 20, 2019 for U.S. Appl. No. 15/454,923.
Nguyen, Kim T., Non-Final Office Action dated May 11, 2021 for U.S. Appl. No. 16/395,036.
Nguyen, Kim T., Non-Final Office Action dated Nov. 24, 2020 for U.S. Appl. No. 16/036,834.
Nguyen, Kim T., Non-Final Office Action dated Nov. 24, 2020 for U.S. Appl. No. 16/036,836.
Nguyen, Kim T., Non-Final Office Action dated Nov. 27, 2020 for U.S. Appl. No. 15/985,705.
Nguyen, Kim T., Non-Final Office Action dated Oct. 14, 2020 for U.S. Appl. No. 15/943,629.
Nguyen, Kim T., Non-Final Office Action dated Oct. 14, 2020 for U.S. Appl. No. 15/943,633.
Nguyen, Kim T., Non-Final Office Action dated Oct. 27, 2020 for U.S. Appl. No. 15/985,702.
Nguyen, Kim T., Non-Final Office Action dated Oct. 5, 2020 for U.S. Appl. No. 15/927,004.
Nguyen, Kim T., Non-Final Office Action dated Oct. 5, 2020 for U.S. Appl. No. 15/927,006.
Nguyen, Kim T., Non-Final Office Action dated Sep. 21, 2020 for U.S. Appl. No. 15/926,999.
Nguyen, Kim T., Notice of Allowance and Fee(s) Due dated Aug. 17, 2021 for U.S. Appl. No. 16/428,915.
Nguyen, Kim T., Notice of Allowance and Fee(s) Due dated Aug. 3, 2021 for U.S. Appl. No. 16/457,766.
Nguyen, Kim T., Notice of Allowance and Fee(s) Due dated Mar. 16, 2021 for U.S. Appl. No. 15/985,702.
Nguyen, Kim T., Notice of Allowance and Fee(s) Due dated Mar. 16, 2021 for U.S. Appl. No. 16/137,297.
Nguyen, Kim T., Notice of Allowance and Fee(s) Due dated Mar. 17, 2021 for U.S. Appl. No. 15/985,704.
Nguyen, Kim T., Notice of Allowance and Fee(s) Due dated Mar. 31, 2021 for U.S. Appl. No. 15/985,705.
Nguyen, Kim T., Notice of Allowance and Fee(s) Due, dated May 15, 2019 for U.S. Appl. No. 15/454,923.
Niinimaki et al., "An ETL Process for OLAP Using RDF/OWL Ontologies," Journal on Data Semantics XIII, LNCS 5530, Springer, pp. 97-119, Aug. 12, 2009.
Noy et al., "Tracking Changes During Ontology Evolution." International Semantic Web Conference. Springer, Berlin, Heidelberg, 2004 (Year: 2004).
Pandit et al., "Using Ontology Design Patterns To Define SHACL Shapes," CEUR Workshop Proceedings, Proceedings of the 9th Workshop on Ontology Design and Patterns (WOP 2018), Monterey, USA, Oct. 9, 2018.
Parashar et al., U.S. Appl. No. 62/329,982, filed Apr. 29, 2016 and titled "Automatic Parsing of Semi-Structured Data and Identification of Missing Delimiters."
Patel-Schneider, P., Hayes, P., Horrocks, I., "OWL Web Ontology Language Semantics and Abstract Syntax," W3C Recommendation, Feb. 10, 2004, Retrieved from the Internet [retrieved Mar. 7, 2019].
Perez, J., Arenas, M., Gutierrez, C., "Semantics and Complexity of SPARQL," In Proceedings of the International Semantic Web Conference (ISWC2006). 2006.
Prud'hommeaux, E., Seaborne, A., "SPARQL Query Language for RDF," W3C Recommendation, Jan. 15, 2008, Retrieved from the Internet [retrieved Mar. 7, 2019].
Raab, Christopher J., Non-Final Office Action dated Jul. 24, 2020 for U.S. Appl. No. 16/271,687.
Raab, Christopher J., Non-Final Office Action dated Jun. 28, 2018 for U.S. Appl. No. 15/186,520.
Raab, Christopher J., Non-Final Office Action dated Oct. 16, 2020 for U.S. Appl. No. 16/287,967.
Raab, Christopher J., Notice of Allowance and Fee(s) Due and Notice of Allowability for U.S. Appl. No. 15/186,520, dated Jan. 2, 2019.
Rachapalli et al., "Retro: A Framework for Semantics Preserving SQL-to-SPARQL Translation," The University of Texas at Dallas; Sep. 18, 2011, XP055737294, Retrieved from internet: http://iswc2011.semanticweb.org/fileadmin/iswc/Papers/Workshope/EvoDyn/evodyn_3.pdf. Retrieved on Oct. 6, 2020.
RDB2RDF Working Group Charter, Sep. 2009, Retrieved from the Internet [retrieved Mar. 7, 2019].
Reynolds et al., "Computerized Tool Implementation of Layered Data Files to Discover, Form, or Analyze Dataset Interrelations of Networked Collaborative Datasets," U.S. Appl. No. 15/454,981, filed Mar. 9, 2017.
Reynolds et al., "Computerized Tools to Discover, Form, and Analyze Dataset Interrelations Among a System of Networked Collaborative Datasets," International Patent Application No. PCT/US2018/020812 filed Mar. 3, 2018.
Reynolds et al., "Interactive Interfaces to Present Data Arrangement Overviews and Summarized Dataset Attributes for Collaborative Datasets," U.S. Appl. No. 15/454,969, filed Mar. 9, 2017.
Sahoo, S., et al., "A Survey of Current Approaches for Mapping of Relational Databases to RDF," W3C RDB2RDF XG Report, Incubator Group, Published Jan. 8, 2009.
Sequeda, J., Depena, R., Miranker. D., "Ultrawrap: Using SQL Views for RDB2RDF," Poster in the 8th International Semantic Web Conference (ISWC2009), Washington DC, US, 2009.
Sequeda, J., et al., "Direct Mapping SQL Databases to the Semantic Web," Technical Report 09-04. The University of Texas at Austin, Department of Computer Sciences. 2009.
Sequeda, J., et al., "Ultrawrap: SPARQL Execution on Relational Data," Technical Report. The University of Texas at Austin, Department of Computer Sciences. 2012.
Sequeda, J., Tirmizi, S., Miranker, D., "SQL Databases are a Moving Target," Position Paper for W3C Workshop on RDF Access to Relational Databases, Cambridge, MA, USA, 2007.
Skevakis, Giannis et al., Metadata management, interoperability and Linked Data publishing support for Natural History Museums, Int J Digit Libr (2014), published online: Apr. 11, 2014; Springer-Verlag Berlin Heidelberg.
Slawski, Bill, Google Knowledge Cards Improve Search Engine Experiences, SEO by the Sea, Published Mar. 18, 2015, URL: https://www.seobythesea.com/2015/03/googles-knowledge-cards/, Retrieved Sep. 15, 2021.
Smith, M., Welty, C., McGuiness, D., "OWL Web Ontology Language Guide," W3C Recommendation, Feb. 10, 2004, Retrieved from the Internet [retrieved Mar. 7, 2019].
Smith, T.F., Waterman, M.S., "Identification of Common Molecular Subsequences," J. Mol. Biol. 147, 195-197 (1981).
Spieler, William, Advisory Action dated Nov. 22, 2021 for U.S. Appl. No. 16/435,196.
Spieler, William, Final Office Action dated Mar. 15, 2021 for U.S. Appl. No. 16/435,196.
Spieler, William, Non-Final Office Action dated Dec. 31, 2020 for U.S. Appl. No. 16/435,196.
Spieler, William, Non-Final Office Action dated Feb. 25, 2021 for U.S. Appl. No. 16/558,076.
Spieler, William, Non-Final Office Action dated Jul. 9, 2021 for U.S. Appl. No. 16/435,196.
Tirmizi, S., Sequeda, J., Miranker, D., "Translating SQL Applications to the Semantic Web," In Proceedings of the 19th International Databases and Expert Systems Application Conference (DEXA2008). Turin, Italy. 2008.
U.S. Appl. No. 16/251,408, filed Jan. 18, 2019.

(56) References Cited

OTHER PUBLICATIONS

Uddin, MD I, Non-Final Office Action dated May 13, 2021 for U.S. Appl. No. 16/404,113.
Uddin, MD I., Final Office Action dated Jan. 1, 2021 for U.S. Appl. No. 16/404,113.
Uddin, MD I., Non-Final Office Action dated Oct. 6, 2020 for U.S. Appl. No. 16/404,113.
Ultrawrap Mapper, U.S. Appl. No. 62/169,268, filed Jun. 1, 2015 (Expired).
Vy, Hung T., Final Office Action for U.S. Appl. No. 13/180,444 dated Dec. 3, 2014.
Vy, Hung T., Final Office Action for U.S. Appl. No. 13/180,444 dated Dec. 9, 2015.
Vy, Hung T., Final Office Action for U.S. Appl. No. 13/180,444 dated Feb. 22, 2013.
Vy, Hung T., Non-Final Office Action for U.S. Appl. No. 13/180,444 dated Jun. 18, 2015.
Vy, Hung T., Non-Final Office Action for U.S. Appl. No. 13/180,444 dated Mar. 26, 2014.
Vy, Hung T., Non-Final Office Action for U.S. Appl. No. 15/273,930 dated Dec. 20, 2017.
Willis, Amanda Lynn, Non-Final Office Action dated Feb. 8, 2022 for U.S. Appl. No. 16/899,547.
Woo, Isaac M., Non-Final Office Action dated May 5, 2020 for U.S. Appl. No. 16/137,292.
Yen, Syling, Final Office Action dated Apr. 10, 2019 for U.S. Appl. No. 15/186,519.
Yen, Syling, Final Office Action dated Oct. 25, 2019 for U.S. Appl. No. 15/186,519.
Yen, Syling, Non-Final Office Action dated Feb. 8, 2019 for U.S. Appl. No. 15/186,519.
Yen, Syling, Non-Final Office Action dated Sep. 12, 2019 for U.S. Appl. No. 15/186,519.
Yotova, Polina, European Patent Office Examination Report, Communication Pursuant to Article 94(3) EPC for European Patent Application No. 17815970.3 dated Oct. 5, 2021.
Yotova, Polina, Supplementary European Search Report and Examiner Search Opinion for European Patent Application No. 17815970.3, dated Feb. 21, 2020.
Young, Lee W., International Searching Authority, Notification of Transmittal of the International Search Report and the Written Opinion of the International Searching Authority, or the Declaration for International Patent Application No. PCT/US2017/037846, dated Nov. 9, 2017.
Young, Lee W., International Searching Authority, Notification of Transmittal of the International Search Report and the Written Opinion of the International Searching Authority, or the Declaration for International Patent Application No. PCT/US2018/020812, dated Aug. 8, 2018.
Young, Lee W., Invitation to Pay Additional Fees And, Where Applicable, Protest Fee, dated Jun. 14, 2018 for International Application No. PCT/US2018/020812.
Young, Lee W., Notification of Transmittal of the International Search Report and the Written Opinion of the International Searching Authority, or the Declaration dated May 29, 2018 for International Patent Application No. PCT/US2018/018906.
Young, Lee W., Notification of Transmittal of the International Search Report and the Written Opinion of the International Searching Authority, or the Declaration for International Application No. PCT/US2011/057334, dated Mar. 22, 2012.
Garcia-Molina, H., Ullman, J., Widom, J., Database Systems: The Complete Book. Editorial Pearson Prentice Hall. Second Edition.
Gawinecki, Maciej, "How schema mapping can help in data integration?—integrating the relational databases with ontologies," ITC School, Computer Science, XXIII Cycle DII, University of Modena and Reggio Emilia, Italy, 2008.
Gillin, Paul, "Neo4j Connector Integrates Graph Data With Business Intelligence Tools," SiliconANGLE, Published Mar. 24, 2020, Retrieved from on Mar. 25, 2020.
Girma, Anteneh B., Final Office Action for U.S. Appl. No. 13/278,907, dated Apr. 18, 2013.
Ganti et al., U.S. Appl. No. 61/802,743, filed Mar. 18, 2013 and entitled, "Creating a Data Catalog by Mining Queries."
Ganti et al., U.S. Appl. No. 61/802,744, filed Mar. 18, 2013 and entitled, "Auto-Completion of Queries With Data Object Names and Data Profiles."
Garay, Peter, Examination Report No. 1 for Standard Patent Application for Australia Patent Application No. 2017282656 dated Jul. 21, 2021, Intellectual Property Office of Australia.
Girma, Anteneh B., Non-Final Office Action for U.S. Appl. No. 13/278,907, dated Jul. 25, 2012.
Grant, J., Beckett, D., "RDF Test Cases," W3C Recommendation, Feb. 10, 2004, Retrieved from the Internet [retrieved Mar. 7, 2019].
Griffith et al., "Aggregation of Ancillary Data Associated With Source Data in a System of Networked Collaborative Datasets," U.S. Appl. No. 15/927,006, filed Mar. 20, 2018.
Griffith et al., "Data Ingestion to Generate Layered Dataset Interrelations to Form a System of Networked Collaborative Datasets," U.S. Appl. No. 15/926,999, filed Mar. 20, 2018.
Griffith et al., "Extended Computerized Query Language Syntax for Analyzing Multiple Tabular Data Arrangements in Data-Driven Collaborative Projects," U.S. Appl. No. 16/036,834, filed Jul. 16, 2018.
Griffith et al., "Layered Data Generation and Data Remediation to Facilitate Formation of Interrelated Data in a System of Networked Collaborative Datasets," U.S. Appl. No. 15/927,004, filed Mar. 20, 2018.
Griffith et al., "Link-Formative Auxiliary Queries Applied at Data Ingestion to Facilitate Data Operations in a System of Networked Collaborative Datasets," U.S. Appl. No. 15/943,633, filed Apr. 2, 2018.
Griffith et al., "Localized Link Formation to Perform Implicitly Federated Queries Using Extended Computerized Query Language Syntax," U.S. Appl. No. 16/036,836, filed Jul. 16, 2018.
Griffith et al., "Transmuting Data Associations Among Data Arrangements to Facilitate Data Operations in a System of Networked Collaborative Datasets," U.S. Appl. No. 15/943,629, filed Apr. 2, 2018.
Griffith, David Lee, "Determining a Degree of Similarity of a Subset of Tabular Data Arrangements to Subsets of Graph Data Arrangements at Ingestion Into a Data-Driven Collaborative Dataset Platform," U.S. Appl. No. 16/137,297, filed Sep. 20, 2018.
Griffith, David Lee, "Matching Subsets of Tabular Data Arrangements to Subsets of Graphical Data Arrangements at Ingestion Into Data Driven Collaborative Datasets," U.S. Appl. No. 16/137,292, filed Sep. 20, 2018.
Griffith, David Lee, "Predictive Determination of Constraint Data for Application With Linked Data in Graph-Based Datasets Associated With a Data-Driven Collaborative Dataset Platform," U.S. Appl. No. 16/139,374, filed Sep. 24, 2018.
Haveliwala et al., "Evaluating Strategies for Similarity Search on the Web," Proceedings of the 11th international conference on World Wide Web, May 7-11, 2002, Honolulu, Hawaii, USA (ACM), p. 432-442.
Hayes, Patrick, "RDF Semantics," W3C Recommendation, Feb. 10, 2004, Retrieved from the Internet [retrieved Mar. 7, 2019].
Heflin, J., "OWL Web Ontology Language Use Cases and Requirements," W3C Recommendation, Feb. 10, 2004, Retrieved from the Internet [retrieved Mar. 7, 2019].
Henry, Jerome William, U.S. Appl. No. 61/515,305, filed Aug. 4, 2011 entitled, "Apparatus and Method for Supplying Search Results With a Knowledge Card."
Hoang, Hau Hai, Final Office Action dated Jul. 30, 2019 for U.S. Appl. No. 15/186,515.
Hoang, Hau Hai, Final Office Action dated Nov. 26, 2018 for U.S. Appl. No. 15/186,515.
Hoang, Hau Hai, Non-Final Office Action dated Apr. 16, 2019 for U.S. Appl. No. 15/186,515.
Hoang, Hau Hai, Non-Final Office Action dated May 3, 2018 for U.S. Appl. No. 15/186,515.
Hoang, Hau Hai, Notice of Allowance and Fee(s) Due dated Aug. 19, 2021 for U.S. Appl. No. 16/697,132.

(56) References Cited

OTHER PUBLICATIONS

Htay, Lin Lin M., Non-Final Office Action dated Sep. 14, 2018 for U.S. Appl. No. 15/186,516.
Htay, Lin Lin M., Notice of Allowance and Fee(s) Due and Notice of Allowability for U.S. Appl. No. 15/186,516, dated Jan. 25, 2019.
Hu, Xiaoqin, Final Office Action dated Apr. 5, 2019 for U.S. Appl. No. 15/454,969.
Hu, Xiaoqin, Final Office Action dated Apr. 5, 2019 for U.S. Appl. No. 15/454,981.
Hu, Xiaoqin, Final Office Action dated Oct. 31, 2019 for U.S. Appl. No. 15/454,969.
Hu, Xiaoqin, Final Office Action dated Sep. 24, 2019 for U.S. Appl. No. 15/454,981.
Hu, Xiaoqin, Non-Final Office Action for U.S. Appl. No. 15/454,969 dated Dec. 7, 2018.
Hu, Xiaoqin, Non-Final Office Action for U.S. Appl. No. 15/454,981 dated Dec. 12, 2018.
Hu, Xiaoqin, Non-Final Office Action dated Aug. 1, 2019 for U.S. Appl. No. 15/454,981.
Hu, Xiaoqin, Non-Final Office Action dated Jul. 26, 2019 for U.S. Appl. No. 15/454,969.
Hu, Xiaoqin, Non-Final Office Action dated Jul. 30, 2021 for U.S. Appl. No. 16/732,261.
Hu, Xiaoqin, Non-Final Office Action dated Sep. 2, 2021 for U.S. Appl. No. 16/732,263.
J. Perez, M. Arenas, C. Gutierrez, "Semantics and Complexity of Sparql," ACM Transactions on Database Systems (TODS), Vo. 34, No. 3, Article 16, Publication Date: Aug. 2009.
Jacob et al., "Collaborative Dataset Consolidation via Distributed Computer Networks," U.S. Appl. No. 16/120,057, filed Aug. 31, 2018.
Jacob et al., "Collaborative Dataset Consolidation via Distributed Computer Networks," U.S. Appl. No. 16/287,967, filed Feb. 27, 2019.
Jacob et al., "Dataset Analysis and Dataset Attribute Inferencing to Form Collaborative Datasets," U.S. Appl. No. 16/271,263, filed Feb. 8, 2019.
Jacob et al., "Dataset Analysis and Dataset Attribute Inferencing to Form Collaborative Datasets," U.S. Appl. No. 16/292,120, filed Mar. 4, 2019.
Jacob et al., "Management of Collaborative Datasets via Distributed Computer Networks," U.S. Appl. No. 16/271,687, filed Feb. 8, 2019.
Jacob et al., "Management of Collaborative Datasets via Distributed Computer Networks," U.S. Appl. No. 16/292,135, filed Mar. 4, 2019.
Jacob et al., "Platform Management of Integrated Access of Public and Privately-Accessible Datasets Utilizing Federated Query Generation and Schema Rewriting Optimization," International Patent Application No. PCT/US2018/018906 filed Feb. 21, 2018.
Jacob et al., "Query Generation for Collaborative Datasets," U.S. Appl. No. 16/395,043, filed Apr. 25, 2019.
Jacob et al., "Query Generation for Collaborative Datasets," U.S. Appl. No. 16/395,049, filed Apr. 25, 2019.
Joshi, Amit Krishna et al., "Alignment-based Querying of Linked Open Data," Lecture Notes in Computer Science, 7566, 807-824, 2012.
Kahn, Yasar et al., "Safe: Policy Aware SPARQL Query Federation Over RDF Data Cubes," Proceedings of the 7th International Workshop on Semantic Web Applications and Tools for Life Sciences, Berlin, Germany, Dec. 9-11, 2014.
Khong, Alexander, Non-Final Office Action for U.S. Appl. No. 15/165,775, dated Jun. 14, 2018.

\* cited by examiner

COMPUTERIZED TOOLS CONFIGURED TO DETERMINE SUBSETS OF GRAPH DATA ARRANGEMENTS FOR LINKING RELEVANT DATA TO ENRICH DATASETS ASSOCIATED WITH A DATA-DRIVEN COLLABORATIVE DATASET PLATFORM

CROSS-REFERENCE TO APPLICATIONS

This application is a continuation application of copending U.S. patent application Ser. No. 16/395,036, filed on Apr. 25, 2019 and titled, "COMPUTERIZED TOOLS CONFIGURED TO DETERMINE SUBSETS OF GRAPH DATA ARRANGEMENTS FOR LINKING RELEVANT DATA TO ENRICH DATASETS ASSOCIATED WITH A DATA-DRIVEN COLLABORATIVE DATASET PLATFORM," U.S. patent application Ser. No. 13/395,036 is a continuation-in-part application of U.S. patent application Ser. No. 15/454,923, filed on Mar. 9, 2017, and titled "COMPUTERIZED TOOLS TO DISCOVER, FORM, AND ANALYZE DATASET INTERRELATIONS AMONG A SYSTEM OF NETWORKED COLLABORATIVE DATASETS," U.S. patent application Ser. No. 13/395,036 is also a continuation-in-part application of U.S. patent application Ser. No. 15/926,999, filed on Mar. 20, 2018, and titled "DATA INGESTION TO GENERATE LAYERED DATASET INTERRELATIONS TO FORM A SYSTEM OF NETWORKED COLLABORATIVE DATASETS," U.S. patent application Ser. No. 13/395,036 is also a continuation-in-part application of U.S. patent application Ser. No. 15/927,004, filed on Mar. 20, 2018, and titled "LAYERED DATA GENERATION AND DATA REMEDIATION TO FACILITATE FORMATION OF INTERRELATED DATA IN A SYSTEM OF NETWORKED COLLABORATIVE DATASETS," U.S. patent application Ser. No. 13/395,036 is also a continuation-in-part application of U.S. patent application Ser. No. 15/985,702, filed on May 22, 2018, and titled "COMPUTERIZED TOOLS TO DEVELOP AND MANAGE DATA-DRIVEN PROJECTS COLLABORATIVELY VIA A NETWORKED COMPUTING PLATFORM AND COLLABORATIVE DATASETS," U.S. patent application Ser. No. 13/395,036 is also a continuation-in-part application of U.S. patent application Ser. No. 15/985,704, filed on May 22, 2018, and titled "COMPUTERIZED TOOLS TO FACILITATE DATA PROJECT DEVELOPMENT VIA DATA ACCESS LAYERING LOGIC IN A NETWORKED COMPUTING PLATFORM INCLUDING COLLABORATIVE DATASETS," U.S. patent application Ser. No. 13/395,036 is also a continuation-in-part application of U.S. patent application Ser. No. 16/137,292, filed on Sep. 20, 2018, and titled "MATCHING SUBSETS OF TABULAR DATA ARRANGEMENTS TO SUBSETS OF GRAPHICAL DATA ARRANGEMENTS AT INGESTION INTO DATA DRIVEN COLLABORATIVE DATASETS," and U.S. patent application Ser. No. 13/395,036 is also a continuation-in-part application of U.S. patent application Ser. No. 16/137,297, filed on Sep. 20, 2019, and titled "DETERMINING A DEGREE OF SIMILARITY OF A SUBSET OF TABULAR DATA ARRANGEMENTS TO SUBSETS OF GRAPH DATA ARRANGEMENTS AT INGESTION INTO A DATA-DRIVEN COLLABORATIVE DATASET PLATFORM," all of which are herein incorporated by reference in their entirety for all purposes.

FIELD

Various embodiments relate generally to data science and data analysis, computer software and systems, and wired and wireless network communications to interface among repositories of disparate datasets and computing machine-based entities configured to access datasets, and, more specifically, to a computing and data storage platform to implement computerized tools to identify data classifications and similar subsets of graph-based data arrangements with which to join, according to at least some examples.

BACKGROUND

Advances in computing hardware and software have fueled exponential growth in the generation of vast amounts of data due to increased computations and analyses in numerous areas, such as in the various scientific and engineering disciplines, as well as in the application of data science techniques to endeavors of good-will (e.g., areas of humanitarian, environmental, medical, social, etc.). Also, advances in conventional data storage technologies provide an ability to store an increasing amount of generated data. Consequently, traditional data storage and computing technologies have given rise to a phenomenon in which numerous desperate datasets have reached sizes and complexities that tradition data-accessing and analytic techniques are generally not well-suited for assessing conventional datasets.

Conventional technologies for implementing datasets typically rely on different computing platforms and systems, different database technologies, and different data formats, such as CSV, TSV, HTML, JSON, XML, etc. Known data-distributing technologies are not well-suited to enable interoperability among datasets. Thus, many typical datasets are warehoused in conventional data stores, which are known as "data silos." These data silos have inherent barriers that insulate and isolate datasets. Further, conventional data systems and dataset accessing techniques are generally incompatible or inadequate to facilitate data interoperability among the data silos. Various, ad hoc and non-standard approaches have been adopted, but each standard approach is driven by different data practitioners each of whom favor a different, personalized process.

As graph-based data structures grow at increasing rates (e.g., at arithmetical or exponential rates), the complexity with which to match data between a newly-uploaded dataset and previously-uploaded datasets increases correspondingly. Typically, datasets of various types of formats, such as CSV, TSV, HTML, JSON, XML, etc., require additional processing, including manual intervention, to identify related datasets that may be disposed, for example, in graph-based data arrangements. For instance, some conventional data formats are designed for relational database architectures, which generally known for being difficult to scale as data and related datasets increase in size. As such, relational databases of large sizes are not well-suited for expeditiously identifying classes or types of data over large-scaled data arrangements with which to join a newly-added dataset.

Furthermore, for any particular class or type of data, there may be numerous subsets of related data that describe attributes of a similar class. For example, a column of zip code data may be relatable to hundreds of thousands or millions (or greater) of subsets of data in one or more graph data arrangements, whereby the subsets of data may be disposed in corresponding graph datasets. Conventional filtering or data identification techniques (e.g., for relational databases) are generally suboptimal in identifying a number of suitable datasets with which to join. Further, traditional dataset formation and analysis are not well-suited to reduce efforts by data scientists and data practitioners to interact with data, among others, when performing complex data operations via a user interface ("UI"). Thus, what is needed is a solution for facilitating techniques to optimize data operations applied to datasets, without the limitations of conventional techniques.

BRIEF DESCRIPTION OF THE DRAWINGS

Various embodiments or examples ("examples") of the invention are disclosed in the following detailed description and the accompanying drawings.

DETAILED DESCRIPTION

Various embodiments or examples may be implemented in numerous ways, including as a system, a process, an apparatus, a user interface, or a series of program instructions on a computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims, and numerous alternatives, modifications, and equivalents thereof. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
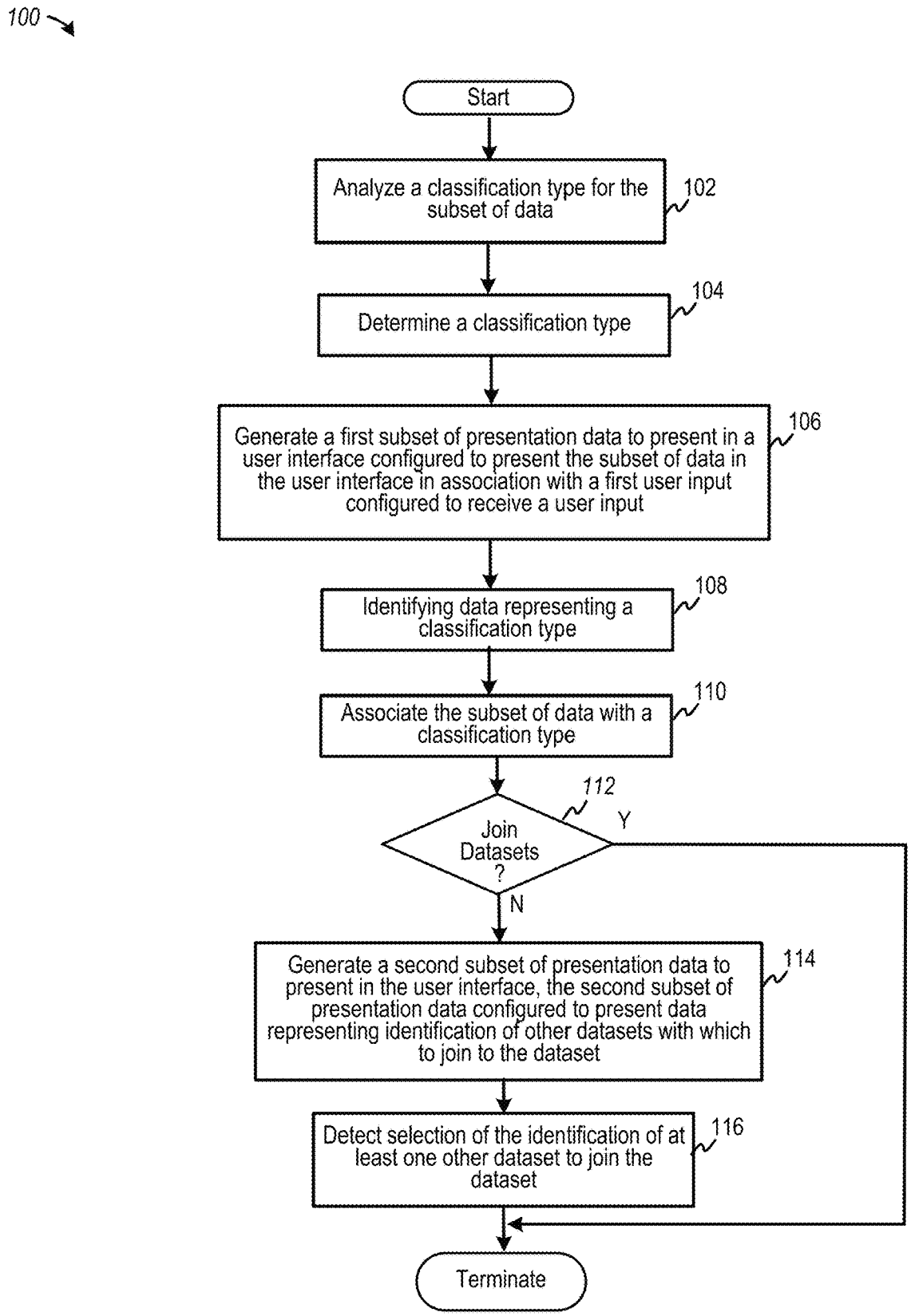
FIG. 1 is a flow diagram depicting an example of identifying relevant data in subsets of graph data arrangements for linking the relevant data to enrich a dataset via one or more linked datasets, according to some embodiments.

FIG. 1 is a flow diagram depicting an example of identifying relevant data in subsets of graph data arrangements for linking the relevant data to enrich a dataset via one or more linked datasets, according to some embodiments. Flow diagram 100 may be implemented in association with a computing platform, such as a collaborative dataset consolidation system. Further, flow diagram 100 may be facilitated via computerized tools including a data project interface, which may be configured to initiate and/or execute instructions to identify and join data of a dataset (e.g., an ingested dataset), such as a table, that may be relevant with one or more linked datasets stored in a graph-based data arrangement.

According to various examples, flow 100 may be directed to analyzing data in a tabular data arrangement, such as a spreadsheet data file including one or more tables in which data are disposed in rows and columns, to match against data (e.g., subsets of data) disposed in graph data arrangements. In some cases, flow 100 may facilitate matching data in a tabular data arrangement, such as a column of data, against data in a graphical data arrangement, the graph-based data format configured to reduce or negate complexities and limitations of other data arrangements, such as relational database architectures.

Flow 100 describes one or more functionalities and/or subprocesses to determine a classification (e.g., classification type) for a column of data in a table-based dataset based on determining classification types for subsets of graph-based data. An example of a "classification type" is zip code data. By determining one or more classifications (e.g., classes or sub-classes) of data, relevant subsets of graph-based data may be identified to enrich a dataset. For example, a column may include three (3)-letter country codes that may be determined to match a classification type that complies with "ISO 3166-1 alpha-3 codes," as maintained by the International Organization for Standardization ("ISO"). In at least one example, a classification type for columnar data in a column of data may be determined to identify which subsets of data in a graph data arrangement match an equivalent type or class of data. A classification type may be described as a "classification," or an "entity class," under which data may be categorized. Examples of classification types include postal zip codes, industry sector codes, such as NACIS ("North American Cartographic Information Society") codes or SIC ("Standard Industrial Classification") codes, country codes (e.g., two-character, three-character, etc.), airport codes, animal taxonomies (e.g., classifications of "fish" or any other animal), state codes (e.g., two-letter abbreviation, such as TX for Texas, etc.), medical codes, such as ICD ("International Classification of Diseases") codes, including the ICD-10-CM revision, airport codes, such as three-letter "IATA" codes defined by the International Air Transport Association, and the like. The above-described examples regarding classification are non-limiting, and a classification type or entity class of data may describe any type of data that can be categorized, such as any data set forth in an ontology (e.g., data defining categories, properties, data relationships, concepts, entities, etc.). An example of one type of ontology is an ontology created using the W3C Web Ontology Language ("OWL"), as a semantic web language, regardless whether the ontology is open source, publicly-available, private, or proprietary (e.g., an organizationally-specific ontology, such as for use in a corporate entity).

Flow 100 also describes one or more functionalities and/or subprocesses to determine subsets of graph-based data that may be optimally relevant to a column of data upon which to join datasets in a graph data arrangement to columnar data of a table-based data arrangement. In some examples, determining degrees of similarity based on classification types may enhance accuracy in the determination of the computed degrees of similarity, which, in turn, may influence selection of joining a specific portion of graph data arrangement to data in a table or ingested data set (e.g., yet to be classified and/or jointed). In at least some cases, degrees of joinability and/or similarity may be distinguished by ranking, prioritization, or the like, so as to reduce or negate obscuring selections of graph-based datasets in view of the very large numbers of linked datasets in a graph data arrangement.

At 102, data representing a request to present a subset of data of a dataset in a user interface may be received for analysis. The subset of data may be columnar data ingested as a table. In some examples, a term "ingested" may reference data that may be ingested into a collaborative dataset consolidation system in a form in which at least one column may be analyzed to classify data and/or may be used to join datasets. Hence, "ingested" need not be limited to describe data that are contemporaneously uploaded into a collaborative dataset consolidation system. Thus, ingested data may refer to table-based data converted into graph-based data in which at least a subset of the data may be analyzed, matched, and/or joined regardless with uploaded. As such, a subset of data may be identified as an ingested dataset, whereby the data is associated with an unclassified dataset (e.g., a column of data yet to be classified, confirmed classified, and/or joined). A subset of data may originate from a tabular data arrangement or a virtual tabular data arrangement, which may be associated with a "virtual dataset" described in FIG. 10, as an example.

At 102, a subset of data may be analyzed to determine a classification type. In some examples, a classification may be determined or identified by computing a compressed data representation that may be matched against one or more reference compressed data representations that are each associated with a classification type. A match filter may be configured to receive a compressed data representation, responsive to a user input (in some examples), for a column of data to determine a specific classification type associated with the match filter.

At 104, a classification type may be determined based on matched classification data. In some examples, a number of compressed data representations may be identified, whereby each compressed data representation may be associated with a subset of graph-based data in a graph data arrangement. In at least one implementation, predicting a classification type may include executing instructions to filter a number of compressed data representations, and matching a computed compressed data representation for a subset of data (e.g., column of data) to at least one compressed data representation. Determining a classification type may include predicting a classification type by, for example, applying data to a Bloom filter, according to some examples.

At 106, presentation data (e.g., a first subset of presentation data) may be generated to present in a user interface, whereby the generated presentation data may be configured to present (e.g., display) a subset of data in a user interface in association with one or more user inputs (e.g., one or more first user inputs). In some examples, a graphical element may be presented on a graphical data interface associated with a visual representation of a tabular data arrangement, which may converted to a data formatted suitable and/or interchangeable with a graph data arrangement. The graphical element may identify a subset of columnar data that may be classified in accordance with other subsets of graph data each of which is associated with a classification type. In some examples, the graphical element may be a selectable user input represented as an icon (e.g., a colored-triangular graphical element).

At 108, a selection of a user input may be detected. For example, an icon associated with a column of data may be selected for determining (e.g., confirming) a classification type. At 110, a subset of data may be associated with a specific classification type. For example, data representing selection of a classification type may be received in response to an activated user input at a user interface. An identified classification type may be associated with a subset of data based on, for example, a reference classification type, which may be matched to at least one compressed data representation. Matched data then may be linked or otherwise joined to any number of datasets in a "corpus" of graph-based datasets at 112-116, for example. Matching a compressed data representation, as a digital signature, may preserve computational resources that otherwise may be used to perform per-cell matching computation (or relational data-based-based calculations) rather at a subset (or column) level. In some examples, graphical element may be overlaid or otherwise associated with presented data values to indicate a data value is linked, or may be linked, to other subsets of data. As shown in FIG. 3, such a graphical element may be an elliptical "bubble," or may be any other visually distinguishable graphical element. Examples of determining a classification type are described in association with FIGS. 2-3, 6-7, among others. In at least one implementation, a subset characterizer 757 of FIG. 7 may be configured to facilitate determinations of classification.

At 112, a determination is made as to whether to join a dataset with one or more other datasets. At 114, presentation data (e.g., a second subset of presentation data) may be generated for presentation (e.g., display) in a user interface. Data representing a user input to join a subset of a portion of graph data (e.g., a ranked subset of data) to a dataset may be presented. In some implementations, the presentation data may be configured to present data representing identification of other datasets with which to join to a dataset as a function, for example, of a degree of joinability. In some examples, a similarity matrix for a subset of data (e.g., a column) may be generated to determine a "degree of joinability" with portions or subsets of a graph data arrangement. To determine a "degree of joinability," flow 100 may perform one or more the following at 114. A number of other similarity matrices may be accessed, whereby each of the other similar matrices may be formed to identify an amount of relevant data associated with a portion of data in a graph data arrangement. The similarity matrix may be analyzed against the number of other similarity matrices to compute degrees of similarity. Then, based on one or more degrees of similarity, portions (or subsets) of a graph data arrangement may be ranked (or prioritized, etc.) based on the degrees of similarity to form ranked graph data.

Further, analysis of compressed data (e.g., target compressed data) using a similarity matrix may preserve computational resources that otherwise may be used to perform per-cell matching rather at a subset (or column) level when determining whether to join datasets, according to some embodiments. In some examples, determining degrees of similarity based on class types of categories (or classification at 108) may enhance accuracy in the determination of the computed degrees of similarity, which, in turn, may influence selection of joining a specific portion of a graph data arrangement to a column of data. In at least some cases, degrees of joinability and/or similarity may be distinguished by ranking, prioritization, or the like, so as to reduce or negate obscuring selections of graph-based datasets in view of the very large numbers of linked datasets in a graph data arrangement.

At 116, a selection of to identify at least one other dataset to join a dataset including a column of data may be detected. For example, a selection of a user input of one or more user inputs to join may be detected. In response, a subset of data (or column of data) may be linked to at least one subset of a graph data arrangement. Examples of joining datasets are described in association with FIGS. 4-5, 8-9, among others. In at least one implementation, a dataset joinability analyzer 960 of FIG. 9 may be configured to facilitate determinations of degrees of joinability.

Figure 2:
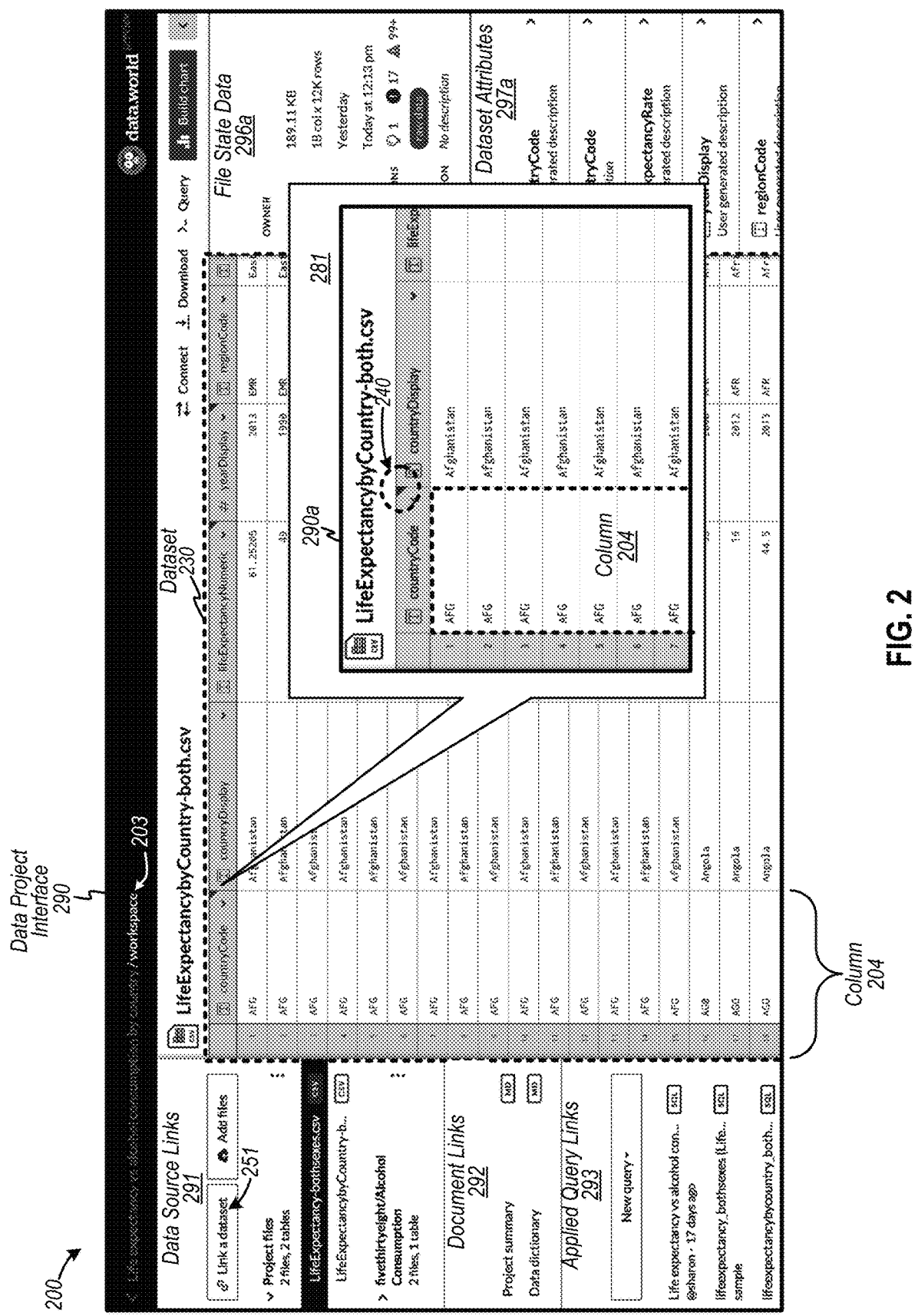
FIG. 2 is an example of a data project interface implementing a computerized tool configured to at least import, inspect, analyze, and modify data of a data source as a dataset, according to some examples.
Figure 3:
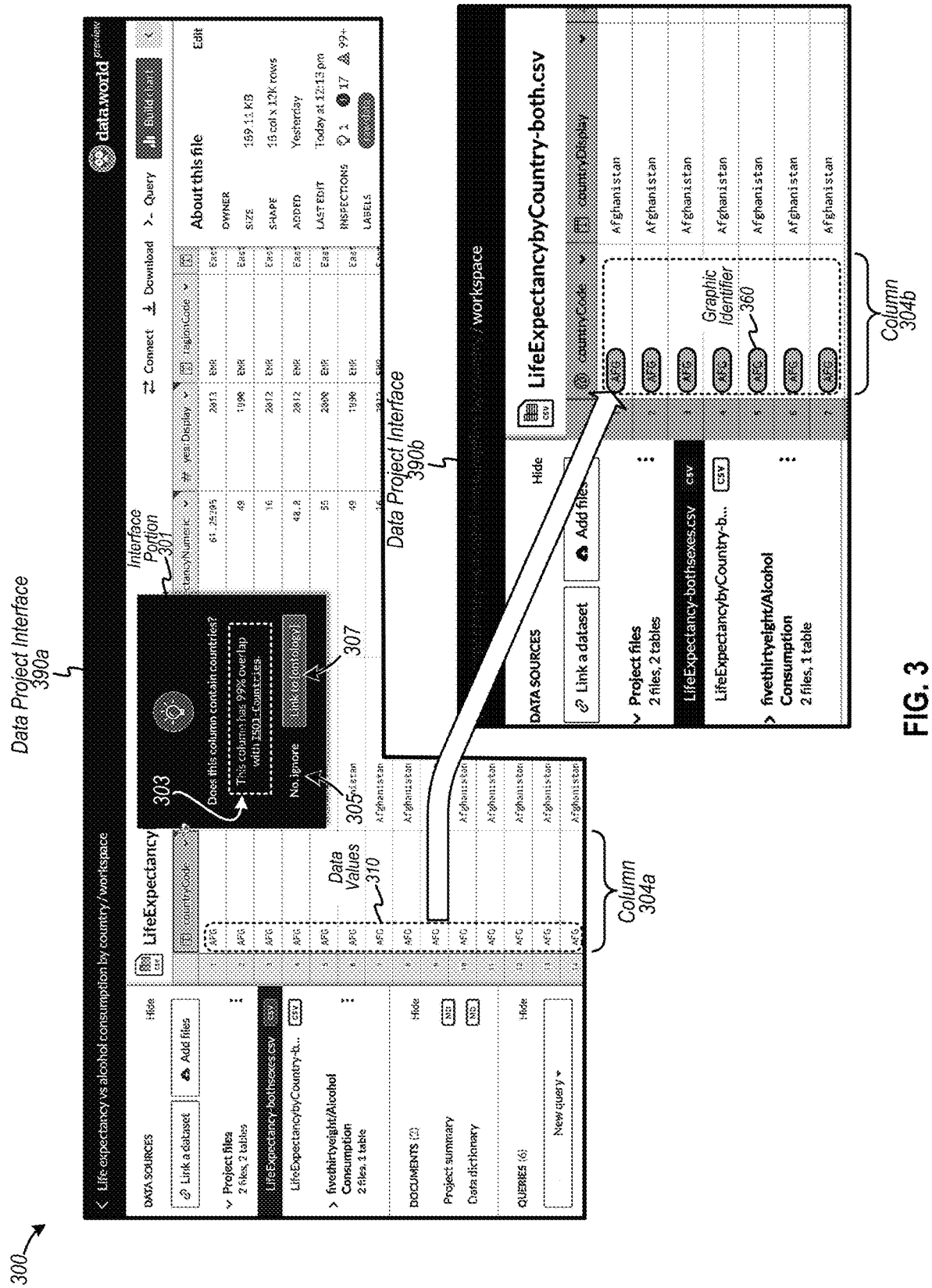
FIG. 3 is an example of a data project interface implementing a computerized tool configured to classify a subset of columnar data relative to graph data, according to some examples.

FIG. 2 is an example of a data project interface implementing a computerized tool configured to at least import, inspect, analyze, and modify data of a data source as a dataset, according to some examples. Diagram 200 includes a data project interface 290 that includes an example of a workspace directed to presenting a data source in a tabular data arrangement, which may be presented as a dataset 230. Dataset 230 may be a graph data arrangement presented in tabular form having rows and columns, which includes data (e.g., data values) that each corresponds to at least one data point (e.g., a node) in a corresponding graph data arrangement (not shown). As shown, data project interface 290 includes an interface portion, such as a contextual user interface portion that includes one or more of an interface portion presenting data source links 291, an interface portion presenting document links 292, an applied query links 293, file state data 296a, and data attributes 297a. Also, data project interface 290 may include an interface portion to present a dataset 230. Data source links 291 may include a user input 251 configured to import or otherwise associate a dataset with a data project identifier 203 (e.g., "Life expectancy vs alcohol consumption by country/workspace," as a data project). As shown in inset 281, a portion 290a of data project interface 290 may include a column 204 that may be associated with a graphical data representation, such as icon 240 that may indicate data values in column "countryCode" may be classifiable as a specific class of data, such as a three (3)-letter country codes that comports with "ISO 3166-1 alpha-3 code" formats.

One or more subprocesses described in FIG. 1 and in other figures may be performed commensurate coextensive with data ingestion, or may be performed at any time thereafter, including, but not limited to activation of a user input. Examples of may include similar or equivalent structures and/or functionalities of a dataset analyzer and an inference engine as described in U.S. patent application Ser. No. 15/985,702, filed on May 22, 2018, titled "Computerized Tools to Develop and Manage Data-Driven Projects Collaboratively via a Networked Computing Platform and Collaborative Datasets Data in a System of Networked Collaborative Datasets," which is herein incorporated by reference.

FIG. 3 is an example of a data project interface implementing a computerized tool configured to classify a subset of columnar data relative to graph data, according to some examples. Diagram 300 includes a data project interface 390a presenting a user input to classify a subset of data responsive, for example, to a selection of an icon 240 of FIG. 2. Referring back to FIG. 3, an interface portion 301 may include a user input 307 to identify data values 310 in column 304a as a specific class of data. As shown, interface portion 301 describes, predicts, or recommends that data values 310 may refer to country codes that comports with "ISO 3166-1 alpha-3 code" formats. In one example, activation of user input 307 may indicates that data in column 304a are country codes. After activation of user input 307, another interface portion 390b of data project interface may depict data values 310 as being associated with graphic identifiers 360 in column 304b, whereby graphic identifiers 360 indicate classified data that may be linkable to other datasets. Or, user input 305 may be activated to disassociate data values 310 from a predicted classification as country codes. According to some examples, activation of user input 307 may be omitted and an algorithm may automatically predicting classify data values 310 as country codes. In some examples, user input activations and data exchanges via a network protocol may invoke one or more functionalities of a collaborative dataset consolidation system, including, but not limited to, activation of a subset characterizer as set forth herein.

Figure 4:
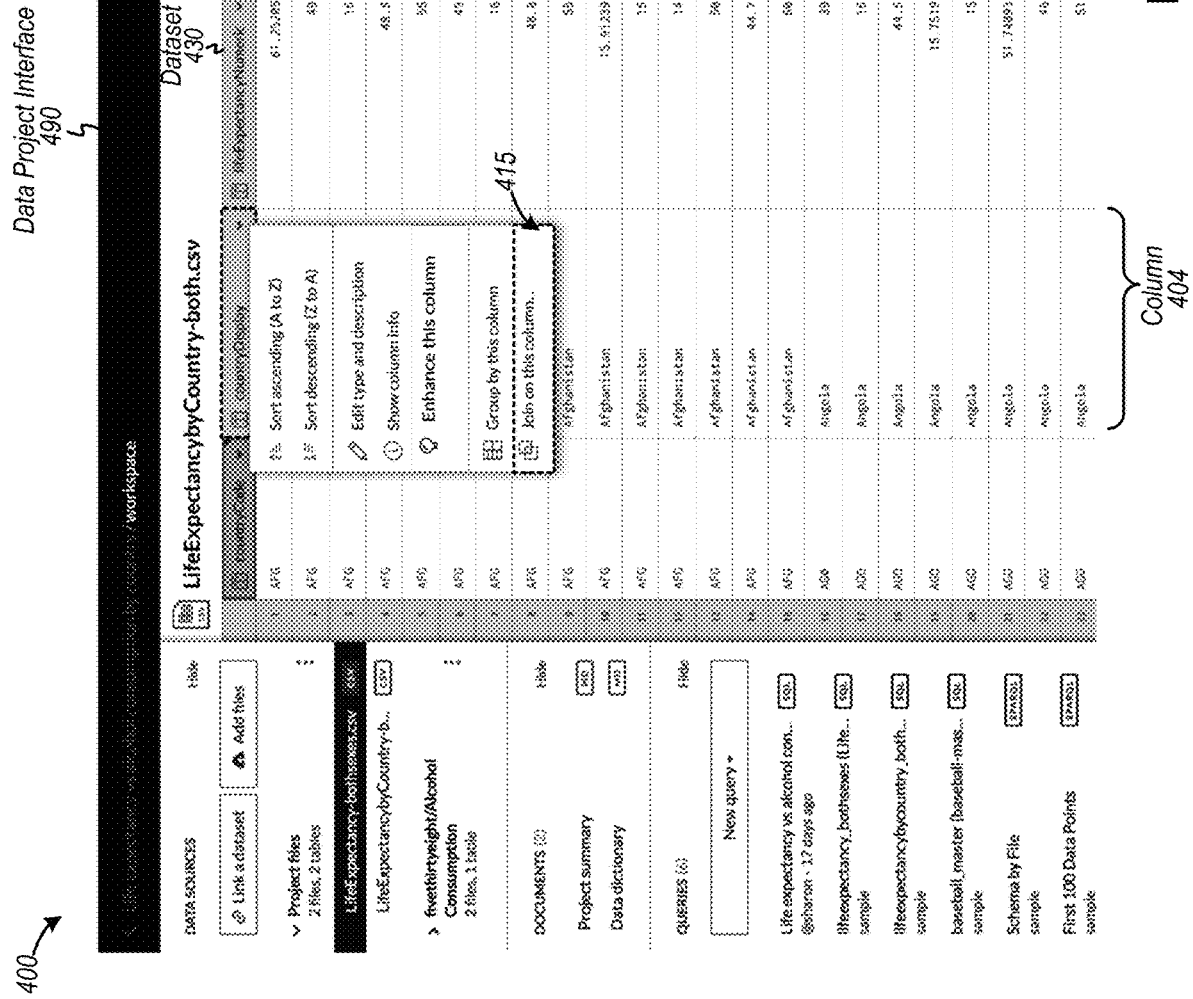
FIG. 4 is an example of a data project interface implementing a computerized tool configured to join a subset of columnar data to graph data, according to some examples.

FIG. 4 is an example of a data project interface implementing a computerized tool configured to join a subset of columnar data to graph data, according to some examples. Diagram 400 includes a data project interface 490 presenting a user input to join one or more dataset store in a graph data arrangement based on data in column 404. In this example, a user input 415 may be activated to join dataset 430 via columnar data 404 to one or more other datasets.

Figure 5:
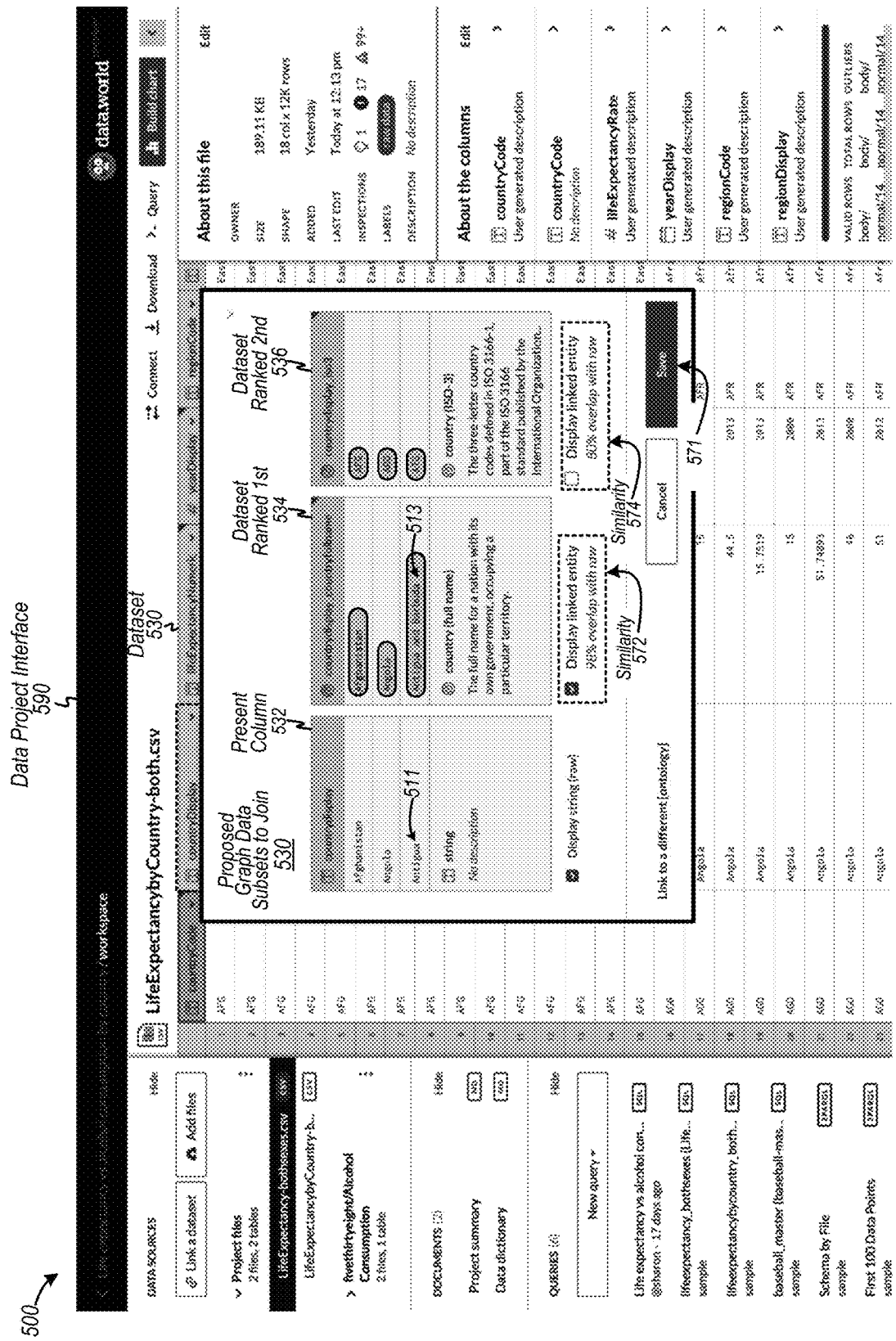
FIG. 5 is an example of a data project interface implementing a computerized tool configured to present relevant datasets with to join as a function of data similarity, according to some examples.

FIG. 5 is an example of a data project interface implementing a computerized tool configured to present relevant datasets with to join as a function of data similarity, according to some examples. Diagram 500 may include a data project interface 590 that may be configured to present a user input to join one or more datasets stored in a graph data arrangement based on, for example, data in column 504. In this example, a user input (e.g., user input 415 of FIG. 4) may be activated to present data representations in interface portion 530 at data project interface 590. As shown, interface portion 530 includes proposed graph data subsets to join, and may indicate subsets of data in a graph data arrangement that may be optimally similar or equivalent (e.g., includes similar data or data classifications, and/or graph-based dataset including similar or equivalent amounts of data values). In this example, interface portion presents a classification type of a present column 504 (e.g., current data values of a column) as data representation 532 in which data in column 504 is described as text data, including text representing a country name ("Antigua") 511.

Interface portion 530 also includes a subset of graph data identified as a dataset 534, which is associated with a first ranking (e.g., a highest rank), as well as another subset of graph data identified as dataset 536 (e.g., a next highest ranking). In some examples, a ranking or priority may be expressed in a degree of similarity, such as similarity 572 (e.g., a degree of similarity of 98%) and similarity 574 (e.g., a degree of similarity of 80%), according to some embodiments. Note that the degrees of similarity expressed in interface portion 530 indicate, in at least some examples, of the amount of overlap or similarity for a type of data (e.g., classification type of data). According to various embodiments, degrees of similarity 572 and 574 may imply or express degrees of joinability (not shown) of datasets that include data in subsets 534 and 536 of graph-based data. In the example shown, data including subset of data 534 may be more relevant (e.g., having higher degree of joinability) to dataset 530 than subset of data 536 because data value 511 (e.g., text representation for "Antigua") may be relevant to a dataset of full country names, as designated by data value ("Antigua and Barbuda") 513. Moreover, proposed data in subset 536 include country codes and have lower amount of overlap (e.g., 80%), and may be less likely to be relevant. According to some examples, a dataset including subset of data 534 may be ranked higher to join with a dataset (e.g., an ingested dataset) including a column of data 532. Hence, a user input 571 may be activated to join one or more portions of a dataset associated with subset of data 534 to one or more portions of dataset 530. In some examples, user input activations and data exchanges via a network protocol may invoke one or more functionalities of a collaborative dataset consolidation system, including, but not limited to, activation of a dataset joinability analyzer as set forth herein.

Figure 6:
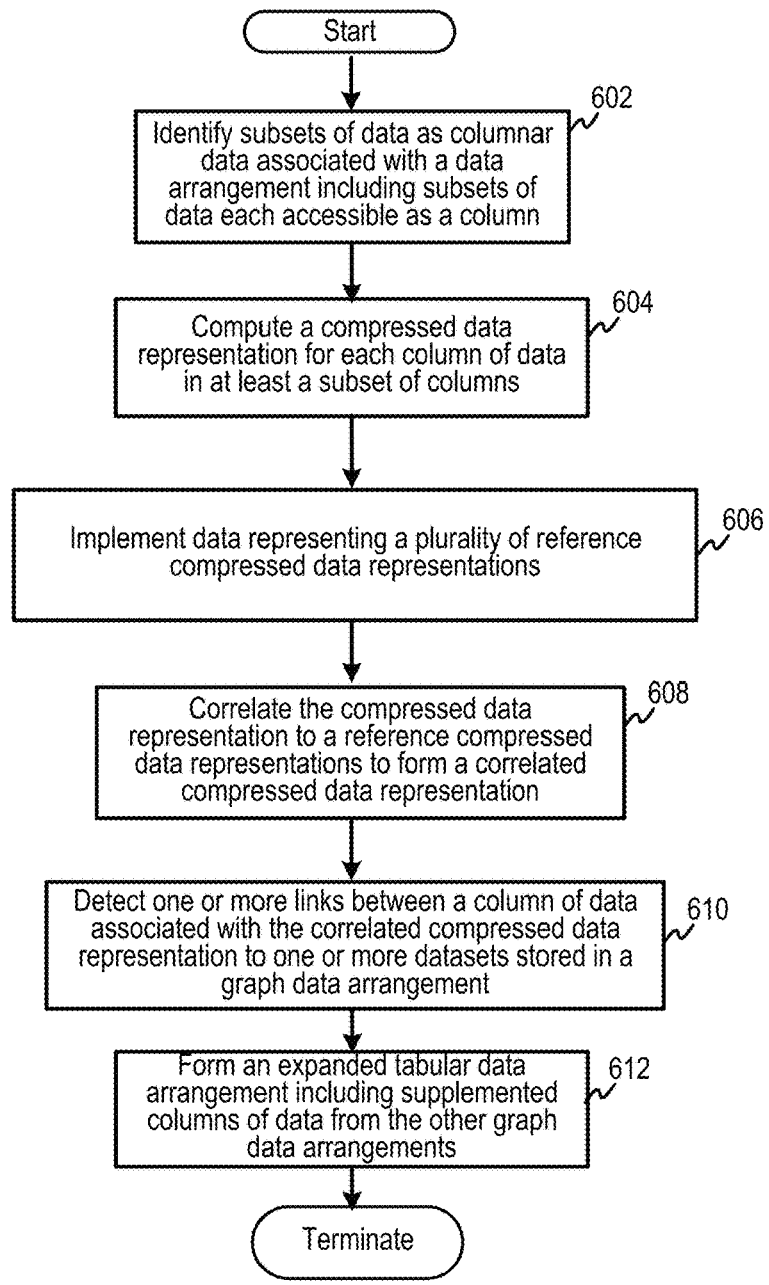
FIG. 6 is a flow diagram depicting an example of identifying relevant data of an ingested dataset with one or more linked datasets, according to some embodiments.

FIG. 6 is a flow diagram depicting an example of identifying relevant data of an ingested dataset with one or more linked datasets, according to some embodiments. In some examples, flow diagram 600 may be implemented in association with a computing platform, such as a collaborative dataset consolidation system. Further, flow diagram 600 may be facilitated via computerized tools including a data project interface, which may be configured to initiate and/or execute instructions to identify data of an ingested dataset, such as a table, that may be relevant with one or more linked datasets stored in a graph-based data arrangement.

At 602, one or more subsets of data associated with a data arrangement may be identified at (or approximate to) ingestion into a computing platform, such as (but not limited to) a collaborative dataset consolidation system. In some examples, a tabular data arrangement may be ingested into the computing platform, whereby subsets of data in the table may constitute columnar data (e.g., data disposed in a column, or otherwise may be associated with links to transform the data into columns for corresponding subsets of data). Further, a compressed data representation for a subset of data (e.g., a column of data) may be computed at 604.

A compressed data representation, as a uniquely compact data value, may be indicative of a classification type to which columnar data may be associated. At 606, data representing a plurality of reference compressed data representations may be implemented (e.g., in a data filter structure). In some examples, subsets of data relating to linked datasets (e.g., semantically-linked datasets) stored in a graph-based data arrangement may be each associated with a compressed data representation, which may be referred to as a reference compressed data representation. A reference compressed data representation may be used to identify whether relevant data of an ingested dataset may be relevant with one or more linked datasets stored in a graph database. In some examples, a compressed data representation and a reference compressed data representation may be derived via one or more hash functions to implement one or more Bloom filters.

At 608, a compressed data representation generated for an ingested dataset may be correlated to one or more reference compressed data representations to form correlated compressed data representation. In at least some examples, a compressed data representation may include a hash value generated by one or more hash functions, and the compressed data representation may be correlated against a data structure (e.g., a probabilistic data structure, such as a Bloom filter) that may be configured to include data representing multiple reference compressed data representations. Comparing the compressed data representation against the data structure may generate a result indicating a likelihood that a value of the compressed data representation may be matched to reference compressed data representation. According to some examples, a compressed data representation may be implemented as a digital signature indicative of the type (e.g., classification type) of data in a subset of data (e.g., a column of data).

At 610, one or more links may be detected between a column of data (e.g., a column of data associated with a correlated compressed data representation) and one or more graph-based datasets stored in a graph data arrangement. Thus, a column of data in a tabular data arrangement may be compared against subsets of data disposed in graph data arrangements to thereby facilitate enrichment of a tabular data arrangement using data stored in graph-based data arrangements (e.g., RDF-based graphs, NoSQL data arrangements, etc.). As graph-based data arrangements may scale effectively in greater sizes, reference compressed data representations of subsets of data in graph-based data arrangements enable a greater amount of datasets to be identified with a tabular column of data for enrichment of an ingested dataset. Note that the one or more links to graph-based datasets may be linkable to other graph data arrangements, thereby enabling further expansion and enrichment of an ingested dataset. At 612, an expanded tabular data arrangement may be enriched by including one or more supplemented columns of data from graph data arrangements that have detected links between a subset of data (associated with a compressed data representation) and other subsets of data (associated with at least a subset of correlatable compressed data representations).

Figure 7:
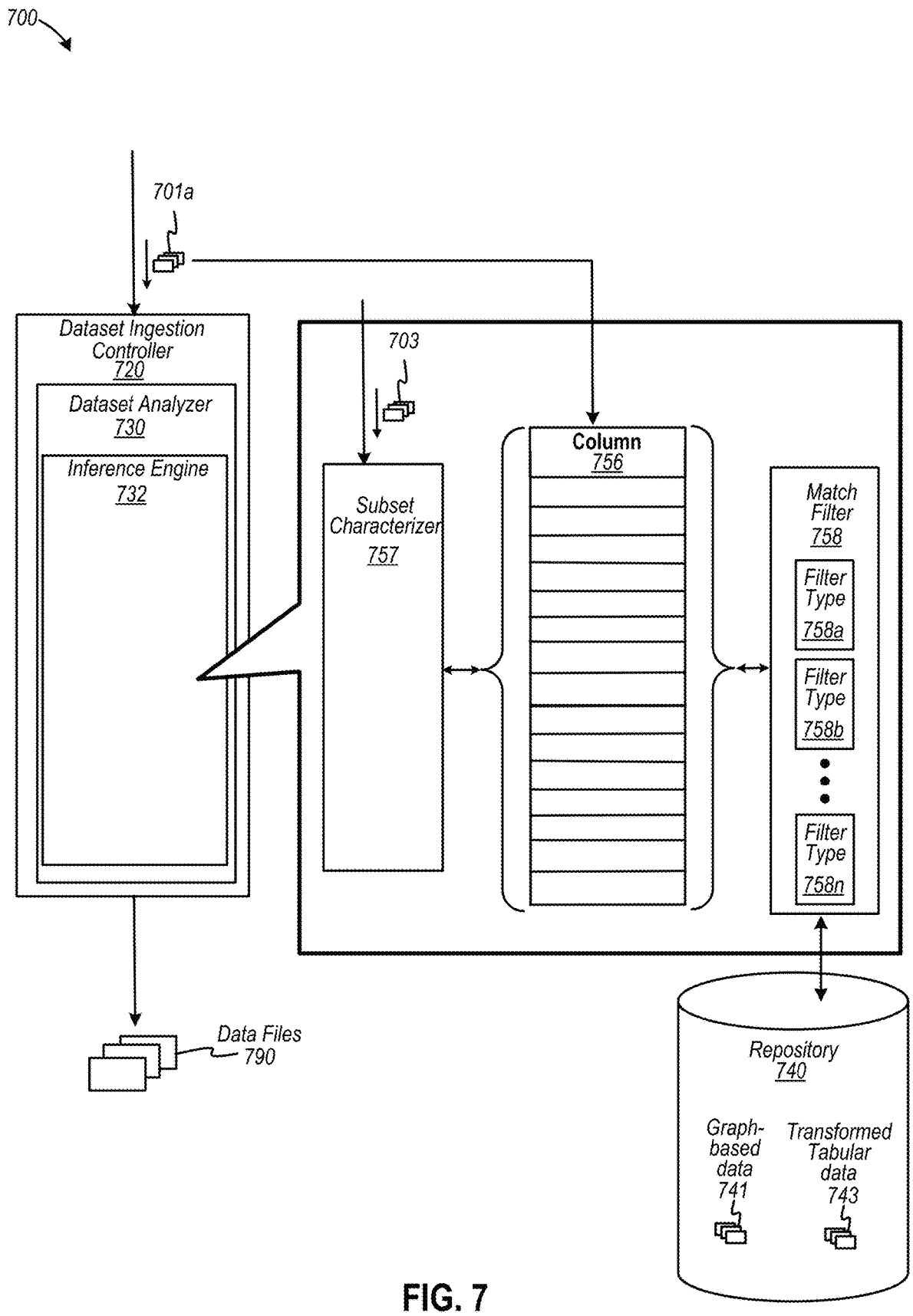
FIG. 7 is a diagram depicting a dataset ingestion controller configured to determine a classification of an arrangement of data for matching with other datasets, according to some examples.

FIG. 7 is a diagram depicting a dataset ingestion controller configured to determine a classification of an arrangement of data for matching with other datasets, according to some examples. Diagram 700 depicts a dataset ingestion controller 720 including a dataset analyzer 730 and an inference engine 732. Further, inference engine 732 may be configured to further include a subset characterizer 757 and a match filter 758, either or both of which may be implemented. According to various examples, subset characterizer 757 and match filter 758 each may be configured to classify units of data in, for example, a column 756 of ingested data 701a to determine one or more of a classification type, a datatype, a categorical variable, or any dataset attribute associated with column 756, which be equivalent to column 102 of tabular dataset 101 of FIG. 1. In one or more implementations, elements depicted in diagram 700 of FIG. 7 may include structures and/or functions as similarly-named or similarly-numbered elements depicted in other drawings. Examples of similar or equivalent structures and/ or functionalities of a dataset analyzer and an inference engine as described in U.S. patent application Ser. No. 15/927,004, filed on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS."

Subset characterizer 757 may be configured to characterize subsets of data and form a reduced data representation of a characterized subset of data. Subset characterizer 757 may be further configured to receive data 703 indicating a category type of interest to focus matching to a subset of portions of match filter 758, thereby preserving resources. In operation, subset characterizer 757 may receive data 703 as input data generated from a graphical user interface.

Match filter 758 may include any number of filter types 758a, 758b, and 758n, each of which may be configured to receive a stream of data representing a column 756 of data. A filter type, such as filter types 758a, 758b, and 758n, may be configured to compute one or more states indicative of whether there is a match to identify a categorical variable. In at least some examples, filter types 758a, 758b, and 758n are implemented as probabilistic filters (e.g., Bloom filters) each configured to determine whether a subset of data is either "likely" or "definitely not" in a set of data. Likely subsets of data may be included in data files 790. In some examples, a stream of data representing a column 756 may be processed to compress subsets of data (e.g., via hashing) to apply to each of filter types 758a, 758b, and 758n. For example, filter types 758a, 758b, and 758n may be predetermined (e.g., prefilled as Bloom filters) for classification types or entity classes of interest. A stream of data representing a column 756, or compressed representations thereof (e.g., hash signatures), may be applied to one or more Bloom filters to compare against categorical data.

In one example, consider that as Bloom filters 758a, 758b, and 758n may be generated by analyzing graph-based data 741 (e.g., graph data arrangements 1090 in FIG. 10) and transform tabular data 743 (e.g., tabular data arrangements 1030a to 1030d in FIG. 10), both of which may be stored in repository 740. For example, consider that Bloom filter 758a is formed to identify an entity class (or classification type) of "zip codes." To build filter 758a, subsets of zip codes in graph data arrangement 190 and/or tabular data arrangements 130a to 130d of FIG. 1 may be applied to "m" number of hash functions, such as a murmur hash function or any known hash function (e.g., $2x+9 \mod 5$, $3x+3 \mod 2$, etc.), to form a probabilistic data structure. The "m" number of hash functions may be applied to data in column 756 to form a compressed data representation of the data therein. Then, inference engine 732 and/or dataset ingestion controller 720 may be configured to apply the compressed data representation of column 756, which if it includes zip codes, may substantially match data in Bloom filter 758a. If a threshold value is met, then a determination may be made that data in column 756 may be similar or equivalent to data in repository 740, which was used to create or generate Bloom filter 758a. A threshold may specify a confidence level of 97%, which may indicate filter results based on compressed data representation of column 756, and portions thereof, match contents of Bloom filter 758a.

Consider an event in which column 756 includes 98% of data that matches a category "state abbreviations." Perhaps column 756 includes a typographical error or a U.S. territory, such as the U.S. Virgin Islands or Puerto Rico, which are not states but nonetheless have postal abbreviations. In some examples, inference engine 732 may be configured to infer a correction for typographical error. For example, if a state abbreviation for Alaska is "AK," and an instance of "KA" is detected in column 756, inference engine 732 may predict a transposition error and corrective action to resolve the anomaly. Dataset analyzer 730 may be configured to generate a notification to present in a user interface that may alert a user that less than 100% of the data matches the category "state abbreviations," and may further present the predicted remediation action, such as replacing "KA" with "AK," should the user so select. Or, such remedial action may be implemented automatically if a confidence level is sufficient enough (e.g., 99.8%) that the replacement of "KA" with "AK" resolves the anomalous condition. In view of the foregoing, inference engine 732 may be configured to automatically determine categorical variables (e.g., classifications of data) when ingesting, for example, data and matching against, for example, 50 to 500 categories, or greater.

Figure 8:
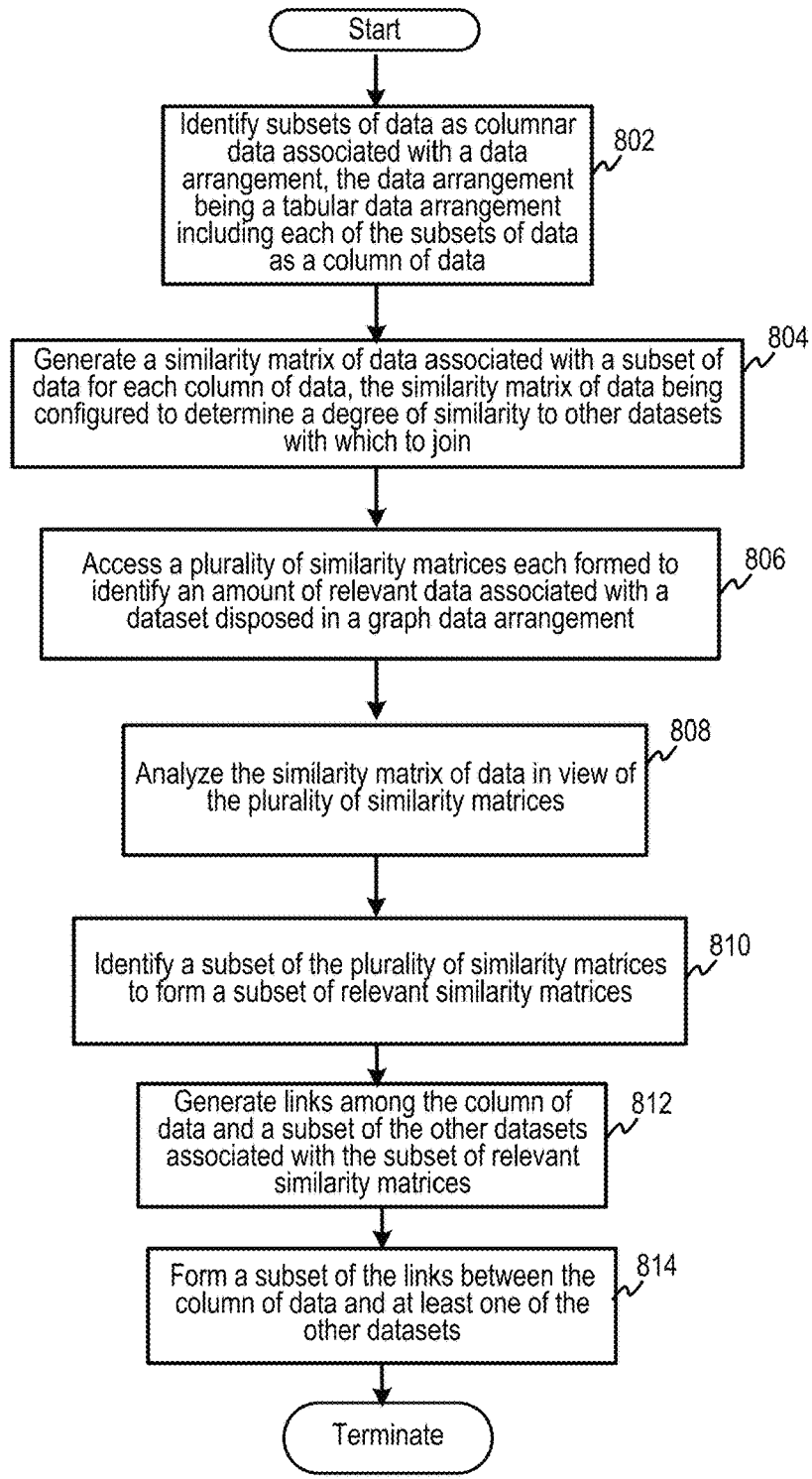
FIG. 8 is a flow diagram depicting an example of identifying one or more degrees of similarity, each of which being indicative that at least a portion of a graph-based dataset may be relevant to data associated with an ingested dataset, according to some embodiments.

FIG. 8 is a flow diagram depicting an example of identifying one or more degrees of similarity, each of which being indicative that at least a portion of a graph-based dataset may be relevant to data associated with an ingested dataset, according to some embodiments. In some examples, flow diagram 800 may be implemented in association with a collaborative dataset consolidation system, as described herein. Further, flow diagram 800 may be facilitated via computerized tools including a data project interface, which may be configured to initiate and/or execute instructions to identify data of an ingested dataset, such as a table, that may be relevant with one or more linked datasets stored in a graph-based data arrangement.

At 802, one or more subsets of data associated with a data arrangement may be identified at (or approximate to) ingestion into a computing platform, such as (but not limited to) a collaborative dataset consolidation system. In some examples, a tabular data arrangement may be ingested into the computing platform, whereby subsets of data in a table may constitute columnar data (e.g., data disposed in a column, or otherwise associated with links to transform the data into columns based on data disposed in graph-based data arrangements).

At 804, a similarity matrix of data associated with a subset of data may be generated. In some examples, a subset of data may include data that may reference a columnar data structure, or otherwise may be disposed or linked to data in a graph data arrangement. A similarity matrix of data may be configured to determine or otherwise specify a degree of similarity that may be used to identify other datasets with which to join, according to some examples. Also, a similarity matrix of data may be composed of a number of compressed data representations, each of which may be generated by one or more different processes or algorithms, such as one or more different hash functions. The compressed data representations of a similarity matrix may include units of compressed target data that may be used to compare or otherwise analyzed against other units of compressed target data for graph-based data. A unit of compressed target data may represent a value of a compressed target data unit that may be implemented to form a degree of similarity. In at least one implementation, a value of a compressed target data unit may represent a target hash value (e.g., a minimum hash value). Note that multiple hash functions may be applied to at least one column of tabular data ingested into collaborative dataset consolidation platform to form one or more similarity matrices of data. According to at least one example, a similarity matrix of data may be referred to as a signature, such as a "similarity signature." A similarity matrix of data may include units of compressed target data, each of which may represent a target hash value derived from a corresponding hash function, according to at least one example.

At 806, a number of similarity matrices stored in a repository may be accessed to determine a degree of similarity with ingested columnar data associated with the similarity matrix generated in 804. The number of similarity matrices may be formed to identify an amount of relevant data associated with datasets disposed in a graph data arrangement. According to some examples, a degree of similarity may specify or describe an amount of relevant data (e.g., as relevant content) between an ingested column of data and a subset of graph data stored in a graph data arrangement for a similar or equivalent class or type of data. To illustrate, consider that an ingested tabular dataset may include a U.S. postal zip codes for the state of Texas. In various examples, the zip codes for states in the central time zone may be more relevant than stored datasets including subsets of data including zip codes for all 50 states plus U.S. territories (e.g., Guam, Puerto Rico, etc.). States in the central time zone include at least Alabama, Arkansas, Minnesota, Wisconsin, Illinois, Missouri, Arkansas, Oklahoma, and Texas. A degree of similarity, according to some implementations, may describe or indicate a computed amount of "overlap" or "coverage" between a column of Texas zip code data and other subsets of data in datasets that may include individual state zip codes (e.g., Texas zip codes), zip codes for central time zone states, postal codes of the 50 U.S. states, postal codes for U.S. states and territories, and/or international postal codes.

At 808, a similarity matrix of data may be analyzed in association with a number of other similarity matrices, such as a set of similarity matrices formed for subsets of data, which may include similar or equivalent classes or types of data. According to some examples, analyzing a similarity matrix may include computing a degree of similarity as a function of common data attributes values and combined data attribute values for an ingested subset of data (e.g., an ingested column of data) and for at least one subset of graph data. In at least one example, common data attributes values may be derived as an intersection of data attributes values between the ingested subset of data and at least one subset of graph data to perform, for example, an "overlap" function as described herein. The combined data attribute values may be derived as a union between the subsets. In another example, analyzing a similarity matrix may include performing a coverage function. In this case, analyzing a similarity matrix may include computing a degree of similarity as a function of data attributes values in an ingested subset of data with respect to combined data attribute values for the ingested subset of data (e.g., an ingested column of data) and at least one subset of graph data.

At 810, a subset of similarity matrices relevant to an ingested subset of data may be identified. In some examples, an identified subset of similarity matrices may be associated with degrees of similarity that, for example, may exceed a threshold that specifies sufficient similarity. Or, an identified subset of similarity matrices may be associated with degrees of similarity that otherwise may comply with a range of degrees of similarity that specify sufficient similarity. A computed degree of similarity may be expressed numerically (e.g., as a percentage) or by using any other symbolic expression. Thus, a computed degree of similarity may be ranked or otherwise prioritized among other degrees of similarity to identify, for example, subsets of data that may be most highly relevant as compared to less relevant subsets of data.

According to various examples, "joinability" of an ingested dataset and a graph-based dataset may be based on a quantification of a degree of similarity between subsets of data (e.g., ingested columnar data and a subset of a graph). Thus, a degree of joinability between an ingested dataset and a graph-based dataset may be a function of a degree of similarity between subsets of data. One or more links or associations may be formed between ingested columnar data and a subset of a graph. In some examples, links may be formed among the ingested columnar data, which is converted into a graph-based data format, and a subset of a graph-based data arrangement. At 812, links among a column of data (e.g., an ingested subset of a tabular data arrangement) may be formed with a subset of the other datasets associated with a subset of relevant similarity matrices. The subset of relevant similarity matrices may be determined based on the degrees of similarity that meet the above-described threshold or ranges of similarity.

At 814, a subset of links may be formed between a column of data and at least one of the other datasets. In one implementation, links (e.g., suggested links) may be presented in a user interface, whereby the links can be presented as data representations for a selection of other datasets in a graph data arrangement to join via links (e.g., selectable links) to join via a column of data to an ingested data arrangement (e.g., an ingested tabular data arrangement). For example, one of a number of selections may be detected as data signals received into a collaborative dataset consolidation platform or system to form a subset of links to join a tabular data arrangement and at least one of other dataset in a graph data arrangement.

Figure 9:
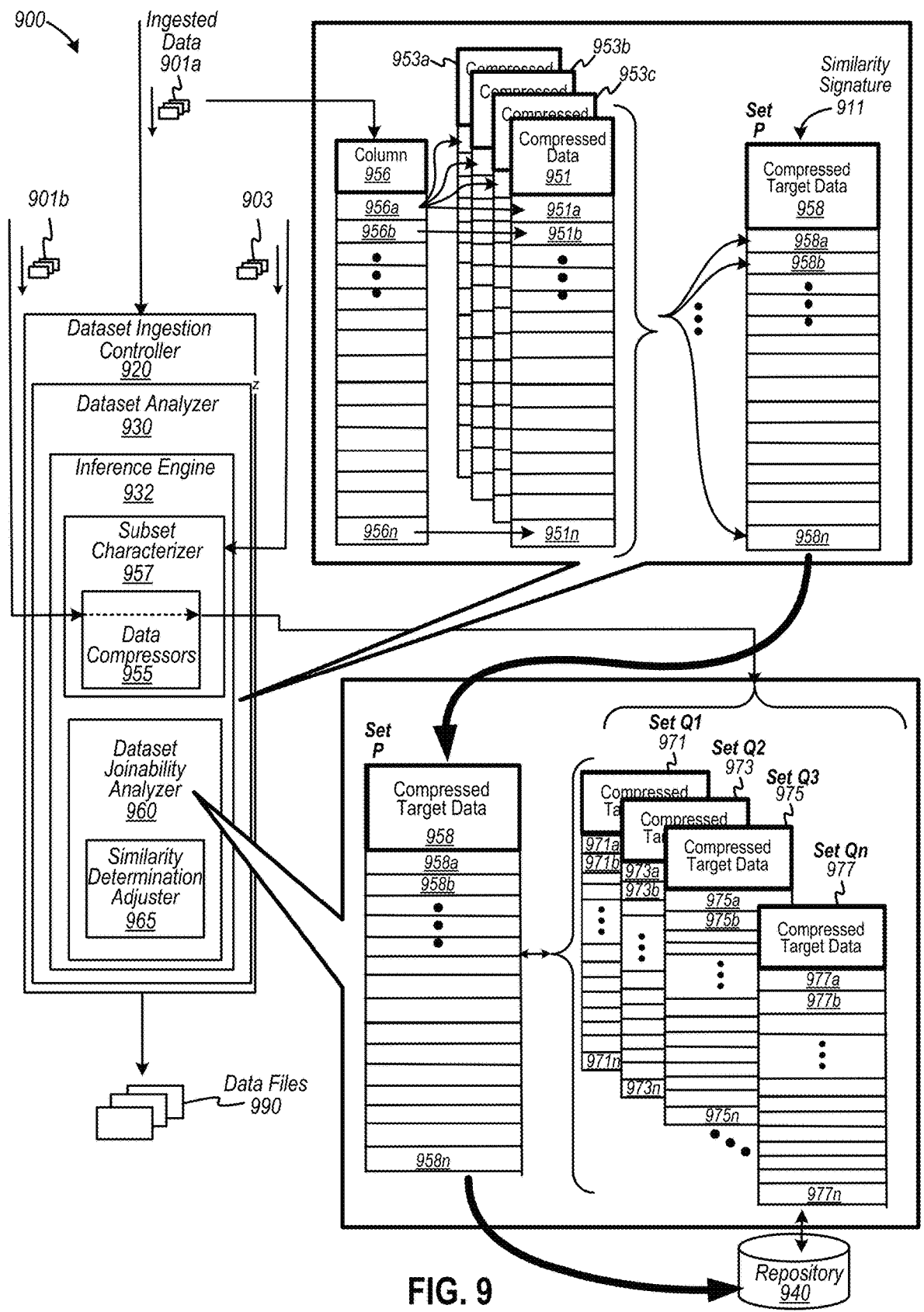
FIG. 9 is a diagram depicting dataset ingestion controller configured to determine a degree of similarity of a subset of tabular data arrangements to subsets of graph-based data arrangements, according to some examples.

FIG. 9 is a diagram depicting dataset ingestion controller configured to determine a degree of similarity of a subset of tabular data arrangements to subsets of graph-based data arrangements, according to some examples. Diagram 900 depicts a dataset ingestion controller 920 including a dataset analyzer 930 and an inference engine 932. Further, inference engine 932 may be configured to further include a subset characterizer 957 and a dataset joinability analyzer 960, either or both of which may be implemented. According to various examples, subset characterizer 957 may be configured to classify units of data in, for example, a column 956 of ingested data 901a to determine one or more of an entity class, a classification type, a datatype, a categorical variable, or any dataset attribute associated with a column 956 (e.g., a subset of a columnar data formatted in a tabular data arrangement). A type of data in column 956 may influence determinations of degrees of similarity and/or joinability, at least in some cases. Note that subset characterizer 957 operation may be optional in some cases. In one or more implementations, elements depicted in diagram 900 of FIG. 9 may include structures and/or functions as similarly-named or similarly-numbered elements depicted in other drawings. Examples of may include similar or equivalent structures and/or functionalities of a dataset analyzer and an inference engine as described in U.S. patent application Ser. No. 15/927,004, files on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS."

Subset characterizer 957 may be configured to characterize subsets of data by, for example, classifying or associating units of data (e.g., cells of column) with a specific class/classification or type of data (e.g., zip code or postal code data). In some examples, subset characterizer 957 may be configured to receive data 903 indicating a category type of interest to direct similarity determinations to similar or equivalent subsets of data. In operation, subset characterizer 957 may receive data 903 as input data generated from a graphical user interface. In at least one example, data 903 may include data representing a classification associated with columnar data, whereby data 903 may be generated by a probabilistic data structure, such as a Bloom filter. Examples of structures and/or functions configured to generate classification data 903 may be set forth in U.S. patent application Ser. No. 16/137,292, filed on Sep. 20, 2018, and titled "Matching Subsets of Tabular Data Arrangements to Subsets of Graphical Data Arrangements at Ingestion into Data-Driven Collaborative Datasets," which is herein incorporated by reference.

Subset characterizer 957 is shown to include one or more data compressors 955, each of which may be configured to form a reduced data representation of a characterized subset of data, such as an ingested column 956 of data. Each of data compressors 955 may be configured to generate a compressed data representation 951 for a compressed data representation for units of data (e.g., cells 956$a$, 956$b$, ... 956$n$) of a column 956 of data. In the example shown, a first data compressor may be configured to process units of data 956$a$, 956$b$, ... 956$n$ to generate corresponding compressed data representations 951$a$, 951$b$, ... 951$n$ to form compressed data 951. A second data compressor may be configured to process units of data 956$a$, 956$b$, ... 956$n$ to generate different compressed data representation similar to compressed data representations 951$a$, 951$b$, ... 951$n$, but not shown. Moreover, any number of other data compressors of data compressors 955 may generate other compressed data representations (not shown) in sets 953$a$, 953$b$, and 953$c$ of compressed data representations, according to some examples. According to at least some examples, sets or arrays 951, 953$a$, 953$b$, and 953$c$ of compressed data each include hash values derived from a corresponding data compressor (e.g., hash function).

For ingested data 901$a$, compressed data representations 951$a$, 951$b$, ... and 951$n$ may constitute a set or an array of compressed data representations 951. In one example, dataset joinability analyzer 960 may be configured to analyze compressed data representations 951$a$, 951$b$, ..., and 951$n$ to determine a unit of compressed target data, such as a unit of compressed target data 958$a$ that is included in compressed target data 958. Further, dataset joinability analyzer 960 may be configured to analyze other compressed data representations in, for example, compressed data 953$a$, 953$b$, and 953$c$, among others, to determine other units of compressed target data in compressed target data 958. For example, dataset joinability analyzer 960 may be configured to analyze compressed data representations in, for example, compressed data 953$a$ to determine a unit of compressed target data 958$b$ in compressed target data 958. Similarly, dataset joinability analyzer 960 may be configured to analyze other compressed data representations in any of compressed data representations 951, 953$a$-$c$, and the like, to generate other units of compressed target data in compressed target data 958, such as a unit of compressed target data 958$n$.

In some examples, dataset joinability analyzer 960 may be configured to identify a unit of compressed target data in a set of compressed data representations, whereby identification of a unit of compressed target data may be for inclusion in compressed target data 958. To illustrate, consider an example in which compressed data representations, such as compressed data representations 951$a$, 951$b$, ... and 951$n$, may be determined by applying data values 956$a$, 956$b$, and 956$n$ to a hash function to generate compressed data representations 951$a$, 951$b$, and 951$n$. As such, compressed data representations 951$a$, 951$b$, and 951$n$ may be hash values. Dataset joinability analyzer 960 may select at least one value of compressed data representations 951$a$, 951$b$, ... and 951$n$ to be included in similarity signature 911. For example, dataset joinability analyzer 960 may determine or derive a unit of compressed target data, such as unit 958$n$ of compressed target data 958 based on a characteristic of hash values for one of compressed data 951, 953$a$, 953$b$, and 953$c$. According to some examples, the term "compressed target data" may refer, at least in some implementations, to a data value representing a parameter or metric with which to determine (or facilitate the determination of) similarity between data in column 956 and subsets of graph-formatted data. In some cases, a unit of compressed target data may include a hash value having an attribute (e.g., a minimum hash value, or the like), and may be referred as a target hash value. Thus, a characteristic of a hash value may be, for example, a "minimum" hash value, whereby a minimum hash value of compressed data representations 951$a$, 951$b$, and 951$n$ may be identified as a unit of compressed target data in compressed target data 958. Other characteristics of a hash value include a maximum hash value, an average hash value, and the like.

Also, compressed target data 958 may be an array or set (e.g., Set P) of parameters or metrics, each of which is derived from a different data compressor and may be used to determine one or more degrees of similarity. Compressed target data representations 958$a$, 958$b$, ..., and 958$n$ collectively, at least in some cases, may constitute a "similarity matrix." Similarity signature 911 may provide for the quantification of a degree of similarity between subsets of data (e.g., ingested columnar data and a subset of a graph), which, in turn, may facilitate determination of a degree of joinability between an ingested dataset and a graph-based dataset.

Prior to application of data of column 956 to data compressors 955, data 901$b$ from other datasets (e.g., stored datasets in graph data arrangements) may be analyzed and processed by data compressors 955 to generate sets or arrays of compressed target data 971, 973, 975, ..., and 977, any of which may be stored in repository 940. As shown, sets of compressed data representations 971, 973, 975, ..., and 977 may constitute "Set Q1," "Set Q2," "Set Q3," and "Set Qn," respectively. According to some examples, sets of compressed data representations 971, 973, 975, ..., and 977 may constitute similarity matrices.

In some embodiments, each of data compressors 955 may be configured to generate a uniquely compact data value. For example, each of data compressors 955 may be implemented as a differently-configured hash function, such a murmur hash function or any known hash function (e.g., 2x+9 mod 5, 3x+3 mod 2, etc.), to form compressed data representations. These compressed data representations, as one or more different hash values, may be generated as compressed data representations 951$a$, 951$b$, ... and 951$n$. Further, corresponding differently-formed hash values may be generated for sets of compressed data representations 971, 973, 975, ..., and 977 using corresponding hash functions.

For example, a first hash function that generates hash value 958$a$ may also be used to generate hash values 971$a$ in Set Q1, 973$a$ in Set Q2, 975$a$ in Set Q3, and 977$a$ in Set Qn, whereby hash values 971$a$, 973$a$, 975$a$, and 977$a$ each constitute a unit of compressed target data (e.g., a minimum hash value). Similarly, a second hash function that generates hash value 958$b$ may be used to generate hash values 971$b$ in Set Q1, 973*b* in Set Q2, 975*b* in Set Q3, and 977*b* in Set Qn, and an "nth" hash function that generates hash value 958*n* may also be used to generate hash values 971*n*, 973*n*, 975*n*, and 977*n*. Hence, Set P and Sets Q1, Q2, Q3, and Qn each may include a similarity matrix of hash values, according to some examples. According to some examples, hash values in Sets P and Q1 to Qn may be 64 bit wide (or any bit length), and an number of hash values in any of Sets P and Q1 to Qn may range from 20 to 50, or from 20 up to 200, or greater.

Dataset joinability analyzer 960 may be configured to analyze one or more similarity matrices to determine one or more degrees of joinability between an ingested dataset and a graph-based dataset, whereby joinability provides a basis for selecting most relevant (e.g., most likely relevant) graph-based datasets to join with an ingested dataset. The ingested dataset may be in a tabular data format (or any other data format). Further, joinability between an ingested dataset and a graph-based dataset may be based on one or more degrees of similarity among, for example, Set P and Sets Q1, Q2, Q3, and Qn. In some examples, a degree of similarity may be determined as a function of multiple determinations that indicate either an amount of "overlap" between Set P and one of Sets Q, an amount of "coverage" between Set P and one of Sets Q, or the like.

According to various embodiments, an amount of "overlap" may be determined by, for example, computing a degree of similarity as a function of an approximated overlap based on a ratio between an amount of common data attributes (e.g., common similarity attributes) and a combined set of data attributes (e.g., a combined set of similarity attributes). The amount of common data attributes may include a number of data attribute values in both a subset of data (e.g., ingested column of data) and a subset of a dataset disposed in a graph data arrangement. The combined set of data attributes may include a combined number of data attribute values over both the subset of data and the subset of the graph-based dataset. Further, an amount of common data attributes may include an intersection of values in Set P and one of Sets Q1 to Qn, and the combined set of data attributes may include a union of values in Set P and one of Sets Q1 to Qn. According to some examples, the above-described similarity attributes (or values thereof) may include "hash values," or hash values characterized by a particular parameter or metric (e.g., a minimum hash value as a target compressed data value). As such, determining an amount of overlap may be a function of, for example, a ratio between a number of matched hash-derived attributes (e.g., matched values in target hash values 958*a-n*, 971*a-n*, 973*a-n*, etc.), and a combined number of hash-derived attributes (e.g., combination of target hash values 958*a-n*, 971*a-n*, 973*a-n*, etc., with cardinality).

To determine a degree of similarity based on an "overlap" function, dataset joinability analyzer 960 may be configured to apply data values ("p") in column 956 (e.g., p=data values 956*a*, 956*b*, . . . , 956*n*) to a first hash function, "h(i)," in data compressors 955 to generate hash values 958*a*, 958*b*, . . . , 958*n* in set ("Set P") of compressed data representations 958. Generation of Set P, as a similarity signature 911, may be performed at ingestion (e.g., as ingested data 901*a* is received into dataset ingestion controller 920). Note that Set P may be subsequently stored in repository 940 for subsequent determinations of joinability and collaborative data uses. Similarly, dataset joinability analyzer 960 may be configured to apply data values ("q") in relevant subsets of graph data arrangements to the first hash function, "h(i)" to form hash values (not shown) from which target hash value 971*a* in Set Q1, target hash value 973*a* in Set Q2, etc., are derived. Note that Sets Q1 to Qn may be established or identified, as references with which to determine a degree of similarity, prior to ingestion of data 901*a* or the like, according to some examples.

Further, dataset joinability analyzer 960 may be configured to perform the overlap function by executing instructions of a similarity determination algorithm. As such, dataset joinability analyzer 960 may be configured to identify a minimum hash value ("H(P)") associated with hash values 951*a*, 951*b*, . . . , 951*n* in compressed data 951. In some cases, prior to ingestion of dataset 901*a*, dataset joinability analyzer 960 may be configured to identify a minimum hash value ("H(Q)"), such as minimum hash values 971*a*, 971*b*, and 971*n* in Sets Q1, 973*a*, 973*b*, and 973*n* in Q2, 975*a*, 975*b*, and 975*n* in Q3, and 971*a*, 971*b*, and 971*n* in Qn.

Dataset joinability analyzer 960 may analyze minimum hash value, H(P), of Set P and minimum hash value, H(Q), of any of Sets Q1, Q2, Q3, and Qn to determine or predict probabilistically whether Set P and one of Sets Q1, Q2, Q3, and Qn are similar or dissimilar. For example, dataset joinability analyzer 960 may be configured to compare a minimum hash value in Set P and a corresponding minimum hash value in Set Q (both which may be derived by a common hash function). If the minimum hash values are equal, then an overlap function may generate data representing one ("1") as a first state, which specifies that pre-hashed data values are determined to be in a common set (e.g., an intersection of set elements). Otherwise, if the minimum hash values are not equivalent (e.g., not within a range of values indicating equivalency), then the overlap function may generate data representing zero ("0") as a second state, which specifies that pre-hashed data values in Sets P and Q2 are disjoint. In at least one example, an overlap function may be expressed in the following relationship: OVER(P,Q)={1, if H(P)=H(Q); 0 otherwise}.

Further, dataset joinability analyzer 960 may be configured to compare minimum hash values H(P) and minimum hash values H(Q) for multiple sets of Set P and multiple sets of Set Q (e.g., one or more of Sets Q1, Q2, Q3, and Qn). For example, multiple different data compressors 955 each may implement any of a number of known hash functions (e.g., murmur hash function, md5 or variants, sha256 or variants, 2x+9 mod 5, 9x+3 mod 2, etc.) to generate Set P and multiple sets of Set Q. For example, 20 to 100 hash functions (or greater) may be implemented to generate corresponding sets of P and Q to determine whether hashed values of Set P and Set Q may yield either a first state ("1") or a second state ("0"). Thus, an amount of instances or computations yielding in a first state ("1") relative to an amount of instances a second state ("0") may specify a degree of similarity. For example, consider that 100 different hash functions are implemented. In a first subprocess, dataset joinability analyzer 960 may be configured to generate and compare 100 sets of minimum hash values H(P) in Set P and 100 sets of minimum hash values H(Q) in Set ("Q1") 971. In this case, consider that 97 hash functions generate a "state one" ("1") indication and 63 hash functions generate a "state zero" ("0") indication. Thus, a degree of similarity may be equivalent to a degree of overlap, which may be expressed as "37%." In a second subprocess, dataset joinability analyzer 960 may be configured to generate and compare 100 sets of minimum hash values H(P) in Set P and 100 sets of minimum hash values H(Q) in Set ("Q2") 973. In this case, consider that 89 hash functions generate a "state one" ("1") indication and 11 hash functions generate a "state zero"

("0") indication. Thus, a degree of similarity may be equivalent to a degree of overlap, which may be expressed as "89%." Similar subprocesses can be performed for other sets, such as between ingested Set P and Set ("Q3") 975, as well as between Set P and Set ("Qn") 977. In view of the above, Set Q2 has a greater degree of similarity with Set P (e.g., a degree of similarity of 89%) than Set Q1 does with Set P (e.g., a degree of similarity of 97%). Thus a dataset associated with Set Q2 may be more relevant than Set Q1, and, consequently, Set Q2 may have a greater degree of joinability than Set Q1.

According to some examples, minimum hash values H(P) and H(Q) may be described as unbiased estimators that approximate a fraction of a number of elements in an intersection of sets P and Q of a cardinal number of elements in a union of sets P and Q. In at least one example, a degree of similarity may be a function of, or equivalent to, a Jaccard distance. Further, an overlap function (e.g., the OVER(P,Q) function) may be implemented to include executable instructions to perform a minhash function or a variant thereof.

In alternate examples, degrees of similarity may be determined based on a "coverage" function. In particular, dataset joinability analyzer 960 may be configured to analyze one or more similarity matrices via execution of instructions to perform a coverage function. According to various embodiments, an amount of coverage may be determined by, for example, computing an approximated coverage of a set by another set based on a ratio between an amount of data attributes of a set and a combined set of data attributes (e.g., in at least two sets). The amount of data attributes may include a number of data attribute values in a subset of data (e.g., ingested column of data). The combined set of data attributes may include a combined number of data attribute values over both the subset of data and the subset of the graph-based dataset. Further, an amount of data attributes may include data attributes in Set P, and a combined set of data attributes may include a union of values in Set P and one of Sets Q1 to Qn. According to some examples, the above-described data attributes (or values thereof) may include "hash values."

In computing a "coverage" function, dataset joinability analyzer 960 may be configured to generate and compare minimum hash values H(P) and H(Q) similar to that in performing the above-described overlap function. By contrast, if a minimum hash value H(P) is less than or equal to a minimum hash value H(Q), then the coverage function may generate data representing one ("1") as a first state. Otherwise, then the coverage function may generate data representing zero ("0") as a second state. In at least one example, a coverage function may be expressed in the following relationship: COVER(P,Q)={1, if H(P)≤H(Q); 0 otherwise}. In at least one implementation, a coverage function may be configured to determine a probability that a minimum hash value for an ingested set of data, such as Set P, is covered by Set Q (e.g., a percentage of Set P covered by Set Q). According to various examples, a coverage function need not implement a minhash function, or may be configured to include a modified variation thereof. For some datasets, a coverage function may be implemented in lieu of a overlap function (or in conjunction therewith) to determine degrees of similarity with enhanced accuracy. For example, degrees of similarity using a coverage function may be computed with reduced computational resources and enhanced accuracy for datasets having large sizes and having a defined number of cardinal data values (or hash values). To illustrate, consider a set, such as Set P, including a number of zip codes in Texas, which may facilitate a relatively reduced Jaccard table or index, whereby a coverage function may be less influenced by the same. A large-sized dataset can be very large datasets, such as aggregations of 100,000 datasets to millions of datasets, or greater, whereby the datasets are disposed in graph data arrangement(s).

Similarity determination adjuster 965 may include logic configured to adjust the determinations of degrees of similarity based on one or more factors. In one example, implementation of a number of different hash functions may be variable. Hence, similarity determination adjuster 965 may be configured to adjust a number of different hash functions based on a type or class of data in ingested data 901a. In some examples, data representing a classification of data may be received into similarity determination adjuster 965 via data 903. For example, different number of hash functions in data compressors 955 may be implemented for "zip code data" relative to "geographic location data," or other data classifications or categories. Or, different hash functions may be implemented based on "string" data types rather than "boolean" data types, or based on "integer" data types rather than "float" data types (e.g., fewer and/or different hash functions may be used for integers rather than floating point data). Also, different hash functions in data compressors 955 may be implemented based on one or more dataset attributes, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, float, etc.), a number of data points, a number of columns, a "shape" or distribution of data and/or data values, and the like. In other examples, similarity determination adjuster 965 may include logic configured to adjust the determinations of degrees of similarity to include performance of either an "overlap" function or a "coverage" function, or both. In some cases, a degree of similarity may be determined based on results of the performance of overlap and coverage functions.

One or more links or associations may be formed between ingested columnar data 901 and a subset of a graph to form data files 990, whereby the one or more links or associations may be formed based on a degree of joinability of datasets (e.g., degrees of similarity between subsets of data).

Figure 10:
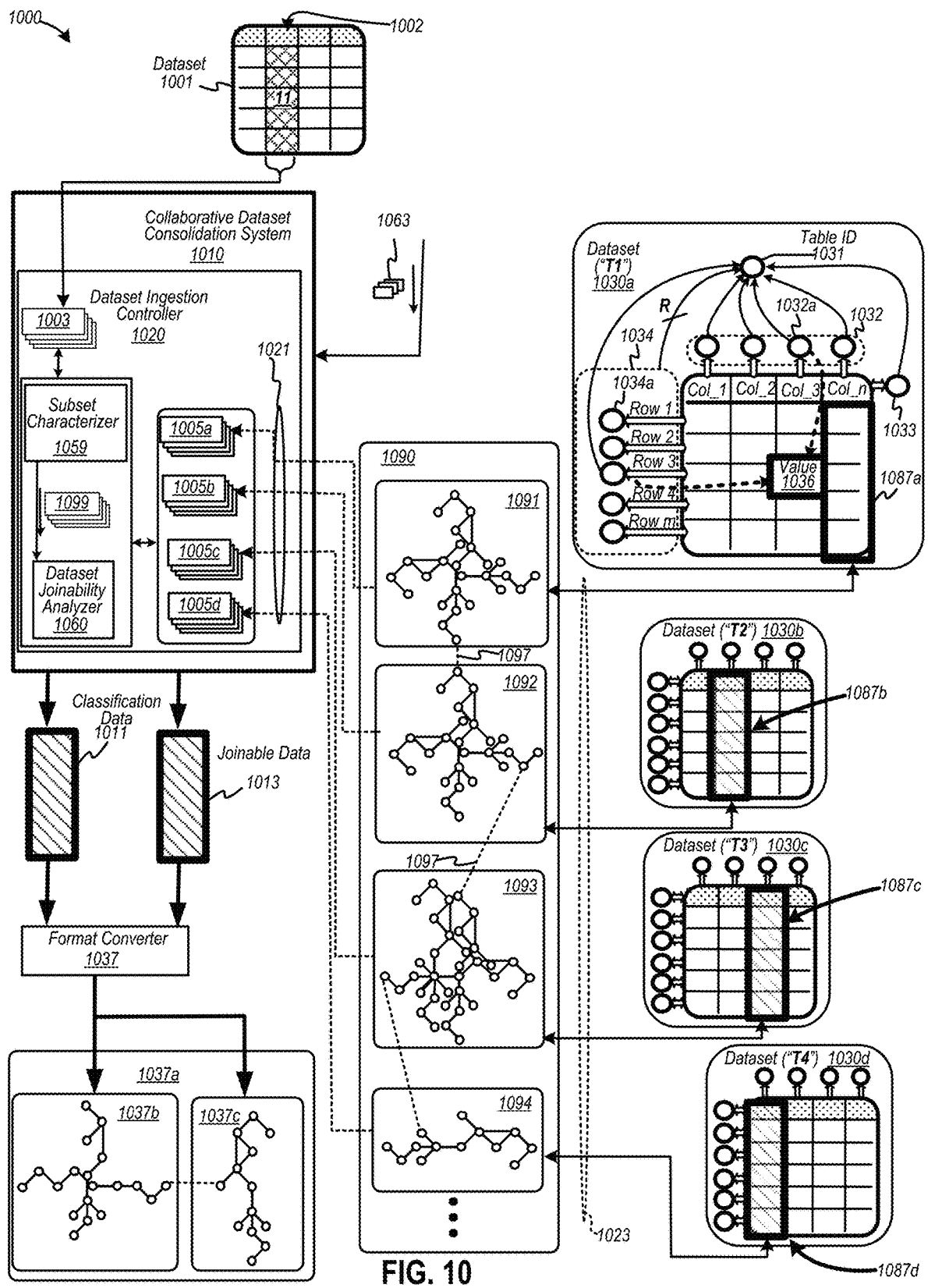
FIG. 10 is a diagram depicting an example of a collaborative dataset consolidation system configured to determine data classifications and/or degrees of similarity among datasets to identify a dataset with which to join, according to some embodiments.

FIG. 10 is a diagram depicting an example of a collaborative dataset consolidation system configured to determine data classifications and/or degrees of similarity among datasets to identify a dataset with which to join, according to some embodiments. Diagram 1000 depicts a tabular data arrangement that may be ingested into a collaborative dataset consolidation system 1010, wherein a tabular data arrangement 1001 may include subsets of data. An example of a subset of data may include data (e.g., columnar data) disposed in column 1002, and, in some examples, may include a portion of an external dataset that may be ingested. An external dataset may be stored remotely, without collaborative dataset, consolidation system 1010. Each unit of columnar data may be disposed in data fields, such as cells 11, of data arrangement 1001. In some examples, tabular data arrangement 1001 may be implemented as a data file including multiple tables split into different files or sheets, such as a data arrangement for a spreadsheet computer program application.

Diagram 1000 further depicts collaborative dataset consolidation system 1010 including a dataset ingestion controller 1020, which may be configured to determine which one or more of one or more linked portions datasets, such as graph-based datasets 1091, 1092, 1093, and 1094, are most relevant to table-formatted dataset 1001. Note, graph-based datasets 1091, 1092, 1093, and 1094 may correspond to subsets or portions of a graph data arrangement 1090. Identification of which graph-based data sets 1091, 1092, 1093, and 1094 are most relevant to data in dataset 1001 may be based on a determination of which graph-based data sets 1091, 1092, 1093, and 1094 may include similar or equivalent "classified" data as dataset 1001. Further, the relevancy of graph-based data sets 1091, 1092, 1093, and 1094 to data in dataset 1001 may be based on a determination of a degree of "joinability," which may describe relevancy among datasets (including data in dataset 1001) so that an optimal number of datasets may be identified among a large number of suitable datasets in graph data arrangement 1090.

Dataset ingestion controller 1020 is shown to include a subset characterizer 1059 and a dataset joinability analyzer 1060. Subset characterizer 1059 may be configured to characterize subsets of data and form a reduced data representation of a characterized subset of data. The reduced data representation may be a "compressed data representation," at least in some cases. The compressed data representation generated in association with subset characterizer 1059 may be used to filter (e.g., via a Bloom filter) data to determine classification type for a subset of data. Subset characterizer 1059 may be further configured to receive data 1063 indicating a category type of interest to focus matching to a subset of portions. In operation, subset characterizer 1059 may receive data 1063 as input data generated from a graphical user interface. For example, subset characterizer 1059 may be configured to correlate a compressed data representation, such as 1003, to one or more reference compressed data representations 1005a to 1005d, etc., to form a correlated compressed data representation. In some examples, "correlating" compressed data representation 1003 to one of reference compressed data representations 1005 may include comparing and matching compressed data values in view of a relative tolerance or probability indicative of a match filter. For instance, a data value representing compressed data representation 1003 may "match" data values of a reference compressed data representation 1005 based on a range of values that may define a degree of equivalency.

By contrast, dataset joinability analyzer 1060 may be configured to determine data attributes (e.g., similarity attributes) with which to determine degrees of similarity among subsets of data. A similarity attribute may describe a quality of one or more units of data that may facilitate identification of a degree of similarity. Also, dataset joinability analyzer 1060 may be configured to generate any number of compressed data representations for each unit of data (e.g., datum 11) in column 1002, whereby dataset joinability analyzer 1060 may further be configured to compress data differently to form each of the number of compressed data representations (e.g., different compression subprocesses, algorithms, functions, etc.).

For each group of similarly-compressed data values, dataset joinability analyzer 1060 may identify at least one target compressed data value from the group of similarly-compressed data values, and aggregate each of the target compressed data values 1003 to form a similarity matrix. Similarly, dataset joinability analyzer 1060 may be configured to generate any number of compressed data representations for each unit of data (e.g., linked to a node of a graph) in a subset or portion of a graph-based dataset (e.g., one of graph-based datasets 1091, 1092, 1093, and 1094). And for each graph-based datasets 1091, 1092, 1093, and 1094, dataset joinability analyzer 1060 may also be configured to compress data differently to form each of the number of compressed data representations differently. Dataset joinability analyzer 1060 may identify at least one target compressed data value from each group of similarly-compressed data values for each of graph-based datasets 1091, 1092, 1093, and 1094, and may further aggregate each of compressed data values 1005a, 1005b, 1005c, and 1005d (e.g., as target compressed data values) to form similarity matrices for graph-based datasets 1091, 1092, 1093, and 1094, respectively. According to some examples, compressed data 1003 and 1005a to 1005d similarity matrices may be implemented as, or referred to, "similarity signatures" for corresponding subsets of data.

Dataset joinability analyzer 1060 may operate to analyze data 1003 in a similarity matrix with data 1005a to 1005d in one or more similarity matrices. For example, dataset joinability analyzer 1060 may be configured to compare or match similarly-compressed target compressed data values between 1003 and one of 1005a to 1005d to generate a data representation (e.g., a number, percentage, etc.) that specifies a degree of similarity between, for example, subset 1002 and a subset of data in graph-based datasets 1091, 1092, 1093, and 1094. In this example, degrees of similarity between subset 1002 and each of graph-based datasets 1091, 1092, 1093, and 1094 are likely qualitatively different, whereby degrees of similarity may be ranked or prioritized from lowest to highest, for example. A higher degree of similarity between subsets of datasets may define that a corresponding degree of joinability between datasets may also have a higher value than others, at least in some cases.

Further, data representations indicating a degree of joinability (e.g., a degree of similarity) may specify a ranking of dataset to join with dataset 1001, as well as dataset identification data and any other data to link data in dataset 1001 to data in graph data arrangement 1090 via data in column 1002. The data representations and other data may constitute joinable data 1013, which may specify which one or more of graph-based datasets 1091, 1092, 1093, and 1094 may be joined to data from dataset 1001. According to some examples, joinable data 1013 may be generated or otherwise influenced responsive to user input data received from a user interface of a computing device (not shown). Note, too, that dataset ingestion controller 1020, responsive of the functionalities of subset characterizer 1059, may generate classification 1011 specifying the classification for joinable data 1013. Such data may be associated with a dataset 1001 and subsequent conversion, whereby one or more nodes of graph data may include metadata specifying the classification of data association with the graph data.

In at least one example, a classification type for columnar data in column 1002 may be determined to, for example, identify which subsets of data in graph data arrangement 1090 that may have a similar or equivalent types or classes of data. By determining or identifying graph-based datasets 1091, 1092, 1093, and 1094 as having similar or equivalent types or classes of data as column 1002, probabilistic confidence and accuracies of determining degrees of similarity among subset are enhanced, thereby conserving resources in determining which dataset may be joined with dataset 1001. Subset characterizer 1059 may be configured to identify a class of data associated with column 1002 and transmit data 1099 representing a classification (e.g., data classified as zip codes) to dataset joinability analyzer 1060, which may calculate degrees of joinability (based on degrees of similarity computed by on classification data 1099), at least in some implementations.

In some examples, subset characterizer 1059 may be configured to determine a classification of data associated with data in column 102. In one implementation, dataset ingestion controller 1020 may receive data 1063 indicating a class, category, or type of data related to column data 1002 to direct similarity determinations to similar or equivalent subsets of data. Further, subset characterizer 1059 may be configured to identify classification types for graph-based datasets 1091, 1092, 1093, and/or 1094 with which joinability may or may not be based on. Or, data 1063 from an external source may be configured to identify classification types for graph-based datasets 1091, 1092, 1093, and 1094, and may be generated as input data from a graphical user interface (not shown).

In some examples, data 1063 or any other data may specify a classification type, which may be described as a "classification," or an "entity class," under which data may be categorized. Examples of classification types include postal zip codes, industry sector codes, such as NACIS ("North American Cartographic Information Society") codes or SIC ("Standard Industrial Classification") codes, country codes (e.g., two-character, three-character, etc.), airport codes, animal taxonomies (e.g., classifications of "fish" or any other animal), state codes (e.g., two-letter abbreviation, such as TX for Texas, etc.), medical codes, such as ICD ("International Classification of Diseases") codes, including the ICD-10-CM revision, airport codes, such as three-letter "IATA" codes defined by the International Air Transport Association, and the like. The above-described examples regarding classification are non-limiting, and a classification type or entity class of data may describe any type of data that can be categorized, such as any data set forth in an ontology (e.g., data defining categories, properties, data relationships, concepts, entities, etc.). An example of one type of ontology is an ontology created using the W3C Web Ontology Language ("OWL"), as a semantic web language, regardless whether the ontology is open source, publicly-available, private, or proprietary (e.g., an organizationally-specific ontology, such as for use in a corporate entity).

Note that compressed data representations 1003 and 1005a to 1005d may be generated differently based on the functionalities of either subset characterizer 1059 (e.g., to implement one or more Bloom filters) or dataset joinability analyzer 1060 (e.g., to implement one or more similarity matrices for MinHash operations or other data similarity determinations), or both. In some cases, compressed data representations 1003 and 1005a to 1005d may be generated may be generated by common hash functions for use in both classification and joinability determinations. Note that the results of a hash function need not be required to be used in both classification joinability determinations, but rather, a data compressor (e.g., hash function) may be used for both classification and joinability determinations, at least in implementations.

In one example, subset characterizer 1059 and/or functionalities to classify datasets may be implemented consistent with U.S. patent application Ser. No. 16/137,292, filed on Sep. 20, 2018, and titled "Matching Subsets of Tabular Data Arrangements to Subsets of Graphical Data Arrangements at Ingestion into Data-Driven Collaborative Datasets," which is hereby incorporated by reference. In at least another example, dataset joinability analyzer 1060 and/or functionalities to determine similar datasets with which to join may be implemented consistent with U.S. patent application Ser. No. 16/137,297, filed on Sep. 20, 2018, and titled "Determining a Degree of Similarity of a Subset of Tabular Data Arrangements to Subsets of Graph Data Arrangements at Ingestion into a Data-Driven Collaborative Dataset Platform," which is hereby incorporated by reference.

In at least some examples, dataset ingestion controller 1020 and/or other components of collaborative dataset consolidation system 1010 may be configured to implement linked data as one or more canonical datasets with which to modify, query, analyze, visualize, and the like. In some examples, dataset ingestion controller 1020 and/or other components of collaborative dataset consolidation system 1010 may be configured to form associations between a portion of a graph-based dataset and a table-based dataset (e.g., form associations among graph-based dataset 1091 and table-based dataset 1030a). For example, format converter 1037, which may be disposed in dataset ingestion controller 1020, can be configured to form referential data (e.g., IRI data, etc.) to associate a datum (e.g., a unit of data) in a graph data arrangement (e.g., any of graph-based datasets 1091 to 1094) to a portion of data, such as one of columns 1087a to 1087d, in a tabular data arrangement (e.g., any of table-based datasets 1030a to 1030d). Thus, data operations, including dataset enrichment (e.g., joining data to expand datasets using a degree of joinability) and queries, may be applied against a datum of the tabular data arrangement as the datum in the graph data arrangement. An example of a component of collaborative dataset consolidation system 1010 to form associations between a portion of a graph-based dataset and a table-based dataset may be as described in U.S. patent application Ser. No. 15/927,004, filed on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS."

As shown, dataset ingestion controller 1020 may be configured to identify graph-based datasets that may be transformed or associated with tabular data formats, such as a dataset ("T1") 1030a, dataset ("T2") 1030b, dataset ("T3") 1030c, dataset ("T4") 1030d, among others. For example, dataset ingestion controller 1020 may form associations via nodes and links (e.g., semantically linked data) to associate each data value 1036 in a cell of a tabular data arrangement. Value 1036 also may be linked to a row node 1034a (of a group ("R") of row nodes 1034) and a column node 1032a (of a group ("C") of column nodes 1032). Node 1033 may identify via links to column header data that may be used to classify data (e.g., as zip codes) or identify a datatype (e.g., a string, number, integer, Boolean, etc.), in accordance with some instances. As shown, data in tabular data arrangement 1030a may be converted from/to a graph data arrangement 1091, such that data values 1036 in table 1030a may be mirrored or mapped into graph data arrangement 1091. Table 1030a may be identified by data representing a table identifier ("ID") 1031, whereby data values in each cell of a table format may be linked or otherwise associated with a node in a graph data format. In some examples, dataset 1030a, dataset 1030b, dataset 1030c, dataset 1030d may be "virtual" datasets, whereby data in datasets 1030a to 1030d either resides in graph data arrangement 1090 or external to collaborative dataset consolidation system 1010 (e.g., data is linked from external sources). As such, data (including metadata) may be associated with graph data arrangement 1090 to access or view graph data as tabular data (e.g., for presentation in a user interface or for application of SQL-like queries).

Further to the example shown, consider that each compressed data representations specifying either a classification or a degree of similarity, regarding subsets of graph data subsets 1091 to 1094, then data in column 1002 may be linked to at least one of subsets of graph data subsets 1091 to 1094 via links 1021. In addition, each of subsets of graph data subsets 1091 to 1094 may be associated via links 1023 with a column 1087a to 1087d, respectively, in corresponding tabular data arrangements 1030a to 1030d. For example, if column 1002 is associated with a specific classification type, such as "zip codes of Texas," a degree of similarity between similarity matrices may indicate that graph data portion 1094 may include joinable zip code data, such as "the zip codes of the United States." Further, dataset ingestion controller 1020 may be configured to enrich dataset 1001 by adding data in column 1087d, which maps to data in graph data portion 1094, to dataset 1001 to form an enriched version of dataset 1001. Thus, data in column 1087d may be added as supplemental data into data from dataset 1001, based on determining a common or equivalent classification, and further by comparing and matching similarity matrices.

Dataset ingestion controller 1020 may be configured to perform other functionalities with which to form, modify, query and share collaborative datasets according to various examples. In this example, dataset 1001 may be disposed in a first data format (e.g., a tabular data arrangement), with which format converter 1037 may convert into a second data arrangement, such as a graph data arrangement 1037b. Graph data arrangement 1037 may include (e.g., via links) a graph data portion 1037b from data in dataset 1001 and a graph data portion 1037c from "similar" data in, for example, graph data portion 1094. As such, data in a field 11 (e.g., a unit of data in a cell at a row and column) of a table 1001 may be disposed in association with a node in a graph 1037 (e.g., a unit of data as linked data).

According to some examples, collaborative dataset consolidation system 1010 and/or any of its constituent components may implement a software algorithms or platforms composed of one or more programs or scripts (e.g., Java®, JavaScript®, JSON™, Ruby, C+, C++, C#, C, or any other structured or unstructured programming language, structured or unstructured, or the like, including, but not limited to, SQL, SPARQL, TURTLE, etc.) that may be configured to determine degrees of similarity. In some examples, the above-described compressed data representations and similarity matrices may be implemented using hash functions and hash values.

In view of the foregoing, one or more structures and/or one or more functionalities described in FIG. 10 (or anywhere herein) may be configured to expeditiously identify relevant data of an ingested dataset in a first data format (or a dataset in the first data format yet to be linked), such as a tabular data arrangement 1001, with one or more linked datasets disposed in a second data format, such as a graph data arrangement 1090. Relevant data may be identified during data ingestion (or thereafter) for joining with similar data, and storage in the graph data arrangement. According to various examples, data in a tabular data arrangement 1001 may be matched against data in a graph data arrangement, which may reduce or negate reduce complexities and limitations associated with relational database architectures. Further, analysis of target compressed data, using a similarity matrix, preserves computational resources that otherwise may be used to perform per-cell matching rather at a subset (or column) level. In some examples, determining degrees of similarity based on class types of categories (or classification) may enhance accuracy in the determination of the computed degrees of similarity, which, in turn, may influence selection of joining a specific portion of graph data arrangement 1090 to data in dataset 1001. In at least some cases, degrees of joinability and/or similarity may be distinguished by ranking, prioritization, or the like, so as to reduce or negate obscuring selections of graph-based datasets in view of the very large numbers of linked datasets in a graph data arrangement.

Figure 11:
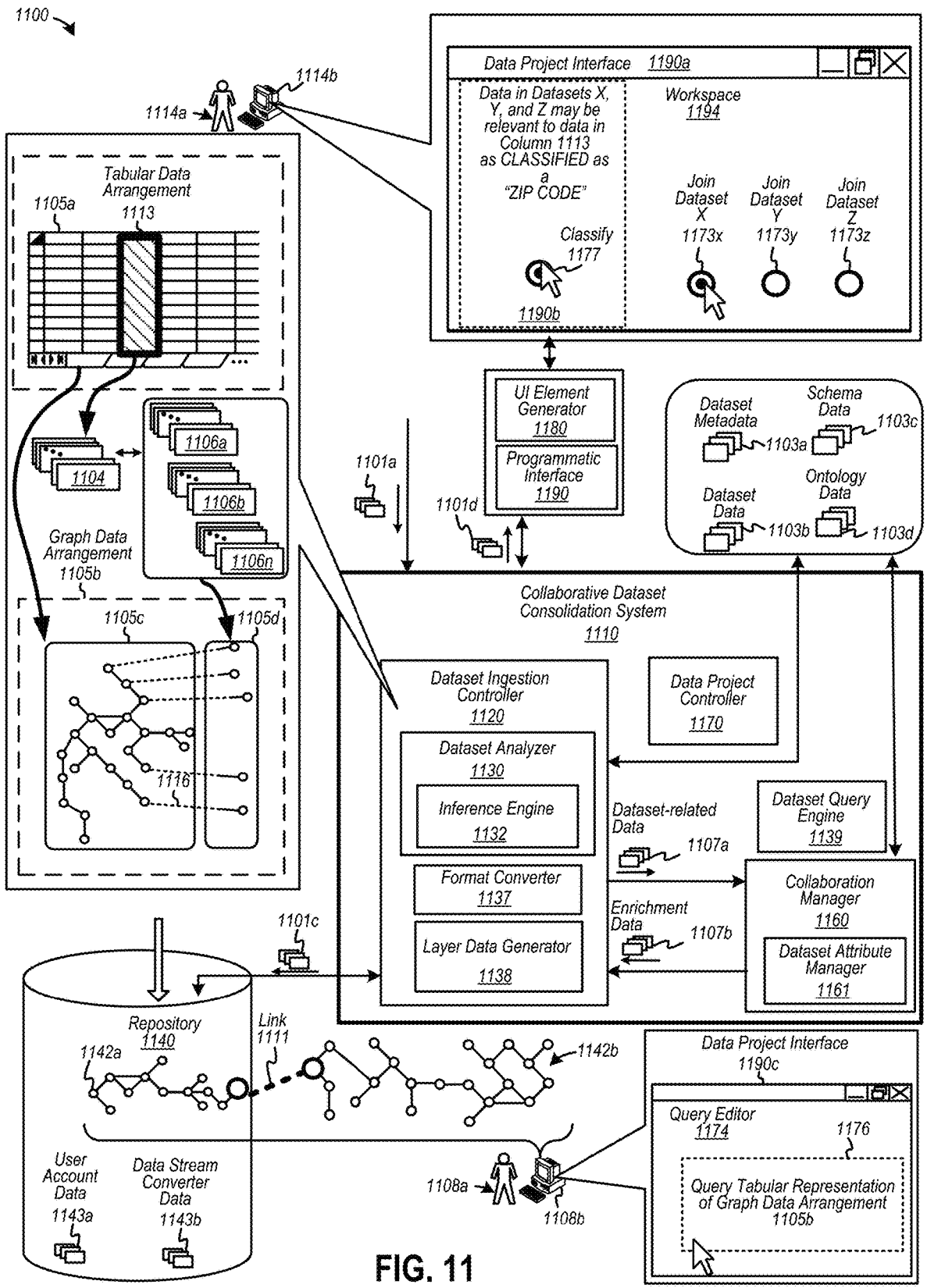
FIG. 11 is a diagram depicting another example of a collaborative dataset consolidation system configured to determine degrees of similarity among datasets to identify a dataset with which to join, according to some embodiments.

FIG. 11 is a diagram depicting another example of a collaborative dataset consolidation system configured to determine degrees of similarity among datasets to identify a dataset with which to join, according to some embodiments. Diagram 1100 depicts an example of a collaborative dataset consolidation system 1110 that may be configured to consolidate one or more datasets to form collaborative datasets as, for example, a canonical dataset. A collaborative dataset, according to some non-limiting examples, is a set of data that may be configured to facilitate data interoperability over disparate computing system platforms, architectures, and data storage devices. Further, a collaborative dataset may also be associated with data configured to establish one or more associations (e.g., metadata) among subsets of dataset attribute data for datasets and multiple layers of layered data, whereby attribute data may be used to determine correlations (e.g., data patterns, trends, etc.) among the collaborative datasets.

In some examples, data project controller 1170 may be configured to control creation and evolution of a data project for managing collaborative datasets. Also, data project controller 1170 may also initiate importation (e.g., at ingestion or subsequent thereto) of dataset 1105a via dataset ingestion controller 1120. Implementation of data project controller 1170 to access, modify, or improve a data project may be activated via a user account associated with a computing device 1114b (and/or user 1114a). Data representing the user account may be disposed in repository 1140 as user account data 1143a. In this example, computing device 1114b and user 1114a may each be identified as a creator or "owner" of a dataset and/or a data project. However, initiation of data project controller 1170 to access, modify, or improve a data project may originate via another user account associated with a computing device 1108b (and/or user 1108a), who, as a collaborator, may access datasets, queries, and other data associated with a data project to perform additional analysis and information augmentation. In some examples, a collaborative computing device 1108b may be configured to access a dataset derived as a function of matching or correlating a compressed data representation of column 1113 of table 1105a to one or more Bloom filters to determine a classification type, and/or may be configured to access a dataset to determine a degree of similarity with which to join.

Dataset consolidation system 1110 may be configured to generate data for presentation in a display to form computerized tools in association with data project interface 1190a, which is shown in this example to present notification 1190b that datasets X, Y, and Z may be relevant to data in column 1113 (e.g., based on at least a classification). User input 1177, if activated, may be configured to classify data in column 1113 as "zip code" data for, for example, further analysis. Further, data project interface 1190a also may present an interactive workspace interface portion 1194, which may provide user inputs as a function of classification data generated in association with activation of user input 1177. In some cases, the order of datasets may indicate a "ranking" in which dataset X may have a higher degree of joinability, whereas dataset Z may have a lower degree of joinability. Degrees of similarity may be determined based on a similarity matrix 1104 formed based on data in column 1113 and similarity matrices 1106a to 1106n formed based on subsets of graph data in graph data arrangement 1142a and/or 1142b. User inputs 1173x to 1173y in data project interface 1109a may be configured to receive a selection of a dataset to join to data from dataset 1105a. Consider that computing device 1114b may be configured to initiate importation of a dataset 1105a (e.g., in a tabular data arrangement) for conversion into a data project as a dataset 1105b (e.g., in a graph data arrangement).

Dataset 1105a may be ingested as data 1101a, which may be received in the following examples of data formats: CSV, XML, JSON, XLS, MySQL, binary, free-form, unstructured data formats (e.g., data extracted from a PDF file using optical character recognition), etc., among others. Consider further that dataset ingestion controller 1120 may receive data 1101a representing a dataset 1105a, which may be formatted as a "spreadsheet data file" that may include multiple tables associated with each tab of a spreadsheet, according to some examples. Dataset ingestion controller 1120 may arrange data in dataset 1105a into a first data arrangement, or may identify that data in dataset 1105a is formatted in a particular data arrangement, such as in a first data arrangement. In this example, dataset 1105a may be disposed in a tabular data arrangement that format converter 1137 may convert into a second data arrangement, such as a graph data arrangement 1105b. As such, data in a field (e.g., a unit of data in a cell at a row and column) of a table 1105a may be disposed in association with a node in a graph 1105b (e.g., a unit of data as linked data). A data operation (e.g., a query, or a "join" operation based on ranked datasets identified via degrees of similarity) may be applied as either a query against a tabular data arrangement (e.g., based on a relational data model) or graph data arrangement (e.g., based on a graph data model, such as using RDF). Since equivalent data are disposed in both a field of a table and a node of a graph, either the table or the graph may be used interchangeably to enrich or supplement an ingested dataset, as well as to perform queries and other data operations. Similarly, a dataset disposed in one or more other graph data arrangements may be disposed or otherwise mapped (e.g., linked) as a dataset into a tabular data arrangement.

Collaborative dataset consolidation system 1110 is shown in this example to include a dataset ingestion controller 1120, a collaboration manager 1160 including a dataset attribute manager 1161, a dataset query engine 1139 configured to manage queries, and a data project controller 1170. Dataset ingestion controller 1120 may be configured to ingest and convert datasets, such as dataset 1105a (e.g., a tabular data arrangement) into another data format, such as into a graph data arrangement 1105b. Collaboration manager 1160 may be configured to monitor updates to dataset attributes and other changes to a data project, and to disseminate the updates to a community of networked users or participants. Therefore, users 1114a and 1108a, as well as any other user or authorized participant, may receive communications, such as in an interactive collaborative activity feed (not shown) to discover new or recently-modified dataset-related information in real-time (or near real-time). In one example, user 1108a may be notified via computing device 1108b that dataset 1105a is added and joined to dataset 1105d, based on, for example, a degree of similarity. Thus, collaboration manager 1160 and/or other portions of collaborative dataset consolidation system 1110 may provide collaborative data and logic layers to implement a "social network" for datasets. Dataset attribute manager 1161 may include logic configured to detect patterns in datasets, among other sources of data, whereby the patterns may be used to identify or correlate a subset of relevant datasets that may be linked or aggregated with a dataset. Linked datasets may form a collaborative dataset that may be enriched with supplemental information from other datasets. Dataset query engine 1139 may be configured to receive a query to apply against a one or more datasets, which may include at least graph data arrangement 1105b. In some examples, a query may be implemented as either a relational-based query (e.g., in an SQL-equivalent query language) or a graph-based query (e.g., in a SPARQL-equivalent query language), or a combination thereof. Further, a query may be implemented as either an implicit federated query or an explicit federated query.

According to some embodiments, a data project may be implemented as an augmented dataset as graph data arrangement 1105b, which may include supplemental data responsive to joining dataset 1105c (converted dataset 1105a) to at least a portion of dataset 1105d based on a classification of data and/or a degree of similarity between similarity matrix 1104 and one of similarity matrices 1106a to 1106d (in implementations where in compressed data is configured to determine a degree of similarity via similarity matrices 1104 and 1106a-n). Graph data 1105d associated with a matched reference compressed data representation may be linked or associated, via links 1116, to graph data 1105c (converted from table data arrangement 1105a). In some examples, graph data arrangement 1105b may be disposed in repository 1140 as a graph-based dataset 1142a, which, in turn, may be linked via link 1111 to externally-accessible dataset 1142b, which may be owned, created, and/or controlled by computing device 1108b.

In at least one example, a collaborative user 1108a may access via a computing device 1108b a data project interface 1190c in which computing device 1108b may activate a user input 1176 in a query editor 1174 to access one or more portions of dataset 1142a, which may include graph data arrangement 1105b, or portions thereof, such a graph data portion 1105c and joined graph data portion 1105d, whereby graph data portion 1105d may be joined as a function of (responsive to), a common classification type, or a degree of joinability and/or a degree of similarity, as described herein.

Note that in some examples, supplemental data or information may include, at least in some examples, information that may automatically convey (e.g., visually in text and/or graphics) dataset attributes of a created dataset or analysis of a query, including dataset attributes and derived dataset attributes, during or after (e.g., shortly thereafter) the creation or querying of a dataset. In some examples, supplemental data or information may be presented as dataset attributes in a user interface (e.g., responsive to dataset creation) may describe various aspects of a dataset, such as dataset attributes, in summary form, such as, but not limited to, annotations (e.g., metadata or descriptors describing columns, cells, or any portion of data), data classifications (e.g., a geographical location, such as a zip code, etc., or any descriptive data specifying a classification type or entity class), datatypes (e.g., string, numeric, categorical, boolean, integer, etc.), a number of data points, a number of columns, a "shape" or distribution of data and/or data values, a number of empty or non-empty cells in a tabular data structure, a number of non-conforming data (e.g., a non-numeric data value in column expecting a numeric data, an image file, etc.) in cells of a tabular data structure, a number of distinct values, as well as other dataset attributes.

Dataset analyzer 1130 may be configured to analyze data file 1101*a*, as dataset 1105*a*, to detect and resolve data entry exceptions (e.g., whether a cell is empty or includes non-useful data, whether a cell includes non-conforming data, such as a string in a column that otherwise includes numbers, whether an image embedded in a cell of a tabular file, whether there are any missing annotations or column headers, etc.). Dataset analyzer 1130 then may be configured to correct or otherwise compensate for such exceptions. Dataset analyzer 1130 also may be configured to classify subsets of data (e.g., each subset of data as a column of data) in data file 1101*a* representing tabular data arrangement 1105*a* as a particular data classification, such as a particular data type or classification. For example, a column of integers may be classified as "year data," if the integers are formatted similarly as a number of year formats expressed in accordance with a Gregorian calendar schema. Thus, "year data" may be formed as a derived dataset attribute for the particular column. As another example, if a column includes a number of cells that each includes five digits, dataset analyzer 1130 also may be configured to classify the digits as constituting a "zip code." According to some examples, dataset analyzer 1130 may be configured to classify data as classification type or entity class based on detecting a match or correlation between a compressed data representation 1104 and at least one of probabilistic data structures 1106*a* to 1106*n* (in implementations where compressed data representation 1104 and 1104 and 1106*a-n* are configured to determine a classification type). In some examples, probabilistic data structures 1106*a* to 1106*n* may be implemented as Bloom filters.

In some examples, an inference engine 1132 of dataset analyzer 1130 can be configured to analyze data file 1101*a* to determine correlations among dataset attributes of data file 1101*a* and other datasets 1142*b* (and dataset attributes, such as metadata 1103*a*). Once a subset of correlations has been determined, a dataset formatted in data file 1101*a* (e.g., as an annotated tabular data file, or as a CSV file) may be enriched, for example, by associating links between tabular data arrangement 1105*a* and other datasets (e.g., by joining with, or linking to, other datasets) to extend the data beyond that which is in data file 1101*a*. In one example, inference engine 1132 may analyze a column of data to infer or derive a data classification (e.g., a classification type as described herein) for the data in the column. In some examples, a datatype, a data classification, etc., as well any dataset attribute, may be derived based on known data or information (e.g., annotations), or based on predictive inferences using patterns in data.

Further to diagram 1100, format converter 1137 may be configured to convert dataset 1105*a* into another format, such as a graph data arrangement 1142*a*, which may be transmitted as data 1101*c* for storage in data repository 1140. Graph data arrangement 1142*a* in diagram 1100 may be linkable (e.g., via links 1111) to other graph data arrangements to form a collaborative dataset. Also, format converter 1137 may be configured to generate ancillary data or descriptor data (e.g., metadata) that describe attributes associated with each unit of data in dataset 1105*a*. The ancillary or descriptor data can include data elements describing attributes of a unit of data, such as, for example, a label or annotation (e.g., header name) for a column, an index or column number, a data type associated with the data in a column, etc. In some examples, a unit of data may refer to data disposed at a particular row and column of a tabular arrangement (e.g., originating from a cell in dataset 1105*a*). In some cases, ancillary or descriptor data may be used by inference engine 1132 to determine whether data may be classified into a certain classification, such as where a column of data includes "zip codes." In some examples, tabular dataset 1105*a* may be converted into a graph-based dataset 1105*c*, which may be joined via links 1116 to graph-based dataset 1105*d* based on a degree of joinability and/or a degree of similarity, as described herein.

Layer data generator 1136 may be configured to form linkage relationships of ancillary data or descriptor data to data in the form of "layers" or "layer data files." Implementations of layer data files may facilitate the use of supplemental data (e.g., derived or added data, etc.) that can be linked to an original source dataset, whereby original or subsequent data may be preserved. As such, format converter 1137 may be configured to form referential data (e.g., IRI data, etc.) to associate a datum (e.g., a unit of data) in a graph data arrangement to a portion of data in a tabular data arrangement. Thus, data operations, such as a query, may be applied against a datum of the tabular data arrangement as the datum in the graph data arrangement. An example of a layer data generator 1136, as well as other components of collaborative dataset consolidation system 1110, may be as described in U.S. patent application Ser. No. 15/927,004, filed on Mar. 20, 2018, titled "LAYERED DATA GENERATION AND DATA REMEDIATION TO FACILITATE FORMATION OF INTERRELATED DATA IN A SYSTEM OF NETWORKED COLLABORATIVE DATASETS."

According to some embodiments, a collaborative data format may be configured to, but need not be required to, format converted dataset 1105*a* into an atomized dataset. An atomized dataset may include a data arrangement in which data is stored as an atomized data point that, for example, may be an irreducible or simplest data representation (e.g., a triple is a smallest irreducible representation for a binary relationship between two data units) that are linkable to other atomized data points, according to some embodiments. As atomized data points may be linked to each other, data arrangement 1142*a* may be represented as a graph, whereby converted dataset 1105*a* (i.e., atomized dataset 1105*b*) may form a portion of a graph. In some cases, an atomized dataset facilitates merging of data irrespective of whether, for example, schemas or applications differ. Further, an atomized data point may represent a triple or any portion thereof (e.g., any data unit representing one of a subject, a predicate, or an object), according to at least some examples.

As further shown, collaborative dataset consolidation system 1110 may include a dataset attribute manager 1161. Dataset ingestion controller 1120 and dataset attribute manager 1161 may be communicatively coupled to dataset ingestion controller 1120 to exchange dataset-related data 1107*a* and enrichment data 1107*b*, both of which may exchange data from a number of sources (e.g., external data sources) that may include dataset metadata 1103*a* (e.g., descriptor data or information specifying dataset attributes), dataset data 1103*b* (e.g., some or all data stored in system repositories 1140, which may store graph data), schema data 1103*c* (e.g., sources, such as schema.org, that may provide various types and vocabularies), ontology data 1103*d* from any suitable ontology and any other suitable types of data sources. Ontology data 1103*d* may include proprietary data unique to a certain organization and may be secured to prevent public access. One or more elements depicted in diagram 1100 of FIG. 11 may include structures and/or functions as similarly-named or similarly-numbered elements depicted in other drawings, or as otherwise described herein, in accordance with one or more examples. Dataset attribute manager 1161 may be configured to monitor changes in dataset data and/or attributes, including user account attributes. As such, dataset attribute manager 1160 may monitor dataset attribute changes, such as a change in number or identity of users sharing a dataset, as well as whether a dataset has been created, modified, linked, updated, associated with a comment, associated with a request, queried, or has been associated with any other dataset interactions. Dataset attribute manager 1161 may also monitor and correlate data among any number of datasets, some other examples of dataset attributes.

In the example shown if FIG. 11, dataset ingestion controller 1120 may be communicatively coupled to a user interface, such as data project interface 1190*a*, via one or both of a user interface ("UI") element generator 1180 and a programmatic interface 1190 to exchange data and/or commands (e.g., executable instructions) for facilitating data project modification to include dataset 1105*a*. UI element generator 1180 may be configured to generate data representing UI elements to facilitate the generation of data project interfaces 1190*a* and 1190*c* and graphical elements thereon. For example, UI generator 1180 may cause generation UI elements, such as a container window (e.g., icon to invoke storage, such as a file), a browser window, a child window (e.g., a pop-up window), a menu bar (e.g., a pull-down menu), a context menu (e.g., responsive to hovering a cursor over a UI location), graphical control elements (e.g., user input buttons, check boxes, radio buttons, sliders, etc.), and other control-related user input or output UI elements. In some examples, a data project interface, such as data project interface 1190*a* or data project interface 1190*c*, may be implemented as, for example, a unitary interface window in which multiple user inputs may provide access to numerous aspects of forming or managing a data project, according to a non-limiting example.

Programmatic interface 1190 may include logic configured to interface collaborative dataset consolidation system 1110 and any computing device configured to present data 1101*d* via, for example, any network, such as the Internet. In one example, programmatic interface 1190 may be implemented to include an applications programming interface ("API") (e.g., a REST API, etc.) configured to use, for example, HTTP protocols (or any other protocols) to facilitate electronic communication. In one example, programmatic interface 1190 may include a web data connector, and, in some examples, may include executable instructions to facilitate data exchange with, for example, a third-party external data analysis computerized tool. A web connector may include data stream converter data 1143*b*, which, for example, may include HTML code to couple a user interface 1190*a* with an external computing device. Examples of external applications and/or programming languages to perform external statistical and data analysis include "R," which is maintained and controlled by "The R Foundation for Statistical Computing" at www(dot)r-project(dot)org, as well as other like languages or packages, including applications that may be integrated with R (e.g., such as MATLAB™, Mathematica™, etc.). Or, other applications, such as Python programming applications, MATLAB™, Tableau® application, etc., may be used to perform further analysis, including visualization or other queries and data manipulation.

According to some examples, user interface ("UI") element generator 1180 and a programmatic interface 1190 may be implemented in association with collaborative dataset consolidation system 1110, in a computing device associated with data project interfaces 1190*a* and 1190*c*, or a combination thereof. UI element generator 1180 and/or programmatic interface 1190 may be referred to as computerized tools, or may facilitate presentation of data 1101*d* to form data project interface 1190*a*, or the like, as a computerized tool, according to some examples.

In at least one example, identifying additional datasets to enhance dataset 1142*a* may be determined through collaborative activity, such as identifying that a particular dataset may be relevant to dataset 1142*a* based on electronic social interactions among datasets and users. For example, data representations of other relevant dataset to which links may be formed may be made available via an interactive collaborative dataset activity feed. An interactive collaborative dataset activity feed may include data representing a number of queries associated with a dataset, a number of dataset versions, identities of users (or associated user identifiers) who have analyzed a dataset, a number of user comments related to a dataset, the types of comments, etc.). Thus, dataset 1142*a* may be enhanced via "a network for datasets" (e.g., a "social" network of datasets and dataset interactions). While "a network for datasets" need not be based on electronic social interactions among users, various examples provide for inclusion of users and user interactions (e.g., social network of data practitioners, etc.) to supplement the "network of datasets." In one example, collaborative dataset consolidation system 1110 may be configured to detect formation of a link to supplemental data in a portion of dataset 1142*b*, which may be associated with a user account (e.g., described in user account data 1143*a*) and managed by computing device 1108*b*. Further, collaborative dataset consolidation system 1110 may generate a notification via network to transmit to computing device 1108*b* so that user 1108*a* may be informed, via a dataset activity feed, that activity has occurred with one of its datasets. Hence, collaboration among distributed datasets may be facilitated.

Note that the term "ingestion" may refer to an operation or a state of data with which the data is introduced and optionally converted from a tabular to a graph data format, and may have at least one subset of data yet to be classified and/or analyzed for degrees of similarity with other datasets, at least in some examples. Note, too, that a term "compressed data representation" may refer to data formed by a hash function specifically for determining classification or a degree of similarity, or may refer to data formed by a hash function that produces a result that may be used in both determining classification imagery of similarity, at least in some examples. Hence, while a "compressed data representation" may be produced by a hash function, the "compressed data representation" may be used or implemented differently (e.g., via Bloom filter or MinHash) for different functions.

According to various embodiments, one or more structural and/or functional elements described in FIG. 11 or herein may be implemented in hardware or software, or both. Examples of one or more structural and/or functional elements described herein may be implemented as set forth in one or more of U.S. patent application Ser. No. 15/186,514, filed on Jun. 19, 2016, titled "COLLABORATIVE DATASET CONSOLIDATION VIA DISTRIBUTED COMPUTER NETWORKS," U.S. patent application Ser. No. 15/186,517, filed on Jun. 19, 2016, titled "QUERY GENERATION FOR COLLABORATIVE DATASETS," and U.S. patent application Ser. No. 15/454,923, filed on Mar. 9, 2017, having titled "COMPUTERIZED TOOLS TO DISCOVER, FORM, AND ANALYZE DATASET INTER-RELATIONS AMONG A SYSTEM OF NETWORKED COLLABORATIVE DATASETS," each of which is herein incorporated by reference.

Figure 12:
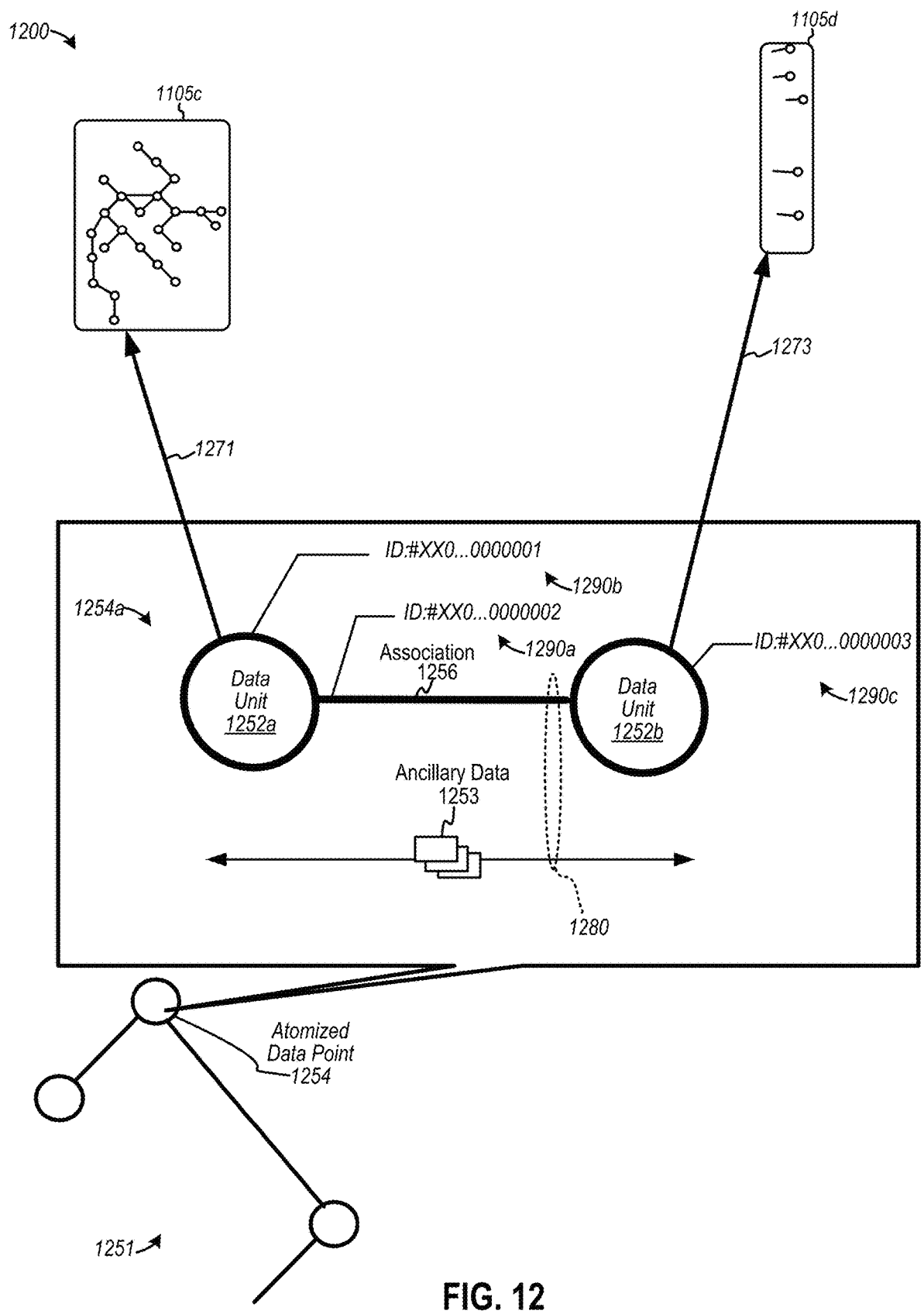
FIG. 12 is a diagram depicting an example of an atomized data point joining datasets based on a degree of similarity, according to some embodiments.

FIG. 12 is a diagram depicting an example of an atomized data point joining datasets based on a degree of similarity, according to some embodiments. In some examples, an atomized dataset may be formed by converting a tabular data format into a format associated with the atomized dataset. In some cases, portion 1251 of an atomized dataset can describe a portion of a graph that includes one or more subsets of linked data. Further to diagram 1200, one example of atomized data point 1254 is shown as a data representation 1254a, which may be represented by data representing two data units 1252a and 1252b (e.g., objects) that may be associated via data representing an association 1256 with each other. One or more elements of data representation 1254a may be configured to be individually and uniquely identifiable (e.g., addressable), either locally or globally in a namespace of any size. For example, elements of data representation 1254a may be identified by identifier data 1290a, 1290b, and 1290c (e.g., URIs, URLs, IRIs, etc.).

Diagram 1200 depicts a portion 1251 of an atomized dataset that includes an atomized data point 1254a, which includes links formed to facilitate identifying relevant data of an ingested dataset with one or more linked datasets, according to some examples. In this example, atomized data point 1254a may form a link from a dataset to another dataset responsive to detecting a match between compressed data representations and one or more match filters (e.g., one or more Bloom filters). In some cases, detecting a match between compressed data representations and one or more match filters indicates a similar or equivalent classification type between datasets. Further, atomized data point 1254a may form a link from a dataset to another dataset responsive to detecting a degree of similarity (or joinability), according to some examples. For example, atomized data point 1254a may form a link between data in subsets of data that may have a relatively high degree of similarity, relative to other comparisons between datasets.

The data representing the identifiers may be disposed within a corresponding graph data arrangement based on a graph data model. In diagram 1200, graph data portion 1105c of FIG. 11 may be linked via link 1271 to node 1252a, which, in turn, may be linked from node 1252b via link 1273 to graph data portion 1105d of FIG. 11, which may be a remote or external dataset. Any of links 1271 and 1273 may be removed if a corresponding dataset identifier is disassociated from a data project. In some examples, removal of one of links 1271 and 1273 may generate a new version of a data project, whereby the removed link may be preserved for at least archival purposes. Note, too, that while a first entity (e.g., a dataset owner) may exert control and privileges over portion 1251 of an atomized dataset that includes atomized data point 1254, a collaborator-user or a collaborator-computing device may user or form any of links 1271 and 1273. In one example, data units 1252a and 1252b may represent any of nodes depicted in 1105c or 1105d, or in 1142a or 1142b, in FIG. 11, according to at least one implementation.

In some embodiments, atomized data point 1254a may be associated with ancillary data 1253 to implement one or more ancillary data functions. For example, consider that association 1256 spans over a boundary between an internal dataset, which may include data unit 1252a, and an external dataset (e.g., external to a collaboration dataset consolidation), which may include data unit 1252b. Ancillary data 1253 may interrelate via relationship 1280 with one or more elements of atomized data point 1254a such that when data operations regarding atomized data point 1254a are implemented, ancillary data 1253 may be contemporaneously (or substantially contemporaneously) accessed to influence or control a data operation. In one example, a data operation may be a query and ancillary data 1253 may include data representing authorization (e.g., credential data) to access atomized data point 1254a at a query-level data operation (e.g., at a query proxy during a query). Thus, atomized data point 1254a can be accessed if credential data related to ancillary data 1253 is valid (otherwise, a request to access atomized data point 1254a (e.g., for forming linked datasets, performing analysis, a query, or the like) without authorization data may be rejected or invalidated). According to some embodiments, credential data (e.g., passcode data), which may or may not be encrypted, may be integrated into or otherwise embedded in one or more of identifier data 1290a, 1290b, and 1290c. Ancillary data 1253 may be disposed in other data portion of atomized data point 1254a, or may be linked (e.g., via a pointer) to a data vault that may contain data representing access permissions or credentials.

Atomized data point 1254a may be implemented in accordance with (or be compatible with) a Resource Description Framework ("RDF") data model and specification, according to some embodiments. An example of an RDF data model and specification is maintained by the World Wide Web Consortium ("W3C"), which is an international standards community of Member organizations. In some examples, atomized data point 1254a may be expressed in accordance with Turtle (e.g., Terse RDF Triple Language), RDF/XML, N-Triples, N3, or other like RDF-related formats. As such, data unit 1252a, association 1256, and data unit 1252b may be referred to as a "subject," "predicate," and "object," respectively, in a "triple" data point (e.g., as linked data). In some examples, one or more of identifier data 1290a, 1290b, and 1290c may be implemented as, for example, a Uniform Resource Identifier ("URI"), the specification of which is maintained by the Internet Engineering Task Force ("IETF"). According to some examples, credential information (e.g., ancillary data 1253) may be embedded in a link or a URI (or in a URL) or an Internationalized Resource Identifier ("IRI") for purposes of authorizing data access and other data processes. Therefore, an atomized data point 1254 may be equivalent to a triple data point of the Resource Description Framework ("RDF") data model and specification, according to some examples. Note that the term "atomized" may be used to describe a data point or a dataset composed of data points represented by a relatively small unit of data. As such, an "atomized" data point is not intended to be limited to a "triple" or to be compliant with RDF; further, an "atomized" dataset is not intended to be limited to RDF-based datasets or their variants. Also, an "atomized" data store is not intended to be limited to a "triplestore," but these terms are intended to be broader to encompass other equivalent data representations.

Examples of triplestores suitable to store "triples" and atomized datasets (or portions thereof) include, but are not limited to, any triplestore type architected to function as (or similar to) a BLAZEGRAPH triplestore, which is developed by Systap, LLC of Washington, D.C., U.S.A.), any triplestore type architected to function as (or similar to) a STARDOG triplestore, which is developed by Complexible, Inc. of Washington, D.C., U.S.A.), any triplestore type architected to function as (or similar to) a FUSEKI triplestore, which may be maintained by The Apache Software Foundation of Forest Hill, MD, U.S.A.), and the like.

Figure 13:
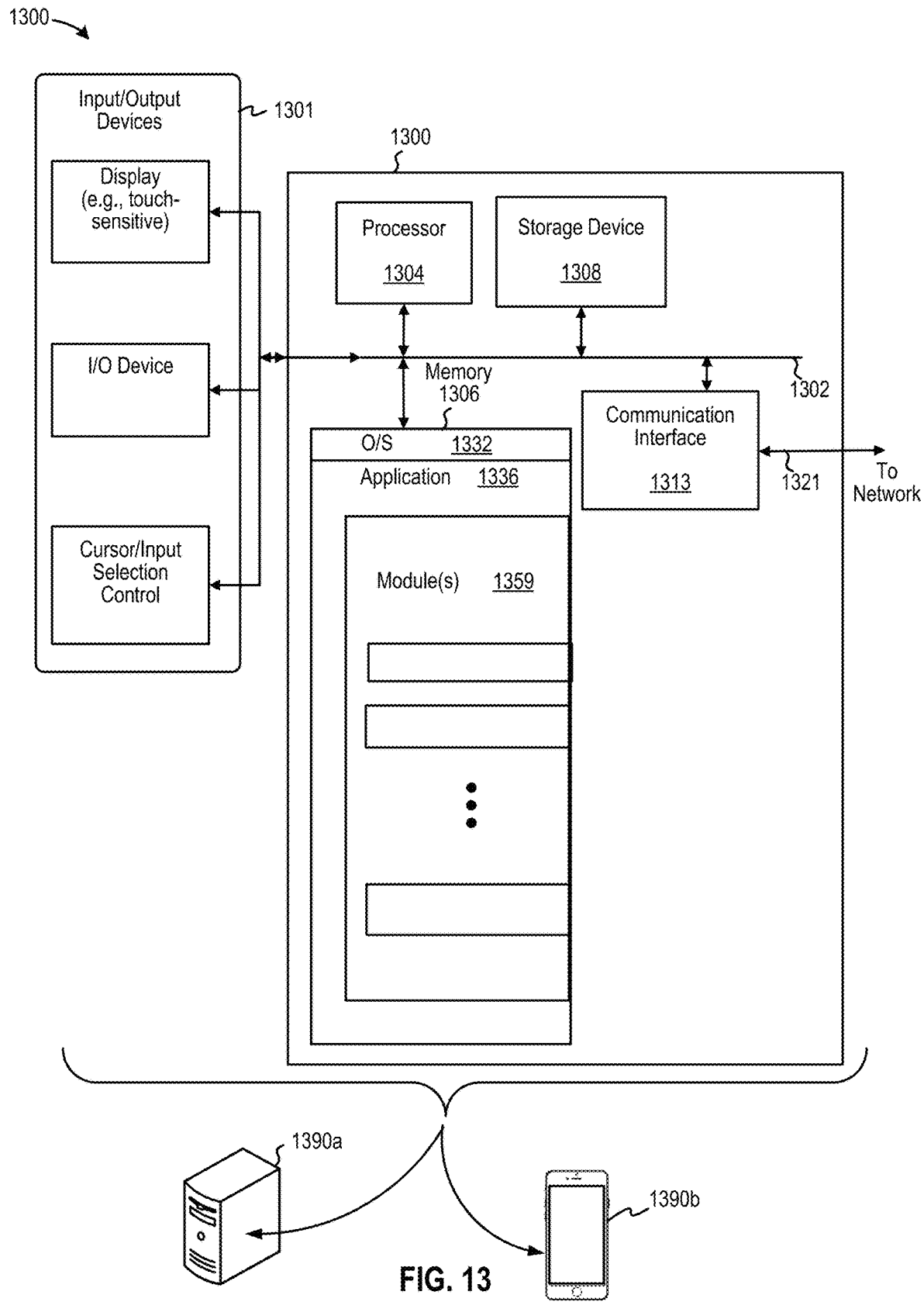
FIG. 13 illustrates examples of various computing platforms configured to provide various functionalities to any of one or more components of a collaborative dataset consolidation system, according to various embodiments.

FIG. 13 illustrates examples of various computing platforms configured to provide various functionalities to any of one or more components of a collaborative dataset consolidation system, according to various embodiments. In some examples, computing platform 1300 may be used to implement computer programs, applications, methods, processes, algorithms, or other software, as well as any hardware implementation thereof, to perform the above-described techniques.

In some cases, computing platform 1300 or any portion (e.g., any structural or functional portion) can be disposed in any device, such as a computing device 1390*a*, mobile computing device 1390*b*, and/or a processing circuit in association with initiating the formation of collaborative datasets, as well as identifying relevant data of an ingested dataset with one or more linked datasets, according to various examples described herein.

Computing platform 1300 includes a bus 1302 or other communication mechanism for communicating information, which interconnects subsystems and devices, such as processor 1304, system memory 1306 (e.g., RAM, etc.), storage device 1308 (e.g., ROM, etc.), an in-memory cache (which may be implemented in RAM 1306 or other portions of computing platform 1300), a communication interface 1313 (e.g., an Ethernet or wireless controller, a Bluetooth controller, NFC logic, etc.) to facilitate communications via a port on communication link 1321 to communicate, for example, with a computing device, including mobile computing and/or communication devices with processors, including database devices (e.g., storage devices configured to store atomized datasets, including, but not limited to triplestores, etc.). Processor 1304 can be implemented as one or more graphics processing units ("GPUs"), as one or more central processing units ("CPUs"), such as those manufactured by Intel® Corporation, or as one or more virtual processors, as well as any combination of CPUs and virtual processors. Computing platform 1300 exchanges data representing inputs and outputs via input-and-output devices 1301, including, but not limited to, keyboards, mice, audio inputs (e.g., speech-to-text driven devices), user interfaces, displays, monitors, cursors, touch-sensitive displays, LCD or LED displays, and other I/O-related devices.

Note that in some examples, input-and-output devices 1301 may be implemented as, or otherwise substituted with, a user interface in a computing device associated with a user account identifier in accordance with the various examples described herein.

According to some examples, computing platform 1300 performs specific operations by processor 1304 executing one or more sequences of one or more instructions stored in system memory 1306, and computing platform 1300 can be implemented in a client-server arrangement, peer-to-peer arrangement, or as any mobile computing device, including smart phones and the like. Such instructions or data may be read into system memory 1306 from another computer readable medium, such as storage device 1308, or any other data storage technologies, including blockchain-related techniques. In some examples, hard-wired circuitry may be used in place of or in combination with software instructions for implementation. Instructions may be embedded in software or firmware. The term "computer readable medium" refers to any tangible medium that participates in providing instructions to processor 1304 for execution. Such a medium may take many forms, including but not limited to, non-volatile media and volatile media. Non-volatile media includes, for example, optical or magnetic disks and the like. Volatile media includes dynamic memory, such as system memory 1306.

Known forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can access data. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 1302 for transmitting a computer data signal.

In some examples, execution of the sequences of instructions may be performed by computing platform 1300. According to some examples, computing platform 1300 can be coupled by communication link 1321 (e.g., a wired network, such as LAN, PSTN, or any wireless network, including WiFi of various standards and protocols, Bluetooth®, NFC, Zig-Bee, etc.) to any other processor to perform the sequence of instructions in coordination with (or asynchronous to) one another. Computing platform 1300 may transmit and receive messages, data, and instructions, including program code (e.g., application code) through communication link 1321 and communication interface 1313. Received program code may be executed by processor 1304 as it is received, and/or stored in memory 1306 or other non-volatile storage for later execution.

In the example shown, system memory 1306 can include various modules that include executable instructions to implement functionalities described herein. System memory 1306 may include an operating system ("O/S") 1332, as well as an application 1336 and/or logic module(s) 1359. In the example shown in FIG. 13, system memory 1306 may include any number of modules 1359, any of which, or one or more portions of which, can be configured to facilitate any one or more components of a computing system (e.g., a client computing system, a server computing system, etc.) by implementing one or more functions described herein.

The structures and/or functions of any of the above-described features can be implemented in software, hardware, firmware, circuitry, or a combination thereof. Note that the structures and constituent elements above, as well as their functionality, may be aggregated with one or more other structures or elements. Alternatively, the elements and their functionality may be subdivided into constituent sub-elements, if any. As software, the above-described techniques may be implemented using various types of programming or formatting languages, frameworks, syntax, applications, protocols, objects, or techniques. In some examples, the described techniques may be implemented as a computer program or application (hereafter "applications") or as a plug-in, module, or sub-component of another application. The described techniques may be implemented as software, hardware, firmware, circuitry, or a combination thereof. If implemented as software, the described techniques may be implemented using various types of programming, development, scripting, or formatting languages, frameworks, syntax, applications, protocols, objects, or techniques, including Python™, ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, JSON, Javascript™, Ajax, Perl, COBOL, Fortran, ADA, XML, MXML, HTML, DHTML, XHTML, HTTP, XMPP, PHP, and others, including SQL™, SPARQL™, Turtle™, etc. The described techniques may be varied and are not limited to the embodiments, examples or descriptions provided.

As hardware and/or firmware, the above-described techniques may be implemented using various types of programming or integrated circuit design languages, including hardware description languages, such as any register transfer language ("RTL") configured to design field-programmable gate arrays ("FPGAs"), application-specific integrated circuits ("ASICs"), or any other type of integrated circuit. According to some embodiments, the term "module" can refer, for example, to an algorithm or a portion thereof, and/or logic implemented in either hardware circuitry or software, or a combination thereof. These can be varied and are not limited to the examples or descriptions provided.

In some embodiments, modules 1359 of FIG. 13, or one or more of their components, or any process or device described herein, can be in communication (e.g., wired or wirelessly) with a mobile device, such as a mobile phone or computing device, or can be disposed therein. In some cases, a mobile device, or any networked computing device (not shown) in communication with one or more modules 1359 or one or more of its/their components (or any process or device described herein), can provide at least some of the structures and/or functions of any of the features described herein. As depicted in the above-described figures, the structures and/or functions of any of the above-described features can be implemented in software, hardware, firmware, circuitry, or any combination thereof. Note that the structures and constituent elements above, as well as their functionality, may be aggregated or combined with one or more other structures or elements. Alternatively, the elements and their functionality may be subdivided into constituent sub-elements, if any. As software, at least some of the above-described techniques may be implemented using various types of programming or formatting languages, frameworks, syntax, applications, protocols, objects, or techniques. For example, at least one of the elements depicted in any of the figures can represent one or more algorithms. Or, at least one of the elements can represent a portion of logic including a portion of hardware configured to provide constituent structures and/or functionalities.

According to some embodiments, the term "circuit" can refer, for example, to any system including a number of components through which current flows to perform one or more functions, the components including discrete and complex components. Examples of discrete components include transistors, resistors, capacitors, inductors, diodes, and the like, and examples of complex components include memory, processors, analog circuits, digital circuits, and the like, including field-programmable gate arrays ("FPGAs"), application-specific integrated circuits ("ASICs"). Therefore, a circuit can include a system of electronic components and logic components (e.g., logic configured to execute instructions, such that a group of executable instructions of an algorithm, for example, and, thus, is a component of a circuit). According to some embodiments, the term "module" can refer, for example, to an algorithm or a portion thereof, and/or logic implemented in either hardware circuitry or software, or a combination thereof (i.e., a module can be implemented as a circuit). In some embodiments, algorithms and/or the memory in which the algorithms are stored are "components" of a circuit. Thus, the term "circuit" can also refer, for example, to a system of components, including algorithms. These can be varied and are not limited to the examples or descriptions provided. Further, none of the above-described implementations are abstract, but rather contribute significantly to improvements to functionalities and the art of computing devices.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

The invention claimed is:

1. A method comprising:
receiving data representing a request to present a subset of data of a dataset in a user interface;
analyzing a classification type for the subset of data against a graph data arrangement;
determining the classification type based on at least one compressed data representation associated with a subset of graph-based data in the graph data arrangement;
generating a first subset of presentation data to present in a user interface, the first subset of presentation data configured to present the subset of data in the user interface in association with a first user input configured to receive a user input;
generating an interface portion in the user interface that includes a proposed subset of graph data to join based on data that is similar or equivalent to the classification type for the subset of data;
detecting selection of the first user input; and
associating the subset of data with the classification type.

2. The method of claim 1 further comprising:
identifying a plurality of compressed data representations each associated with a subset of graph-based data in the graph data arrangement.

3. The method of claim 1 further comprising:
detecting selection of the first user input.

4. The method of claim 1 further comprising:
identifying the subset of data as either an ingested dataset or an unclassified dataset.

5. The method of claim 1 wherein the graph data arrangement includes data formatted as at least one triple.

6. The method of claim 5 wherein determining the classification type comprises:
predicting the classification type.

7. The method of claim 6 wherein predicting the classification type comprises:
executing instructions to filter the plurality of compressed data representations; and
matching a computed compressed data representation for the subset of data to at least one compressed data representation.

8. The method of claim 7 further comprising:
assigning an identified classification type to the subset of data based on a reference classification type associated with matching to the at least one compressed data representation.

9. The method of claim 1 further comprising:
generating a second subset of presentation data to present in the user interface, the second subset of presentation data configured to present data representing identification of other datasets with which to join to the dataset; and
detecting selection of the identification of at least one other dataset to join the dataset.

10. The method of claim 8 further comprising:
generating a similarity matrix for the subset of data.

11. The method of claim 10 further comprising:
accessing a plurality of other similarity matrices each form to identify an amount of relevant data associated with a data in the graph data arrangement;
analyzing the similarity matrix against the plurality of other similarity matrices to compute degrees of similarity;
ranking subsets of the graph data arrangement based on the degrees of similarity to form ranked graph data; and
presenting data representing a user input to join a subset of the ranked graph data to the dataset.

12. The method of claim 11 further comprises:
detecting selection of the user inputs to join; and
linking the subset of data to one of the subsets of the graph data arrangement.

13. An apparatus comprising:
a memory including executable instructions; and
a processor, responsive to executing the instructions, is configured to:
receive data representing a request to present a subset of data of a dataset in a user interface;
analyze a classification type for the subset of data against a graph data arrangement;
determine the classification type based on at least one compressed data representation associated with a subset of graph-based data in the graph data arrangement;
generate a first subset of presentation data to present in a user interface, the first subset of presentation data configured to present the subset of data in the user interface in association with a first user input configured to receive a user input;
generate an interface portion in the user interface that includes a proposed subset of graph data to join based on data that is similar or equivalent to the classification type for the subset of data;
detect selection of the first user input; and
associate the subset of data with the classification type.

14. The apparatus of claim 13 wherein the processor is further configured to:
detect selection of an icon as a first user input; and
identify the subset of data as either an ingested dataset or an unclassified dataset, or both.

15. The apparatus of claim 13 wherein the processor is further configured to:
identify a plurality of compressed data representations each associated a subset of graph-based data in a graph data arrangement.

16. The apparatus of claim 15 wherein the processor is further configured to:
execute instructions to filter the plurality of compressed data representations; and
match a computed compressed data representation for the subset of data to at least one compressed data representation.

17. The apparatus of claim 16 wherein the processor is further configured to:
assign an identified classification type to the subset of data based on a reference classification type associated with matching to the at least one compressed data representations.

18. The apparatus of claim 13 wherein the processor is further configured to:
generate a second subset of presentation data to present in the user interface, the second subset of presentation data configured to present data representing identification of other datasets with which to join to the dataset; and
detect selection of the identification of at least one other dataset to join the dataset.

19. The apparatus of claim 18 wherein the processor is further configured to:
generate a similarity matrix for the subset of data;
access a plurality of other similarity matrices each form to identify an amount of relevant data associated with a data in a graph data arrangement;
analyze the similarity matrix against the plurality of other similarity matrices to compute degrees of similarity;
rank subsets of the graph data arrangement based on the degrees of similarity to form ranked graph data; and
present data representing a user input to join a subset of the ranked graph data to the dataset.

20. The apparatus of claim 19 wherein the processor is further configured to:
detect selection of the user inputs to join; and
link the subset of data to one of the subsets of the graph data arrangement.

* * * * *